United States Patent [19]

Abrams et al.

[11] 3,735,366

[45] May 22, 1973

[54] ELECTRONIC DATA PROCESSING SYSTEM

[75] Inventors: Harold B. Abrams, Olivette; Benjamin O. Haynes, St. Louis; Glynn P. Williams, St. Charles, all of Mo.

[73] Assignee: Myles Digital Sciences, Inc., Maryland Heights, Mo.

[22] Filed: May 10, 1971

[21] Appl. No.: 141,741

Related U.S. Application Data

[63] Continuation-in-part of Ser. No. 876, Jan. 6, 1910, abandoned.

[52] U.S. Cl. ................................................340/172.5

[51] Int. Cl. ................................................G06f 13/00

[58] Field of Search ....................340/172.5; 235/157

[56] References Cited

UNITED STATES PATENTS

| | | | |
|---|---|---|---|
| 3,533,084 | 10/1970 | Cook et al. | 340/172.5 |
| 3,501,746 | 3/1970 | Vosbury | 340/172.5 |
| 3,344,405 | 9/1967 | Craft et al. | 340/172.5 |
| 3,555,515 | 1/1971 | Lee | 340/172.5 |
| 3,540,002 | 11/1970 | Clapper | 340/172.5 |
| 3,413,610 | 11/1968 | Botjer et al. | 340/172.5 |
| 3,601,808 | 8/1971 | Vlack | 340/172.5 |

*Primary Examiner*—Paul J. Henon
*Assistant Examiner*—Mark Edward Nosbaum
*Attorney*—Robert J. Schaap

[57] ABSTRACT

A data storage and retrieval system capable of performing various arithmetic functions such as adding and subtracting and which includes two principal units. The first of these units is a console which contains a keyboard for introducing data, a display readout, and various switches to perform the data introduction, storage, retrieval, and the various arithmetic functions, as well as certain modifications to the data. The second unit, which forms part of the system, is a central electronics unit which includes a memory section. The memory section includes input/output electronics as well as track selection electronics. The central electronics unit provides for addition and subtraction functions as well as control of the memory section through actuation of the various switches on the console unit. The data which is to be stored in the memory section and which is to be processed via the various arithmetic function is preceded by an identification number which may represent a stock or part number or other logical identification indicia of the stored data. This data is stored randomly in the memory section and discoverable by systematic searching. The central electronics unit includes devices for introducing clock pulses needed in the extraction of data in the memory section. In order to achieve high speed data transfer over substantial cable length, an early clocking mechanism to achieve pre-clock-data synchronization is employed. Information on the various tracks of the memory element is compared with the address or identification number manually introduced into a storage register. In essence, the system operates on the basis of a modified form of associative addressing. An embodiment of the system utilizes a combination of a modified form of associative and direct addressing. Corresponding addresses will enable the comparator to generate an output at a clock pulse time. The system is designed so that more than one console unit may be used with a single central electronics unit. Provision is made to prevent simultaneous change of data at a particular address by two different console units. The system of the present invention may also be operated with either numeric or alpha numeric codes.

79 Claims, 35 Drawing Figures

INVENTORS
HAROLD B. ABRAMS
BENJAMIN O. HAYNES
GLYNN P. WILLIAMS
BY Robert J. Schaap
ATTORNEY INVENTORS
HAROLD B. ABRAMS
BENJAMIN O. HAYNES
GLYNN P. WILLIAMS
BY Robert J. Schaap
ATTORNEY INVENTORS
HAROLD B. ABRAMS
BENJAM O. HAYNES
GLYNN P. WILLIAMS
BY Robert J. Schaap
ATTORNEY INVENTORS
HAROLD B. ABRAMS
BENJAMIN O. HAYNES
GLYNN P. WILLIAMS
BY Robert J. Schaap
ATTORNEY INVENTORS
HAROLD B. ABRAMS
BENJAMIN O. HAYNES
GLYNN P. WILLIAMS
BY Robert J. Schaap
ATTORNEY INVENTORS
HAROLD B. ABRAMS
BENJAMIN O. HAYNES
GLYNN P. WILLIAMS
BY Robert J. Schaap
ATTORNEY INVENTORS
HAROLD B. ABRAMS
BENJAMIN O. HAYNES
GLYNN P. WILLIAMS
BY
Robert J. Schaap
ATTORNEY INVENTORS
HAROLD B. ABRAMS
BENJAMIN O. HAYNES
GLYNN P. WILLIAMS
BY Robert J. Schaap
ATTORNEY INVENTORS
HAROLD B. ABRAMS
BENJAMIN O. HAYNES
GLYNN P. WILLIAMS
BY Robert J. Schaap
ATTORNEY

INVENTORS
HAROLD B. ABRAMS
BENJAMIN O. HAYNES
GLYNN P. WILLIAMS

BY Robert J. Schaap
ATTORNEY

INVENTORS
HAROLD B. ABRAMS
BENJAMIN O. HAYNES
GLYNN P. WILLIAMS
BY
Robert J. Schaap
ATTORNEY INVENTORS
HAROLD B. ABRAMS
BENJAMIN O. HAYNES
GLYNN P. WILLIAMS
BY Robert J. Schaap
ATTORNEY

PATENTED MAY 22 1973 3,735,366

SHEET 13 OF 14

BY Robert J. Schaap

ATTORNEY

INVENTORS
HAROLD B. ABRAMS
BENJAMIN O. HAYNES
GLYNN P. WILLIAMS
BY Robert J. Schaap
ATTORNEY

ELECTRONIC DATA PROCESSING SYSTEM

BACKGROUND OF THE INVENTION

This application is a continuation-in-part of copending application Ser. No. 876, filed Jan. 6, 1970, entitled "Electronic Data Processing System" now abandoned.

This invention relates in general to certain new and useful improvements in electronic data processing systems, and more particularly, to a data storage and retrieval system which is capable of performing various arithmetic functions.

In recent years, there has been a widespread advance in data processing technology and an attendant introduction of commercially available data equipment. Many of these apparatus which have been characterized as "desk model computers" are essentially reduced versions of the larger digital computing equipment. Interestingly, these so-called "desk model computers" are accurately characterized as computers since they are subject to a high purchase cost as well as a high operating cost which has notoriously accompanied the larger version digital computer.

Unfortunately, most of the research and development activities in the data processing area of technology have been concerned with increased speed of operation, reduction of component size, and increased versatility. While these research and development activities have resulted in the introduction of a large number of data processing equipment and has advanced the state of the art, the equipment can generally be acquired by only larger organizations having sufficient capital to afford the cost of digital computing equipment.

digital computing equipment of this type is generally beyond the need of most small business organizations as well as many of the medium-sized business organizations. Smaller business organizations typically do not require the wide degree of versatility which is available in much of the commercially offered digital computing equipment. Furthermore, and even more critical, the smaller business organizations can ill afford the purchase price or lease cost to obtain digital computing equipment as well as the substantial cost of operating such equipment. Moreover, most of the commercially available digital computing equipment requires the employment of programming or so-called "software" for proper operation of the equipment. The need for this software imposes an additional financial burden on the small business organization which may be required to obtain the services of a programmer. Furthermore, each change in operating procedure of the business may well necessitate the change in the computer program to conform to the present business practices, and this, in turn, necessitates the revision of the software.

Many small business organizations which could well use the facilities of digital computing equipment such as in inventory control or simple data storage and retrieval, have found that the commercially available digital computing equipment was not economically feasible for employment. Accordingly, many of the business organizations which could effectively employ electronic data systems have continued to use the well-known manual recordkeeping systems.

The system of the present invention is quite unique in that it serves as a means of storing and retrieving information on a real-time basis. In problems such as inventory control and the like, organizations have relied on commercially available digital computing equipment. The extant computing equipment is quite costly, not only in terms of the actual purchase or lease cost, but in the attendant requirements for programming personnel, keypunch personnel and skilled operators as well. The system of the present invention resides in two self-contained units which require no external programming and is designed to be operated by personnel relatively unskilled in the computer arts. In addition, since the claimed system does not require external programming, the design and construction is relatively simplified when compared to extant digital computing equipment and hence the cost of such system is materially reduced.

The system of the present invention is capable of having information introduced for further processing by direct key actuation and hence is capable of handling this information on a real time basis. The commercially available digital computing systems would require programmed inputs such as by punched cards or recorded magnetic tape, thereby effectively eliminating the feasibility of handling information on a real time basis. Furthermore, with the extent systems, the information to be processed must be converted to a proper predetermined format for computer acceptance. Since the system of the present invention is designed for direct key actuation, no special information encoding problems are encountered.

It is, therefore, the primary object of the present invention to provide an electronic data processing system which is capable of performing data storage and retrieval functions as well as performing the various arithmetic functions on the stored data.

It is another object of the present invention to provide an electronic data processing system of the type stated which is constructed in such manner that it can be effectively operated without the need of programming.

It is a further object of the present invention to provide an electronic data processing system of the type stated which effectively serves as a small digital computer for purposes of inventory control, stored credit information, and the like, and which is capable of highly efficient and accurate operation.

It is also an object of the present invention to provide an electronic data processing system of the type stated which can be manufactured substantially on a mass-production basis at a relatively low unit cost, thereby enabling the purchase of such equipment by relatively small business organizations.

With the above and other objects in view, our invention resides in the novel features of form, construction, arrangement and combination of parts presently described and pointed out in the claims.

FIGURES

In the accompanying drawings (14 sheets):

FIG. 1 is a perspective view of console unit forming part of an electronic data processing apparatus constructed in accordance with and embodying the present invention;

FIGS. 2*a* and 2*b* are composite schematic views illustrating the various components forming part of the electronic data processing apparatus, of which;

FIG. 2*a* is a schematic view of the electrical circuitry of the console unit forming part of the apparatus of FIG. 1;

FIG. 2*b* is a schematic view of a central electronics unit forming part of the electronic data processing apparatus;

FIGS. 5A, 5B, 5C and 5D are composite schematic views illustrating the various components forming part of the modified form of electronic data processing apparatus, of which;

FIGS. 5A, 5B and 5C are a schematic view of the electrical circuitry of the console unit forming part of the apparatus of FIG. 4;

FIG. 5D is a schematic view of a central electronics unit forming part of the modified form of electronic data processing apparatus;

FIG. 9 is a composite diagramatic view consisting of FIGS. 9A–9H and showing the temporal relationship of clocking and data pulses used in high speed data transfer in the present invention, of which:

FIG. 9A illustrates a series of three clock pulses as they leave the central electronics unit;

FIG. 9B illustrates the series of the same three clock pulses as they are received in temporal relationship at the console unit;

FIG. 9C illustrates the series of the same three clock pulses as they clock data back to the central electronics unit in temporal relationship;

FIG. 9D illustrates a pair of 1 data pulses and the desired temporal relationship in which they should be received at the central electronics unit from the console unit;

FIG. 9E illustrates the same pair of 1 data pulses and the timing relationship with respect to the clock pulses in which the data pulses are actually received at the central electronics units after long cable transfer;

FIG. 9F illustrates a pair of early clock pulses as they leave the central electronics unit and their temporal relationship with respect to the normal clock pulses of FIG. 9A;

FIG. 9G illustrates a 1 data pulse and the timing relationship with respect to the clock pulses in which the data pulse is received at the central electronics unit with employment of early clock pulses;

FIG. 9H illustrates an offset in the timing of the data pulse so that it is received at the central electronics unit in such fashion that the clock pulse starts one half the time length of a data pulse later;

DEFINITIONS

Figure 1:
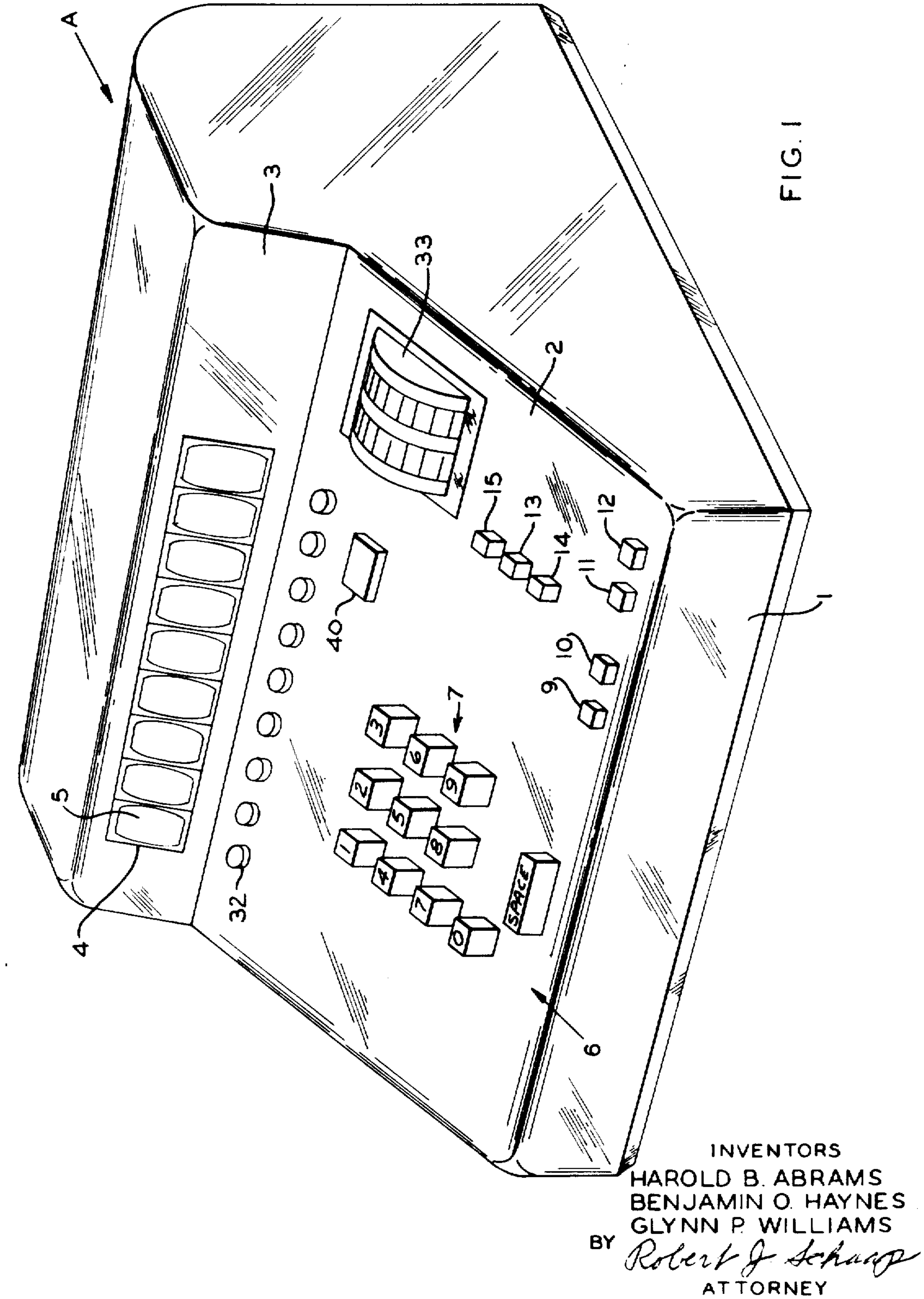

The recent advances in the field of cybernetics and more particularly in the field of data processing has created a condition of multiple uses of terms which has led to some confusion. In view of the fact that there is no accurate standardization of terms, the following definitions are set forth for purposes of clarity. It should be recognized that these definitions are only exemplary and, therefore, non-limiting.

As used herein:

*Character* — a conventional or nonconventional mark, symbol, number or digit such as a decimal digit or letter of the alphabet or similar indicia.

*Word* — one or more characters such as a group of decimal digits to form a number, as for example, ten decimal digits may represent one word.

*Bit* — a binary element of a digital code where a group of binary elements may represent a decimal digit or arabic or other character and which is generated through conversion of a character to another type of character system or language; as for example, for bits generated from a decimal digit.

*Reading* — the process of discerning and acquiring data from a member (the term "reading" is generally applied in digital arts and the term "reproducing" is generally applied in analog arts, but have synonomous meanings herein).

*Recording* — the process of registering data in some temporary, permanent or semi-permanent form (the term "recording" is generally applied in analog arts and the term "writing" is generally applied in digital arts, but have synonomous meanings herein).

*Sector*— a space or location in a magnetic storage member, such as disc or drum, reserved for recording of a predetermined number of bits, as for example, a nine character alphanumeric six-bit code sector would contain 54 bit spaces.

*Direct Addressing* — a process for recording a word or a portion thereof in a magnetic memory, or retrieving such word or portion thereof from such memory through defining the location, or by defining the sectors of the memory which define such location, of such word or portion thereof by directly recording bit combinations representing such word or words or portions thereof in a particular address location, or extracting the information therefrom by defining the bit combinations representing the location of such word or words in that particular address location.

*Associative Addressing* — a process for recording a word or portion thereof in a magnetic memory, or retrieving such word or portion thereof from such memory through defining the location, or by defining the sectors of the memory which define such location, of such word or portion thereof by recording bit combinations unique for each sector of the memory in order to acquire a pre-recorded address and comparing such pre-recorded address during each word time with the desired address and selecting such desired address upon coincidence of comparison between the pre-recorded address and the desired address.

*Combination Associative-Direct Addressing* — a process for recording a word having a locator portion and a descriptor portion or a group of words with a locator portion and a descriptor portion in a magnetic memory, or retrieving such word or words from such memory by serially recording bit combinations for a locator portion in a particular location of one sector of the memory thereby defining a locator address, and recording bit combinations for a descriptor portion in a particular location of another sector of the memory and which location of the descriptor portion is related to the locator portion in addressable manner thereby defining a descriptor address; and retrieving such word or words by associatively selecting the locator address of the locator and directly selecting the descriptor address from the locator address.

The remaining terms used herein are deemed to have their commonly accepted art recognized meanings.

The term "data" as used in this specification refers to information in general and also refers to a sector of data which is associated with a part number address. However, in the included claims, the term "data" is used in the generic sense to represent information in any intelligible code and is not limited to sectors of data representing information about any part number or address.

GENERAL DESCRIPTION

Generally speaking, the present invention provides a system comprising both an apparatus and a method for achieving data storage and retrieval and performing certain arithmetic functions upon such data. Two embodiments of such apparatus and method which operates on a modified associative addressing principle are disclosed. The first of these embodiments employs a system which is capable of handling numeric data, and the second of these embodiments employs a system which is capable of handling alpha-numeric data. Systems for interfacing a plurality of console units to one central electronics unit is also provided. In another mode of operation the system of the present invention operates on the basis of a modified form of combination associative addressing and direct addressing.

The first embodiment of the apparatus includes two principal units, namely a console unit and a central electronics unit. The console unit contains a keyboard having the digits 1–9, 0 and space. The other major components in the console unit include a multipurpose display shift register and parallel entry gates for entering information from the keyboard into the display shift register. A combination of an anode shift register along with anode drivers and cathode drivers operate a bank of display tubes such as cold cathode display tubes. These tubes each contain ten numerals, 1–9 and 0, so that upon proper energization, they are capable of displaying any of the ten numerals, 0–9. In a deenergized state, the tubes represent a "space" condition. A divide by four counter as well as a BDC to line 10 decoder is provided in order to circulate pulses through the display tubes.

The operator's panel or so-called "control panel" of the console unit includes, in addition to the keyboard, a clear switch which is capable of introducing a blank or space code into the display shift register. In addition, the operator's panel includes a "read" pushbutton switch, a write data pushbutton switch, a "write part number" switch, and an "enable" switch. The write data switch and the write part number switch are connected to and controllable by the enable switch so that the former two switches cannot be actuated without actuating the enable switch. The read switch is connected in such manner that it is capable of reading data from the memory section. The write data switch is connected in such manner that it is capable of introducing part data into the memory section. In like manner, the write part number switch is connected in such manner that it is capable of writing part numbers in the memory section.

Also mounted on the control panel is a digit change switch which is associated with each of the nine display tubes, and accordingly nine digit change switches are provided. In addition, a two-decade thumbwheel digit switch is also mounted on the operator's panel in order to provide for adding and subtracting data. In like manner, an add pushbutton switch and a subtract pushbutton switch are mounted on the operator's panel and are also connected to the enable switch. In this manner, the enable switch must be actuated before either an add or subtract function can take place. The console unit also includes an enter shift register which is operable with the digit decode, the parallel entry gates and the display shift register. Furthermore, the console unit includes a parallel to serial converter and a delay multivibrator, for reasons which will presently more fully appear.

The second principal unit serves as a combination central electronics-memory unit and which includes a memory section and an electronics section. The memory section generally comprises a magnetic drum having a series of circuits which are operable with the drum; such as a sector clock amplifier, a write clock amplifier, an index amplifier, a data clock amplifier, etc. The drum is similar to conventional magnetic drums normally used in digital computing equipment and has a plurality of magnetic record/reproduce heads for reading and writing on each track of the drum and which heads are connected to a write enable circuit and an NRZ input circuit. In addition, a track counter is provided for selectively enabling the reading of the next adjacent track after one track has been scanned.

The central electronics unit includes a read sequencer which is connected to the read switch on the control panel and to the clear switch on the control panel. The central electronics unit also includes a write sequencer which is connected to the write data switch and the write part number switch. The central electronics unit additionally includes a serial BCD adder/subtractor which is connected to the display shift register as well as the add/subtract functions in the console unit. This adder/subtractor is capable of performing the various arithmetic functions capable of being accomplished by this apparatus. A search shift register is also located in the central electronics and which is operable by two sets of gates, the first of which is connected to the read sequencer and the second of which is connected to a valid data detector and a preamble one-shot. A bit counter is connected to the search shift register through the first set of gates. Additional components, such as clock switches, a preamble register, a sector count module, and data flip-flops are also included in the central electronics unit.

A series of transmitters and receivers are interposed between the console unit and the central electronics-memory unit. The transmitters are generally low impedance drivers capable of supplying sufficient current to drive the line with which it is associated when the line is loaded with its characteristic impedance. The receivers employed are generally matched impedance differential amplifiers with proper logic level outputs.

The central electronics section provides control of the memory section under direction of the various switches on the control panel. Furthermore, the addition and subtraction is performed in the central electronics unit in the manner as previously described. Power supplies may be properly installed in the central electronics unit to provide the operating voltages necessary for the control console, the various components in the central electronics unit as well as the memory section which includes its own input/output electronics.

Actuation of the clear switch on the control panel assures the clearing of any remaining or extraneous data in the electronics unit. When it is desired to enter a new part number into the memory section, the part number representing an available part number position in the memory section is introduced by proper actuation of the keyboard to place the numbers representing this available position in the display shift register. This same number will also appear on the display tubes. The read switch is actuated to search for and acquire this part number position which is again displayed on the display tubes. The keys of the keyboard are again actuated to introduce a desired new part number and the write part number switch is then pressed after being enabled by the enable switch so that this new part number may be entered into the memory section. The part data associated with the new part number is also entered by way of the keyboard and, furthermore, the part number and part data are displayed on the control console for examination of accuracy prior to recording in the memory section.

A four bit BCD code is used to represent one integer of the decimal system. For a nine integer part number, a sector of 36 bits is used to represent the 9 decimal digit part number. This initial 36 bits representative of the part number is followed by an additional sector of 36 bits which provides part data relating to that part number. Accordingly, an associative type of addressing is employed, in that, data relating to a particular part number is recorded in the memory section by reference to the part number.

If it is desired to change a particular part number, the part number is introduced into the display shift register by means of the keyboard. In the present invention, the particular part number is a locator and could represent a name, account number or the like. The concept of "part number" and "part data" associated with the part number is more fully described in detail hereinafter. The read button is actuated so that a search for this part number may be initiated. This search will occur in the search shift register by comparing the addressed part numbers in the memory section with the part number which has been introduced into the display shift register. The new part number is then introduced into the display shift register by way of the keyboard. In like manner, part data associated with the new part number may also be introduced into the apparatus. The write part number switch is actuated to introduce the part number into the memory section. Furthermore, the write data switch is actuated after introduction of the part data into the display shift register for recording this part data in the memory section. Comparison is then performed with information contained in the memory section.

During the search of the memory section, information on successive tracks of the drum is compared with the part number introduced into the display shift register and ultimately transferred to the search shift register. The output of the search shift register and the information read from the memory section are compared in a comparator circuit. Correlation of address information present in the search shift register with corresponding address information from the drum enables the comparator circuit to generate an output which is anded with a sector clock output causing the display shift register to retain the subsequent sector of data. The desired data word is stored in the display shift register and caused to be illustrated by the display shift register.

If it is desired to change the data associated with a particular part number, the part number which has been previously stored in the memory section is found in the manner as previously described by introducing the number into the display shift register and finding comparison with the addressed part number through the search shift register.

Arithmetic functions can be performed through the use of the thumbwheel switches provided on the control panel. For example, if it is desired to subtract a number from a portion of the data digit, this number is introduced by means of the thumbwheel switches. The subtract switch on the control panel is actuated for entering a BCD equivalent of the decimal digits to be subtracted. Subtraction of these decimal digits from the data is then performed and the difference is recorded in the memory section. After the recording is completed, the data is received from the memory section and sent to the display tubes through the display shift register for examination. Addition may be performed in a similar fashion except that the add switch on the control panel is actuated in place of the subtract switch.

An alternate means of changing the data associated with a part number is by use of nine pushbutton-operated change digit switches which are located beneath each of the nine display tubes. For this method, the subject part number is entered into the search shift register, and the disc location is determined as explained above. The data thus displayed may be altered by simultaneously depressing the change digit pushbutton switch located beneath the digit to be changed, and the desired keyboard key. The digit then changes to the keyboard numeral. This process is repeated for the remaining digits requiring alteration. When the desired digit changes have been made, the new information is entered into the memory by actuating the write data switch.

It is possible to connect a plurality of console units to one central electronics unit so that each of the console units are individually capable of receiving data from the central electronics unit as well as adding and subtracting to the part data contained in the memory section of the central electronics unit. In this system, the switch circuits of each of the console units, namely the read circuit, the write data circuit, the write part number circuit, the subtract circuit and the add circuit are connected to an OR gate structure. In addition, console data and add-subtract data from each console unit are connected to the OR gate structure, which is in turn connected to the central electronics unit. Each of the console units receive memory data and memory clock pulses from the central electronics without interposition of the OR gating structure.

This system also employs a console switching circuit which receives transfer information from the console and provides data transfer information to each of the consoles. Furthermore, a console inhibit circuit is employed which receives clear pulses from each of the console units and a busy signal pulse from the console switching circuit. The console units are arranged in such a manner that the console data and add and subtract data are all zeroes except when data transfer is initiated. Actuation of any of the switch circuits on any particular console unit will inhibit any other console unit from operating the central electronics unit until the clear switch on the console unit accessing the central electronics unit has been actuated. Actuation of the clear switch on the last named console unit will release the control switching circuit and thereby enable other console units to access the central electronics unit.

An apparatus of the present invention is also capable of handling alpha-numeric data and also contains two major units, namely a console unit and a central electronics unit. The console unit of the alpha-numeric apparatus is capable of handling 40 distinct characters which may be introduced by keyboard and is transferred to a six bit encoder for generating six bits for each character introduced into the apparatus. The console unit also includes a 54 bit console register which similarly serves a plurality of functions. In addition, the console unit is capable of introducing data to perform arithmetic functions such as addition and subtraction. A read switch and write data switch are also employed in the same manner as the numeric apparatus. For purposes of performing the addition and subtraction, an add switch and subtract switch are provided. A two-decade thumbwheel digit switch is also provided in order to introduce the data to be subtracted from or added to part number data.

The console unit of the alpha-numeric apparatus includes a write part number switch as well as a change part number switch. In the numeric apparatus, an address in which a new part number could be entered was located by searching for an all zero address. The alpha-numeric apparatus is provided with a zeroes locator which automatically searches the memory section for an empty address sector. The console unit also includes a space code generator which is capable of generating spaces in the console register upon actuation of a clear switch. Furthermore, the console unit includes nine display tubes which may be energized for visually displaying in alpha-numeric format, the bit information which is contained in the console register. Actuation of the clear switch introduces all spaces into the console register as previously described. Accordingly, writing of part data or part numbers into the console register actually causes a writing over the spaces. It should be recognized that the space which is introduced in the form of a six bit byte is recognized by the memory section as six bits and is as valid to the memory section as any other byte of six informational bits. However, since the alpha-numeric unit operates on a six bit basis, these bits are decoded on the output of the console register into a 13 bit data format in order to energize 13 segment display tubes. These segments in the display tubes will form the various characters in alpha-numeric form for display purposes. The alpha-numeric apparatus also employs an anode register along with the six bit to 13 segment decode circuit in order to energize selected display tubes.

The console unit also includes a comparator circuit which is connected to the zeroes locator for selecting a proper sector in the memory section in which a part number can be written. Furthermore, the console unit includes a sector counter operable with a part number/-part data flip-flop. In addition, the console unit includes a write sequencer and a read sequencer.

The alpha-numeric apparatus of the present invention operates on the basis of a combination associative and direct addressing principle. As indicated previously, when it is desired to introduce a new part number into the memory section, an all zeroes sector of the memory is located and the part number is introduced into this all zeroes sector. When it is desired to reacquire this part number and/or the data associated therewith, the part number is introduced into the console unit by means of the keyboard and an associative search of the memory section is performed until the then recorded part number is located. The part data is directly addressable with respect to the part number. The data may be recorded in the same track of the drum and in a sector of this track which is related in time and space to the part number.

In a preferred embodiment of the present invention, the part data is preferably located in a track which differs from the track containing the part numbers. For this purpose, the console unit is provided with a change track sequencer. The change track sequencer in the console unit will command a track jump operation to the central electronics unit at a prescribed time. In essence, when the associative search reveals the part number, the change track sequencer will cause the central electronics to select the read head for an adjacent track in order to acquire the data associated with the particular part number. Again the data is located in both a predetermined time and distance relationship with respect to the part number. Thus, 4 the data is located in the next adjacent track to the track containing the part number, the data is generally located two sectors after the part number in such adjacent track.

The console unit also includes a redundant address inhibit circuit which prevents the same part number address from being recorded twice in the memory section. In addition, the console unit also includes an early clock sequencer which sends out clock pulses on a basis to introduce information to and from the memory section on a proper time basis. When high speed transfers over long transfer lines is involved, the data from the console unit may arrive at the memory section at a time equivalent to several clock pulses later than the time in which the data should arrive. The early clock system of the present invention obviates this problem. The remainder of the operation of the console unit is somewhat similar to the operation of the console unit in the numeric apparatus.

The electronics unit in the alpha-numeric apparatus differs somewhat from the electronics unit in the numeric apparatus. In the alpha-numeric apparatus, the memory address register is no longer employed. The console register maintains its own addressing function. Furthermore, when a plurality of console units are employed, each individual console unit is capable of reading simultaneously to search for its own address. In the numeric apparatus, data transfer signals were received in the console unit from the read and the write sequencers which enabled the console to transmit data. In the alpha-numeric apparatus, the central electronics unit sends data to the console unit at all times, except during portions of a write operation. However, in each of the apparatus, sector clock pulses are received only from the memory section of the electronics unit.

The electronics unit also includes the major components such as a serial BCD adder/subtracter and a nines complement generator, the latter enabling subtraction functions. In addition, the preamble register is provided for adding a preamble and postamble to the part numbers and part data to be written on the drum. The circuitry of the central electronics unit is materially simplified in the alpha-numeric apparatus.

When it is desired to read a part number included in the memory section or to read the part data associated with that part number in the memory section, the part number is introduced into the console register by means of the keyboard. Read information has been continually received by the console unit at all times. Accordingly, when the read switch is actuated, comparison with part numbers in the memory section can be made serially on a bit-by-bit basis. Information from the console register is transmitted into the comparator for this comparison function. A comparison will exist only at sector time and if comparison did exist, then it is apparent that the next sector in sequence contains part data associated with the part number. A modulo n557 counter (where n is the number of tracks on the drum) is provided to retain the drum location from which the part data was removed. The counter is initialized on each count of n557 in order to determine the address of this particular sector of part data. The part data information is then introduced into the console and is circulated six bits at a time.

To change a part number, the existing part number is introduced into the console register by means of the keyboard. The change part number switch is then actuated and this, in turn, will deenergize the display during the searching for the existing part number. After the part number is found from the memory section, the sector counter is set. At this time, the display tubes remain extinguished. A new part number is then introduced by means of the keyboard and the change part number button is again actuated. This latter operation automatically enters the new part number on the drum using the sector counter to determine the proper drum location. In order to write a new part number, the number is introduced and the write new part number switch is actuated. The zeroes locator serves to select a part number location with all zeroes and the part number is subsequently recorded in this location. The part data/part number flip-flop essentially keeps track of the sectors which contain part numbers and the sectors which contain part data. The central electronics unit of the alpha-numeric apparatus also includes a track jump sequencer which operates in conjunction with the change track sequencer of the console unit. These two sequencers in combination enable the unique combination associative-direct addressing system used in the present invention. An accumulated data sequencer and an accumulated data storage register is also included in the central electronics unit for the purposes of accumulating certain of the data included in the data sectors over periodic time intervals.

The present invention also provides a circuit for employing a plurality of alpha-numeric console units with one central electronics unit. This system includes a gating structure for introducing add-subtract data, console data, write and add/subtract functions into a central electronics unit. Outputs from the central electronics unit which include sector clock pulses, index clock pulses, read clock pulses, write clock pulses and memory data are all transmitted simultaneously to the various console units. A number of optional embodiments are also available for use with the alpha-numeric apparatus, and these optional embodiments are described in more detail hereinafter.

DETAILED DESCRIPTION OF A NUMERIC DATA SYSTEM

Figure 2A:
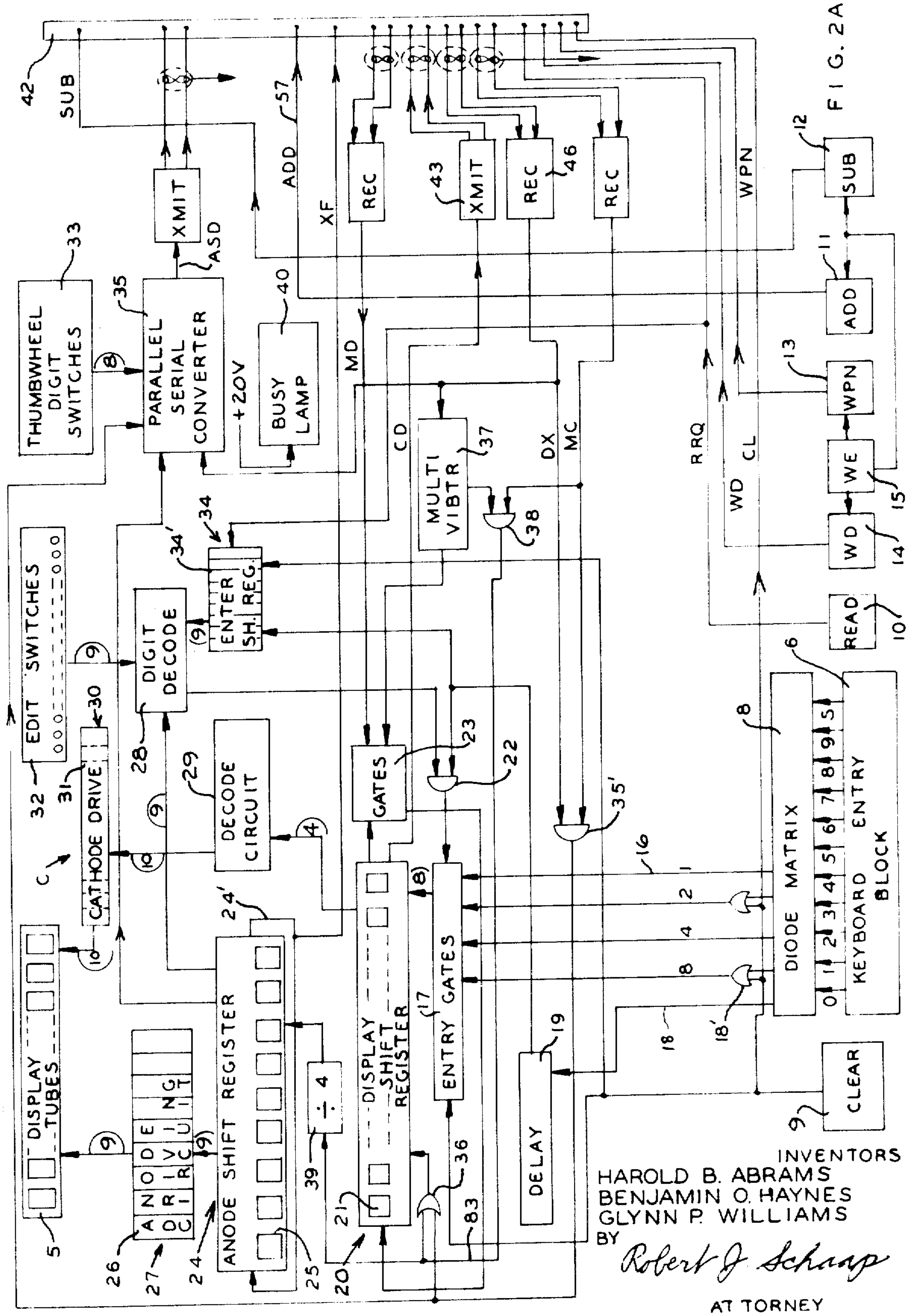

Referring now in more detail and by reference characters to the drawings which illustrate practical embodiments of the present invention, A designates an electronic data processing apparatus which generally comprises a console unit C and a central electronics unit E which includes a memory section M. The console unit C which is illustrated in FIG. 2A is provided for removable attachment and connection to the central electronics unit E, the latter being illustrated in FIG. 2B. It can thus be seen that terminal connectors may be provided on the console unit which may be located in a separate housing from the central electronics unit E for attachment to a like terminal on the central electronics unit E. Accordingly, it can be seen that a plurality of console units C can be conveniently connected to one central electronics unit E. In like manner, it should be observed that both the console unit C and the central electronics unit E can be conveniently mounted in one housing as a unitary assembly.

The console unit C, which is functionally illustrated in FIG. 2A, generally comprises an outer housing 1, which is provided with an upwardly inclined control panel 2 and a somewhat vertically located display panel 3, in the manner as illustrated in FIG. 1. The housing may be provided with removable closure plates (not shown) for providing access to the interior thereof, or the housing may be disposed upon and shiftable with respect to a base plate. Any suitable lightweight metal or moldable plastic material may be used in formation of the housing 1. The display panel 3 is cut away in the provision of a display aperature 4 to accommodate nine or more cold cathode display tubes 5.

Located on the control panel 2 is a keyboard entry block 6 having 11 keys 7 labeled 0 and 1 through 9 and "space" for purposes of introducing information such as part numbers and part data into the apparatus A. A suitable switch (not shown) which may form part of, or may be associated with each key 7 is connected to a diode matrix 8 which generally has a series of diodes connected in such fashion as to generate a BCD code equivalent to a decimal digit system. Accordingly, actuation of any one of the keys 7 representing a decimal digit will cause the generation of four bits in the BCD code to represent that decimal digit. The diode matrix 8 which is used for generating the BCD code is well within the design purview of the skilled artisan and is therefore neither illustrated nor described in any further detail herein.

A "clear" switch 9, a "read" switch 10, and "add" switch 11, a "subtract" switch 12, a "write part number" switch 13, a "write data" switch 14, and an "enable" switch 15 are all mounted on the control panel 2 in the manner as illustrated in FIG. 1. Each of these aforesaid switches, with the exception of the enable switch 15, are pushbutton switches and are capable of being pressed for actuation and which are biased to return to the deactuated condition. The enable switch 15 is an alternate action type switch and is operatively connected to the write part number switch 13, the write data switch 14, as well as the add switch 11, and the subtract switch 12 in order to enable actuation of these latter four switches in a manner to be described hereinafter. Thus, in order to actuate any of the four aforesaid switches, it is first necessary to actuate the enable switch 15. The various switches 9–15 all internally contain lights, such as small conventional incandescent bulbs so that the face of the switch will be light-displayed when the switch is ready for actuation. When the enable switch 15 is actuated and illuminated, the other switches such as the add switch 11, the subtract switch 12, the write part number switch 13, and the write data switch 14 are illuminated and may be actuated.

By further reference to FIG. 2A, it can be seen that the diode matrix 8 is provided with four exit lines 16 which are connected to parallel entry gates 17 and one line 18 which is connected to a delay 19 such as a one-shot. The four entry lines 16 are labeled "one", "two", "four", and "eight", which is representative of the BCD code bits transmitted to the parallel entry gates 17. The clear switch 9 also is connected along with the "two" and "eight" entry lines 16 to the parallel entry gates 17 through OR gates 18' in the manner as illustrated. The clear switch 9 employs a slightly modified form of BCD code, which uses a blank data position. For example, a BCD code of eight, four, two, one would have a blank position represented by 1010.

The parallel entry gates 17 are connected to a display shift register 20 by means of eight transference lines in the manner as illustrated in FIG. 2A. It should also be observed that the clear switch 9, keyboard 6, the read switch 11, the write data switch 14, the write part number switch 13, the enable switch 15, the add switch 11 and the subtract switch 12 are all available for operation inputs. The display shift register 20 is a circulating shift register and serves at least three major functions which are described hereinafter in more detail. The shift register 20 contains 36 serially connected bistable multivibrators (flip-flops) 21 so that the shift register 20 is capable of holding 36 bits of information at any point in time.

As indicated previously, information in decimal digit form is introduced into the apparatus through the keyboard 6 in BCD format. Actually, the apparatus is capable of handling information about a particular item such as a part number, and additional information, e.g. part data, regarding that part number. Accordingly, a first sector of 36 bits is generated to identify a particular part number. An additional sector of 36 bits is also generated and this latter sector includes a part data information about that part number.

The term "part number" as used herein represents a sector of a known number of bits, e.g. for the numeric apparatus — 36 bits, and for the alpha-numeric apparatus — 54 bits, and which sector of bits contains information identifying a particular good, item, service, or other element capable of being identified and addressed. However, the presently described embodiments of the present invention refers to such identified and addressed element as a "part number".

The term "part data" as used herein represents a sector of a known number of bits, e.g. for the numeric apparatus — 36 bits, and for the alpha-numeric apparatus — 54 bits, and which sector of bits contains information relating to a part number identified by the preceding sector of a known number of part number bits. The term "data" is used in its generic sense to represent a sector of a known number of bits, e.g. for the numeric apparatus — 36 bits, and for the alpha-numeric apparatus — 54 bits, and which bits contain useful information. Accordingly, a "data" sector of bits may represent a part number, part data or other allied information.

It should be recognized that while the present invention has been described in terms of apparatus for storing part numbers and respective data about those part numbers, that other types of information could be stored as well. For example, the first 36 bits could be used to represent an account number such as a credit card account number. The additional sector of 36 bits would then provide information about that particular account number. However, for purposes of illustrating and describing the present invention, the apparatus will be described in terms of storing and operating upon part numbers and part data associated with such part numbers. Naturally, if other types of information is to be stored, the nomenclature on the various pushbutton switches located on the control panel 2 would be altered accordingly.

For example, it could be assumed that the second sector of 36 bits representing part data about a part number ( nine decimal digits representing part data about the part number) will include three decimal digit positions for providing inventory quantity. The last three decimal digits of the decimal digit information, which is the least significant three digits, will represent such inventory data. The other six decimal digit positions can then be used in coded form to represent the name of the particular supplier, price, or location of the inventory, etc.

The output of the clear switch 9 is connected to one input of the parallel entry gates 17 and another input to the parallel entry gates 17 is received from an AND gate 22, the latter also having an input from the delay 19. Furthermore, the output of the clear switch 9 is connected in OR fashion with the 2 and 8 input lines 16 from the diode matrix 8 to the parallel entry gates 17 in the manner as previously described. The output of the display shift register 20 is connected to a plurality of serial gates 23, the output of which is, in turn, connected to the input of the display shift register 20 in order to enable recirculation through the display shift register 20.

The console unit C also includes an anode shift register 24 having nine serially connected flip-flops 25. The anode shift register 24 is provided with nine output lines which are connected to the inputs of nine anode drivers 26 forming part of an anode driving circuit 27. The output of each flip-flop 25 in the anode shift register 24 is individually connected to a single anode driver 26 in the anode driver circuit 27. In like manner, the anode driver circuit 27 has nine outputs which are each individually connected to the anode of one of the nine display tubes 5. The anode shift register 24 also has nine outputs which are connected to a digit decode circuit 28, the latter having an output which is connected to one of the input terminals of the AND gate 22. The display shift register 20 also includes four outputs from the last four flip-flops 21 representing the least significant bit positions, in the manner as illustrated in FIG. 2A, and which outputs are connected to a BCD to 10 line decode circuit 29. The decode circuit 29, in turn, has 10 output lines which are each individually connected to one of 10 cathode drivers 30 in a cathode driving circuit 31. The cathode driving circuit 31, in like manner, has 10 outputs which are each individually connected to the like cathodes of the nine display tubes 5 in parallel. For example, the 0 cathode output of the driving circuit 31 is connected to the 0 cathode of all of the display tubes 5, the 1 cathode output of the circuit 31 is connected to the 1 cathode of all of the display tubes 5, the 2 cathode output of the circuit 31 is connected to the 2 cathode of all of the display tubes 5, etc.

Also mounted on the control panel 2 in proximate relationship to the display tubes 5 are 9 digit change pushbutton-type switches or so-called "edit switches" 32, each one of which is associated with a particular display tube 5. Thus, in order to change any individual number appearing in any display tube 5, it is possible to merely press the switch 32 associated with such tube 5 simultaneously with the desired keyboard key 7. The digit change switches 32 each have an output which is connected to the digit decode circuit 28.

A two decade thumbwheel digit switch 33 is also mounted on the control panel 2 in the manner as illustrated in FIG. 2A, and actually consists of two sets of thumbwheels which are rotatable to the desired decimal digit position. The decimal digits are suitably imprinted on the peripheral surface of the two thumbwheels forming part of the switch 33. The digit switches 33 can actually be set on any decimal digit from 0 and 1 to 9. The thumbwheel digit switches 33 are useful in performing the arithmetic functions, such as addition and subtraction. If it is desired to subtract one number from part data, for example, this number is introduced into the apparatus through the thumbwheel switches 33. In like manner, addition of a number to a portion of the data is introduced by means of the thumbwheel switches 33. It should be recognized that any desired number of decoders could be used in the thumbwheel digit switches 33. Furthermore, it should also be understood that key operated switches or other switch-input means could be employed in place of the thumbwheel digit switches.

The console unit C also includes an enter shift register 34 formed of 9 serially connected flip-flops 34'. The outputs of each of the flip-flops 34' are also connected to the digit decode circuit 28 in the manner as illustrated in FIG. 2A. The enter shift register 34 also has one input received from the delay 19 and another input which is connected to the clear switch 9 and a further input from the read switch 10, for reasons which will presently more fully appear.

The output of the thumbwheel switches 33 is connected to a parallel to serial converter 35, the latter also receiving an input from the anode shift register 24 and a data transfer information input from the central electronics unit E on a DX line. The converter 35 also receives an input from an AND gate 35 which in turn, receives data transfer information over the DX line and memory clock information over an MC line from the central electronics unit E in a manner to be hereinafter described in detail. The output of the AND gate 35' is connected to an OR gate 36 which is, in turn, connected to the display shift register 20 in the manner as illustrated in FIG. 2A. A delay multivibrator 37 is included in the console unit C and receives a data transfer information input from the central electronics unit E and has an output connected to the gates 23. The multivibrator 37 has another output connected to an AND gate 38, and the other input of which receives memory clock information from the central electronics unit E over the MC line. The output of the AND gate 38 is "ored" with the output of the AND gate 35' at the OR gate 36, and the output of the AND gate 38 is also connected to a divide by four counter 39. It can be seen that the divide by four counter 39, is in turn, connected to the input of the anode shift register 24.

The anode drivers 26 in the anode driving circuit 27 actually serve as level converters receiving inputs from the nine bit anode shift register 24. As previously indicated, the display shift register 20 with the attendant gates 23 actually serves as a circulating shift register, where bits are sequentially shifted in a clockwise position, reference being made to FIG. 2A. Each time the display shift register 20 is shifted four bit positions, four new bits will be located in the last four stages of the shift register, and these four bits describe the next decimal digit to be displayed. The BCD to 10-line decode circuit 29 examines these four bits and determines which decimal digit numeral these four bits may represent. At this point, it can be observed that the anode shift register 24 has been shifted one bit, thus energizing the required display tube anode. Furthermore, the four bits have been decoded to 10 bits through the BCD to 10 line decode circuit 29 in order to represent one of the 10 decimal digit numbers.

All of the 0 cathodes of each of the display tubes are connected to one cathode driver. Thus, if the four bits shifted into the rightmost four bit position of the display shift register 20 were zeroes, the four bits would, in fact, decode as a zero. Furthermore, the selected cathode driver resulting from this examination of the zero would be switched to a ground condition. All bits in the anode shift register 24 are permitted to circulate and one true bit will cause a selected anode driver to be driven from a 0 voltage state to a 170–230 volt state. As indicated, only one of the 9 anode drivers 26 in the anode driving circuit 27 will be energized at any one point in time. Accordingly, if a zero was being examined, a zero in the display tube will be illuminated for a time determined by the delay multivibrator 37. The display shift register 20 again causes a shifting of four bits to the right. These four bits are reduced to one bit by the divide by four counter 29 and shift the anode shift register 24 one bit. The proper anode driver 26 along with a corresponding cathode is selected and the next tube 5 is, in turn, energized to its proper numeric display when the anode driver has been energized to a 170–230 volt state.

Since the anode shift register 24 has nine stages, each stage of this register 24 will represent 1 digit. The last stage, that is the right hand stage, as illustrated in FIG. 2A, will represent the least significant digit. One of the stages in the anode shift register 24 will be true when the four bits representative of this stage are located in the anode shift register 24. Accordingly, all transfers will take place with the least significant bit first. Furthermore, when the particular stage is true, the data contained in the display shift register 20 is serially aligned with the least significant bit in the first position. The output of this stage is then transferred to the central electronics unit E in a manner to be hereinafter described in more detail.

As indicated previously, the keyboard 6 contains eleven key operated switches 7 which are used to enter information into the display shift register 20 through the parallel entry gates 17. The diode matrix 8 codes the decimal digit input into BCD format so that the bits of this BCD code are all strobed into the parallel entry gates 17. By reference to FIG. 2A, it can be observed that the four lines 16 extend from the diode matrix 8 to the parallel entry gates 17 and represent the four bits of the BCD code. In addition, a strobe line 18 extends from the diode matrix 8 to the delay 19. By reference to FIG. 2A, it can be seen that only four lines 16 are illustrated as extending from the diode matrix 8 to the parallel entry gate 17; but in actuality, 8 wires extend from the diode matrix 8 to the gate 17 since 4 of these wires are the complements of the 4 wires 16 as illustrated. These complements are needed for proper entry of the BCD data into the flip-flops contained in the parallel entry gates 17.

Typically, the keys 7 of the type normally employed in the keyboard 6 will bounce for a few milliseconds when actuated due to the elasticity of the metal-metal contact in the switches. Each key will be capable of rendering a 5-volt output when it is actuated. Accordingly, a 12 millisecond delay is created by the delay 19 before an output from the diode matrix 8 is rendered in order to provide sufficient time to eliminate any rebound vibration resulting from bouncing effects in the keys 7. An output strobe from the diode matrix 8 will thereupon permit entry of this data into the parallel entry gates 17.

The enter shift register 34 contains 9 stages 34' as previously expressed. Initially, upon actuation of any key 7, it is desired to have the most significant digit represented by that key to light up in the display tube 5. Upon actuation of a key 7, four bits representing a digit are entered into the display shift register 20. Each time a key 7 is actuated, the digits shift or "step-down". At this juncture, it is to be noted that the outputs of the anode shift register 24 are connected to the digit decode circuit 28. The bits which have been entered into the display shift register 20 are essentially circulating once every 100 microseconds for 4 microseconds.

Prior to the entry of any new part number address into the shift register 20, the clear switch 17 is actuated and, hence, the shift register 20 will contain all blank spaces of a blank space code. When any one of the keys 7 is actuated, four bits representing the most significant character, that is the first character or leftmost character of the nine characters, are generated in the diode matrix 8 and entered into the entry gates 17. By reference to FIG. 2A, it can be seen that the entry gates have eight lines, and these eight lines are connected to opposite inputs of the last four flip-flops 21 of the displacy shift register 20. As indicated, these four bits initially represent the most significant character of the nine characters which are entered into the display shift register 20. Inasmuch as the bits which are entered into the shift register 20 are continually circulating, the bits representing each of the nine characters will be ultimately entered into the last four flip-flops 21 of the shift register 20.

The anode shift register 24 is also provided with a recirculating line 24' so that the nine bits contained in the anode shift register 24 are continually circulating. However, only one stage (anode driver 25) can be true at any point in time. The first anode driver 25 (that is the driver 25 located on the left end position of the anode shift register 24) represents the most significant stage. As indicated previously, the four bits which represent the most significant character were entered into the parallel entry gates 17. These four bits are only entered into the last four flip-flops 21 of the display shift register 20 when the most significant stage (driver 25) of the anode shift register 24 is true.

Actuation of a second key 7 on the keyboard 6 will generate four more bits which will also enter through the parallel entry gates 17 into the last four flip-flops 21 of the shift register 20 when the second anode driver 25 is rendered true. This sequence continually takes place until all desired bits have been entered into the display shift register 20 from the keyboard 6 through selective shifting of the true stage of the anode shift register 24.

Each time that a key 7 on the keyboard 6 is released a strobe from the diode matrix 8 through the delay 19 is entered into the enter shift register 34, thereby causing successive stages to the right to be rendered true in the enter shift register 34. After the ninth key 7 has been actuated, it is impossible to introduce any further characters into the display shift register 20 inasmuch as the enter shift register 34 is only capable of shifting to nine successive stages 34'. The digit decode circuit 28 advises when the four bits of interest are in the proper stages (flip-flop 21) of the display shift register 20, by comparing the location of the true bit in the anode shift register 24 with the required bit location as defined by the position of the true bit in the enter shift register 34. When a key 7 is actuated, a pulse is generated for the length of time that the four bits of interest are in the four least significant stages of the anode shift register 24. When the corresponding stages of the enter shift register 34 and the anode shift register 24 contain a bit at coincident times, as compared by the digit decode circuit 28, a pulse will be generated by the digit decode circuit 28. This pulse from the digit decode circuit 28 lasts for approximately 100 microseconds. Each time the four bits that correspond to the enter decimal digit are located in the last four flip-flops of the anode shift register 24 and the last four stages of the enter shift register 34, a pulse will be generated by the circuit 28 enabling display through the display tubes 5.

The delay multivibrator 37 provides for a 100 microsecond delay after the strobing of a display tube 5 so that each display tube 5 remains energized for the 100 microseconds. Thereafter, four new bits representing a decimal digit character are shifted in the display shift register 20 and a new decimal digit character representing the next four least significant bits is displayed on the display tubes 5. As four bits are shifted into the last four bit position of the display shift register 20, these four bits are also presented to the BCD to 10 line decoder 29 in order to provide for energization of a new cathode driver 30 in the cathode driving circuit 31. Simultaneously therewith, shifting will also occur in the anode shift register 24. However, as shifting occurs by four bit positions in the display shift register 20, shifting in the anode shift register 24 will occur for one bit position by virtue of the divide by four counter 39. Upon completion of the shifting in the display shift register 20 and the anode shift register 24, a signal is transmitted to the delay multivibrator 37 to permit a 100 microsecond delay, thereby permitting each display tube 5 to be energized for 100 microseconds in consecutive display order. It should be observed that the proper display tube 5 will be energized upon shifting of a particular cathode driver 30 and a particular anode driver 26 to the energized position.

Figure 2B:
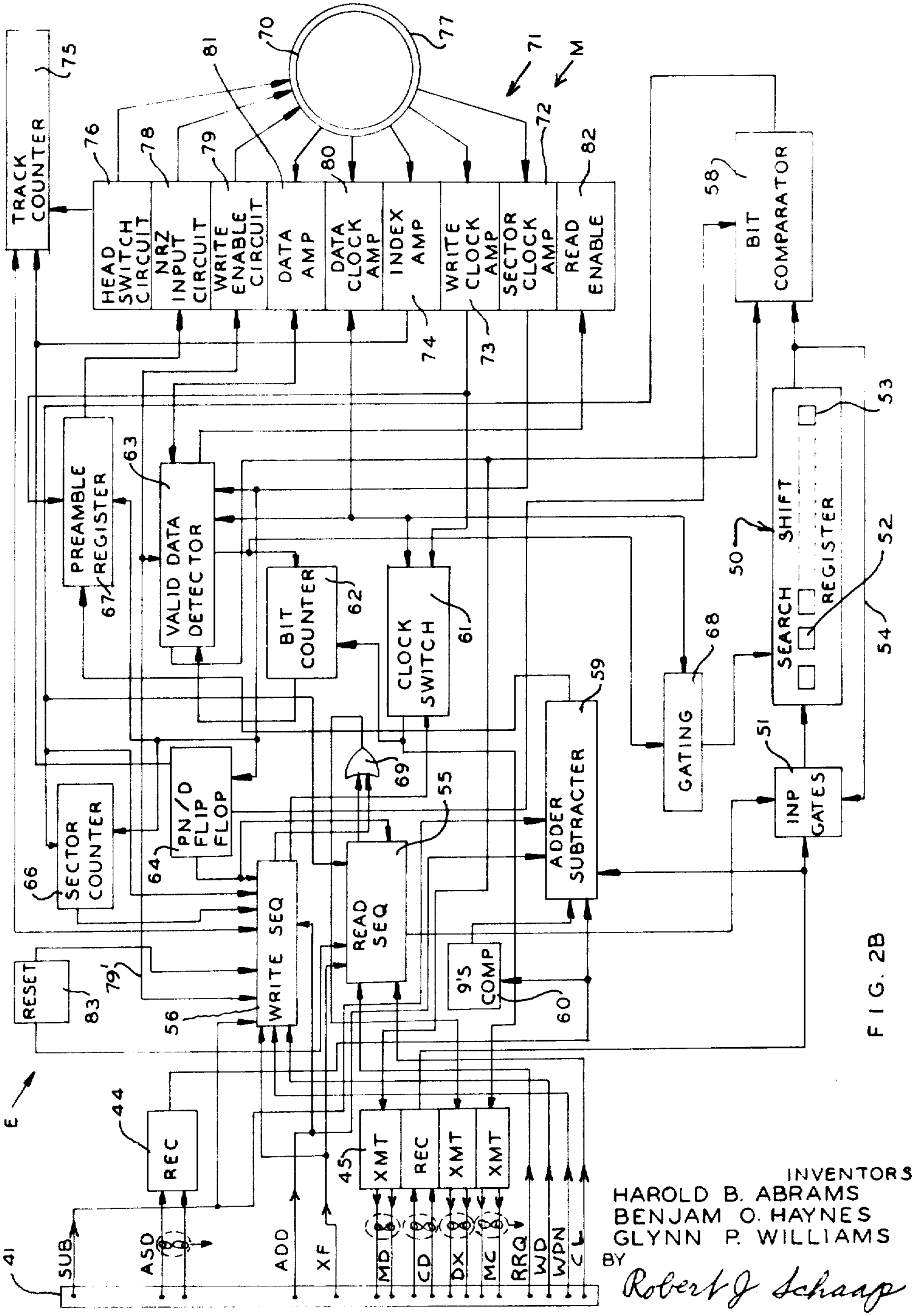
Figure 3:
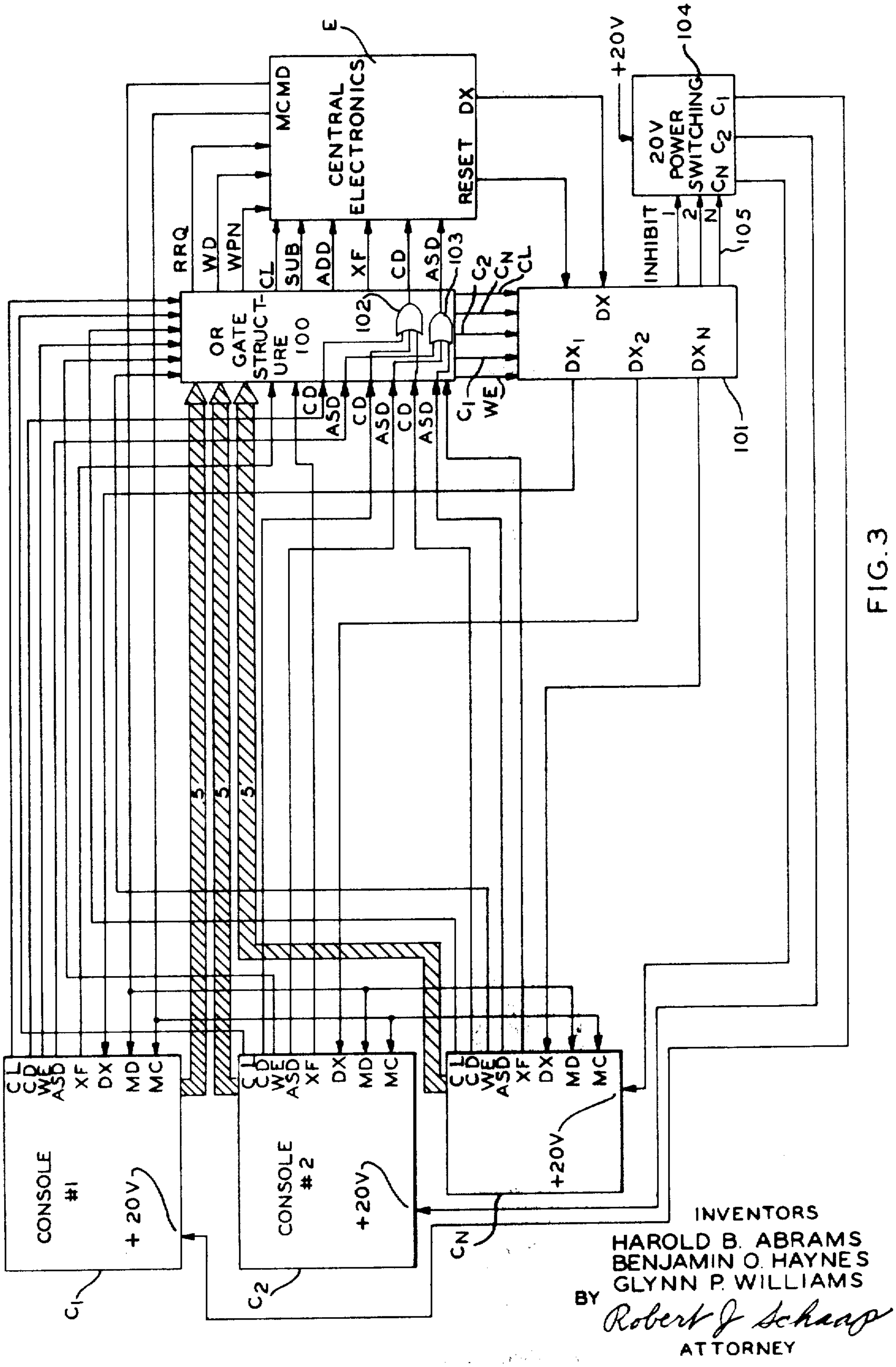
FIG. 3 is a schematic view of the electrical circuitry employed when multiple console units are interfaced with a single central electronics unit.

By reference to the composite views of FIGS. 2A and 2B, it can be seen that the console unit C can be removably connected to the central electronics unit E. Furthermore, a plurality of console units C can be connected to and operable from one central electronics unit E in a manner to be hereinafter described in more detail. In the event that more than one console unit C is employed, the various console units will contain a lamp 40 labeled "busy lamp" and which is located on the control panel 2. However, it should be recognized that the lamp 40 could be included in any one of the pushbutton switches such as the read switch 10. The busy lamp 40 is essentially only connected to a multiplexer used with multiple console units through a plus 20 volt power switching line. This plus 20 volt power switching line is connected to the multiplexer as illustrated in FIG. 3, the latter to be hereinafter described in more detail. This busy lamp 40 will provide indication of use of the central electronics unit E by other remotely located console units C.

The central electronics unit E also has a number of connectors which terminate at contacts on a terminal board 41 as illustrated in FIG. 2B. The contacts on the terminal board 41 are compatible with mating lines from the console unit C which are connected to contacts on a suitable terminal board 42, as illustrated in FIG. 2A. Thus, it should be recognized that the console unit C and the central electronics unit E can be conveniently formed as a unitary assembly in the housing 1 as illustrated in FIG. 1. Furthermore, these units can be formed as two distinct and separable units which are capable of removable connection to each other.

In order to view the composite view of FIGS. 2A and 2B, as a unitary circuit, it is only necessary to envision a connection of the various contacts presented in the terminal boards 41 and 42 as presented in FIGS. 2B and 2A, respectively. The console unit C includes a transfer line designated as XF which is connected to the anode shift register 24, and which is, in turn, capable of connection to the central electronics unit E. The console unit C also includes a memory data line designated as MD and which is connected to an input of the serial gates 23, and which is also connected to the central electronics unit E. A console data line designated as CD is connected to one output of the display shift register 20 and is connected to the central electronics unit E. Furthermore, the console unit C includes the data transfer line designated as DX which is connected to the central electronics unit E and which is connected to an input of the delay multivibrator 37 serving as an inhibit to the delay multivibrator 37. The data transfer line DX is also connected to the parallel to serial converter 35 as indicated previously for purposes of initiating conversion on a clock time basis. The data transfer line DX is also connected to the AND gate 35' so that information on the memory data line MD can be entered into the shift register 20.

The console unit C also includes the memory clock line designated as MC which is connected to the central electronics unit E and to one input of the AND gate 35'. It can be seen by reference to FIG. 2A that one input of the AND gate 38 is also connected to the memory clock line MC. Furthermore, the other input of the AND gate 35' is connected to the data transfer line DX. The output of the AND gate 35' is connected to the OR gate 36 all in the manner as previously described.

The output of the read switch 10 is transmitted over a read request line designated as RRQ which is, in turn, provided for connection to the central electronics unit E. In like manner, the output of the write data switch 14 is transmitted to a write data line designated as WD and which is also provided for connection to the central electronics unit E. Furthermore, the clear switch 9 has an output line designated as CL and the write part number switch 13 has a write part number output line designated as WPN which are both provided for connection to the central electronics unit E. These latter groups of switches, namely the clear switch 9, the read switch 10, the write data switch 14, and the write part number switch 13, are all provided for adding information to or retrieving information from the memory section M forming part of the central electronics unit E.

The add switch 11 has an output line designated ADD and the subtract switch 12 has an output line designated SUB, and both such lines are provided for connection to the central electronics unit E. Furthermore, the parallel to serial converter 34 has an output line designated as ASD representing "add-subtract data" and which is provided for connection to the central electronics unit E.

By reference to FIGS. 2A and 2B, it can be seen that the outputs of the console unit C are provided with transmitters 43 prior to connection to the contracts on the terminal board 42. In like manner, the respective compatible lines on the central electronics unit E which receive the outputs from the console unit C are provided with receivers 44. Furthermore, the outputs of the central electronics unit E are provided with transmitters 45 prior to connection to the contacts on the terminal board 41. In like manner the respective compatible lines in the console unit C which receive these outputs from the central electronics unit E are provided with receivers 46. By reference to FIGS. 2A and 2B it can be observed that each transmitter 43 and 45 has paired output lines and each receiver 44 and 46 has paired input lines. Furthermore, the paired output and input lines are shielded and the shields are grounded.

It should be recognized that the various lines connecting the console unit C and the central electronics unit E contain data for high-speed transfer and these lines may have considerable length. For example, a clock pulse from the memory section M must travel the distance to the display shift register 20 and back to the memory section M on the basis of a high-speed operation. However, the lines carrying these data contain relatively low logic levels. Accordingly, the transmitters 43, 45 are low impedance drivers which are capable of supplying sufficient current to drive the lines when loaded with their characteristic impedance levels. The receivers 44, 46 are differential amplifiers with logic level outputs.

The central electronics unit E comprises a search shift register 50 which is controlled by a plurality of input gates 51, and receives console data from the output of the display shift register 20 over the console data line CD. The search shift register 50 which also functions in part as a "memory associative address register" contains a group of four eight bit shift registers 52 and one 4 bit shift register 53. In essence, these shift registers 52, 53 function as a group of flip-flops which are cascaded. The search shift register 50 is not the equivalent of a standard memory address register in that it serves an active role in comparison operations to be hereinafter described. The search shift register 50 is provided with a recirculate line 54 extending from its output to the gates 51, in the manner as illustrated in FIG. 2B. The recirculate line 54 enables the shift register 50 to perform a circular right shift at selected times. It can be seen that the four 8 bit shift registers which serve as four groups of eight flip-flops provide for 32 bits of data and the one four bit shift register provides for four bits of data, allowing for the 36 bits representative of one sector of part number. The group of functional flip-flops at the left-hand end of the search shift register 50, reference being made to FIG. 2B, represent the most significant bit positions and the functional flip-flops at the right-hand end of the search shift register 50 represent the least significant bit positions. Accordingly, one sector of 36 bits can be entered into the search shift register 50 through the input gates 51 with the least significant bits initially located in the most significant bit positions and shifted down so that the least significant bits are located in the least significant bit positions. Since the data may be loaded onto the search shift register with the least significant bit first, the data can be removed from this register 50 in the same manner with the least significant bit first.

Data transfer from the console unit C may be initiated by the read request RRQ line which is provided for connection to a read sequencer 55 forming part of the central electronics unit E, and over the write data line WD to a write sequencer 56 which also forms part of the central electronics unit E. By reference to FIGS. 2A and 2B, it can be seen that the read request line RRQ is connected to the read sequencer 55 and the write data line WD and the write part number line WPN are both connected to the write sequencer 56. In like manner, the clear line CL is provided for connection to the read sequencer 55. The output of the search shift register 50 is connected to a bit comparator 58 which has its output also connected to one input of the read sequencer 55, to one input of the write sequencer 56 and one input of the sector counter 66. In addition, the outputs of the add switch 11 and the subtract switch 12 which are carrier over the add line ADD and the subtract line SUB, respectively, are also provided for connection to the write sequencer 56, in the manner as illustrated in FIG. 2B.

The data which is provided for addition and subtraction is introduced into the console unit C by means of the thumbwheel digit switches 33. This data is converted in the parallel to serial converter 35 and transmitted over the add/subtract data line ASD provided for operative connection to a serial BCD adder/subtractor 59, the latter also being located in the central electronics unit E. The add/subtract data on the ASD line is also introduced into a BCD to 9's complement generator 60 which serves to place the add/subtract data in proper condition for subtraction, and the output of the BCD to 9's complement generator is transmitted to the adder/subtracter 59. By further reference to FIG. 2B, it can be seen that the serial BCD adder/subtracter 59 receives the add signal over the ADD line and the subtract signal from the subtract switch 12 over the SUB line, as well as console data over the console data line CD.

It should be observed that the read switch 10 does not interface with any portion of the console unit C; but rather is provided for connection to the read sequencer 55. In this manner, actuation of the read switch 10 provides an advisory signal to the read sequencer 55 that the address of data to be searched is located in the display shift register 20. The read sequencer 55 also has an output connected to the gates 51 to operate the input to the search shift register 50. Thus, the read sequencer serves in controlling the shifting of the data from the display shift register 20 to the search shift register 50. The write sequencer 56 also has an output connected to a clock switch 61 for controlling clock pulses in order to enable initiation and commencement of writing on the basis of a 36 bit sector. The write sequencer 56 detects the beginning of a 36 bit sector and then enables the shifting of 36 bits through the memory clock line MC. It can be observed that the write sequencer serves a multitude of functions in performing the writing of part numbers and part data in the memory section M, as well as the performance of simple arithmetic functions on the part data.

The clock switch 61 is connected to the memory clock line MC for providing memory clock pulses to the AND gate 35' in the console unit C and hence to the display shift register 20. The memory clock line MC is also connected to a bit counter 62 which is, in turn, connected to one input of a valid data detector 63. The valid data detector 63 is capable of receiving non-return to zero data or so-called "NRZ data" from the memory section M in a manner hereinafter described and producing an NRZ output which is transmitted to the bit comparator 58, the bit counter 62, and the memory data line MD for transmission of this data to the serial gates 23 in the console unit C. The valid data detector 63 also serves as a device for removing both a preamble and a postamble added to both part number sectors and part data sectors before the part numbers and part data are introduced into the memory section M.

The central electronics unit E also includes a part number/data flip-flop 64 which is analogous to a fetch/execute flip-flop in such manner that if the flip-flop is in a "set" condition, the electronics operates on part data sectors. If the flip-flop 64 is in a "reset" condition, the electronics operates on part number sectors. This flip-flop 64 thereby enables comparison of a part number with a part number and prevents comparison of a part number with the part data associated with part numbers. Accordingly, comparison is performed on every other sector of 36 bits located in the memory section M. The outputs of the comparator 58 is examined only after 36 bits have been compared and only if this 36 bits is a part number as detected by the flip-flop 64. It can be observed that an inhibit line 65 extends from one output of the flip-flop 64 to the bit comparator 58 and prevents the bit comparator 58 from providing an output unless the output is representative of a part number. Accordingly, if the part number/data flip-flop 64 is in the reset condition, this condition will be indicative of a part number sector; and if the flip-flop 64 is in a set condition, this condition will be indicative of a part data sector. It should be observed that more than one part number/data flip-flop 64 could be provided in the event that more than one sector of part data was desired at any point in time.

The central electronics unit E also includes a modulo 796 sector counter 66. In the memory section hereinafter described, 797 sectors are located on each track and the sector counter 66 controls track selection so that when the counter 66 is reset, the track counter in the memory section M is inhibited. In this manner, no tracks can be counted and no tracks can be changed. When the sector counter 66 achieves a count of 796 bits, this count is representative of a beginning of a new sector in which it is possible to write part numbers. Both the serial BCD adder/ subtractor 59 and the sector counter 66 receive sector clock pulses from the memory section M in a manner hereinafter described. In like manner, the valid data detector 63 receives sector clock pulses.

The electronics section E also includes a preamble register 67 which serves to write a preamble and a postamble along with any data as it is introduced into the memory section M. The preamble consists of eight zeroes followed by a one. The preamble always precedes any part number of data which is to be written on the drum in order to allow synchronization of the read electronics on playback. The first eight zeroes of the preamble allows sufficient time for the read electronics (data amplifier 81) to synchronize on the head output signal from the memory section M. A postamble of two zeroes is added to each part number and each part data which is introduced into the memory section M. The postamble serves to insure that all of the permanent bits contained in any part number or any part data has in fact been written in the memory section M.

The valid data detector 63 actually serves as a preamble and postamble removal as previously described so that the pertinent bits contained in any sector may be read or operated upon. Accordingly, the valid data detector 63 is a type of decoder which is used with the memory section circuitry employed. Data read from the memory section M actaully consists of data on a data track as well as clock pulses derived from the data in a manner to be hereinafter described in detail.

The valid data detector 63 will recognize the preamble within any part number sector or part data sector. In recognizing a preamble, the valid data detector 63 will determine when the preamble "one" occurs. This is determined by disregarding the read data subsequent to sector clock for an amount of time determined by a one-shot multivibrator (not shown). The read enable circuit 83 is then enabled, and the first data "one" received is the preamble "one". The valid data detector 63 is then capable of disregarding the preamble and postamble associated with any sector and generating a clock couput for transmission to the bit counter 58. Furthermore, since it is undesirable to count preamble and postamble clock pulses, the bit counter 58 will only start counting when the valid data detector 63 sends a clock pulse signal to the bit counter 58 which occurs after the preamble and postamble removal.

The valid data detector 63 also has an output connected to a shift register gating 68, the latter being connected to the shift register 50 in the manner as illustrated in FIG. 2B. The outputs of the read sequencer 55 and the write sequencer 56 are ored in an OR gate 69 and the output of the OR gate 69 is in turn connected to the transfer line DX. By further reference to FIG. 2B, it can be seen that the sector counter 66 has one output connected to the write sequencer 56 and that the part number/data flip-flop 64 has inputs to the read sequencer 55 and the write sequencer 56.

The memory section M, which is more fully illustrated in FIG. 2B, comprises a magnetic drum or disc 70 of the type normally used in digital computing equipment and which is capable of having NRZ data written thereon. Furthermore, it should be observed that the drum 70 may be of a metallic disc having a magnetic recording surface disposed on the annular surface thereof. The memory section M includes an electronic circuit or so-called "memory electronics" 71 which comprises a sector clock amplifier 72 providing sector clock pulses to the valid data detector 63, the part number/data flip-flop 64, the sector counter 66 and the preamble register 67. The sector clock pulse is generated from the drum 70 at the end of each sector of part number or sector of part data. The memory electronics 71 also includes a write clock amplifier 73 which has an output connected to both the preamble register 67 and the clock switch 61. The write clock amplifier 73 is capable of generating write clock pulses which are used to clock the part data and part numbers on the drum 70. Furthermore, by reference to composite FIGS. 2A and 2B, it can be seen that the write clock amplifier 73 provides memory clock data to the display shift register 20 for recirculating the data therein on a memory clock time basis. In essence, the clock pulses control the various components in the console unit C so that the console unit C operates on and transmits data on a memory clock basis.

The memory electronics 71 also includes an index amplifier 74 having an input from the drum 70 and an output which is connected to a modulo T-track counter 75 where T is the number of tracks. The modulo T-track counter 75 also has an inhibit input from the write sequencer 56 for reasons which will presently more fully appear. The index amplifier 74 generates an index pulse at the end of each track on the drum 70 to enable the track counter to perform track switching functions. Furthermore, the output of the index amplifier 74 provides a reset signal to the part number/data flip-flop 64 for resetting of this latter component. The modulo T-track counter 75 is connected to a head switching circuit 76 which forms part of the memory electronics M and operatively controls a plurality of magnetic read-write heads 77. The heads 77 are located in close proximity to the surface of the drum 70 and are illustrated as a circle in FIG. 2B. An individual read-write head is associated with each of the T-tracks on the drum 70. When the index amplifier 74 generates a clock pulse, the track counter 75 will energize the head switching circuit 75 in such manner that it causes the head 77 associated with one track to be switched off and the head 77 associated with the next adjacent track on the drum 70 to be energized. At this point, it should be recognized that the drum 70 contains a total number of sectors on each track which is equivalent to 37,360 bits per track. Furthermore, it should be observed that any number of tracks may be located on the drum 70, the number of which is limited only by the size of the drum 70. Moreover, the overall diameter of the drum 70 can be increased to provide space for recording additional sectors of 36 bits on each track on the drum 70.

The heads 77 which function as reading heads and writing heads are connected to an NRZ input circuit 78 and a write enable circuit 79 which also form part of the memory electronics 71, in the manner as illustrated in FIG. 2B. The NRZ input circuit 78 receives the information from the serial BCD adder/subtracter 59 through the preamble register 67 and permits this information to be written on the drum 70 in NRZ format. The write enable circuit 79 receives information from the write sequencer 56 over a write enable line 79' and enables the heads 77 to write both part numbers and part data on the surface of the drum 70. The memory electronics 71 also includes a data clock amplifier 80 which provides data clock pulses to the valid data detector 63, the clock switch 61 and the search shift register 50 through the gating 68. This generation of data clock pulses enables the thus described components to be operated on a memory clock basis. The memory electronics 71 also includes a data amplifier 81 which is capable of providing an NRZ output to the valid data detector 63, thus enabling the valid data detector 63 to remove preambles and postambles associated with each part number and part data sector on a synchronous time basis. Finally the memory electronics 71 includes a read enable amplifier 82 which receives an input from the valid data detector 63 for purposes of reading part numbers and part data from the drum 70.

A reset circuit 83 is connected to both the read sequencer 55 and the write sequencer 56. Furthermore, it should be observed that many of the components such as the part number/data flip-flop 64 and the preamble register 67 receives reset pulses from the memory section M. In essence, substantially all of the bistable devices, namely the flip-flops in the central electronics unit E must be reset at the initiation of energization of the central electronics unit E, with the exception of the memory address register 50. The reset pulse is designed to last for approximately 50 milliseconds subsequent to power turn on. The reset circuit 83 generally contains a capacitor circuit and a gating structure. Furthermore, by reference to FIG. 2B of the drawings, it can be seen that the preamble register 67 and the flip-flop 64 as previously described receive the reset signals from the memory section M. In the absence of a reset circuit, the sequencers and the flip-flops could arise in any condition, depending upon lags in the sequencers and the state of the various flip-flops. Furthermore, the absence of a reset circuit could well enable these various components to arise in a state where the logic was not capable of handling such states. In like manner, absence of a resetting of these components to a proper condition could result in data destruction.

OPERATION OF THE NUMERIC DATA SYSTEM

From the foregoing description of the Apparatus A, it can be observed that data may be entered into the console unit C by a plurality of techniques. First of all, both part numbers and part data associated with the part numbers can be introduced into the console unit C by means of actuation of the keys 7 on the keyboard 6. Secondly, data can be introduced in the console unit C, particularly for addition and subtraction functions, by means of the thumbwheel digit switches 33. Finally, data may be introduced into the console unit C by actuation of any one or more of the digit change switches 32. As indicated previously, data is introduced into the console unit C in such a manner that a part number which may contain as many as nine decimal digits is represented by a sector of 36 bits, or nine bytes, each having four bits. Thus, a part number will be represented by 36 bits and the part data associated with that part number will be represented by a second sector of 36 bits.

At the outset, all sector spaces on the drum 70 which are to receive part data bits and part number bits contain zeroes, and only zeroes. It should be recognized that an external device or internal supplemental logic (not shown) could be employed to initially introduce all zeroes into the part data bit positions and part number bit positions of each sector. Each sector of part numbers and data to be written on the drum 70 will contain the preamble "one" along with the eight preamble "zeroes," as previously described.

The apparatus is sized to accommodate a nine-digit part number. However, it should be recognized that the apparatus could be extended to accommodate more than nine decimal digits per sector by enlarging such items as the display shift register 20, the anode shift register 24, the enter shift register 36, the display tubes 5 and the anode driving circuit 27, etc. Adtuation of any one key 7 on the keyboard 6 will, through the diode matrix, generate four bits in a BCD code representative of that decimal digit. This information is strobed into the parallel entry gates 17 after a delay created by the delay 19 in order to eliminate bounce effects and the like from the keys 7.

It should be observed that when the keyboard switches 6 are actuated, the various display tubes 5 will be energized to display the information introduced into the display shift register 20, in the manner as previously described. In essence, the anode shift register 24 in combination with the anode driving circuit 27 and the cathode driving circuit 31 operate to collectively and consecutively energize each of the display tubes 5. Each digit represented by the display tube 5 is essentially visually depicted by the tube 5 for 100 microseconds. Thereafter, the display will shift to the next adjacent display tube 5 for an additional 100 microseconds. This procedure is automatic and based on the memory clock which is received from the drum 70 in conjunction with the delay multivibrator 37.

In actual operation, a group of 36 bits in a part number sector will be recorded on the drum 70 and this will be followed by a group of 36 bits in a part data sector. When it is desired to write a new part number on the drum 70, it is necessary to find an empty sector, that is, a part number sector which contains bits in BCD format representative of all decimal digit zeroes. The operator will actuate the clear switch 9 to introduce the blank code of one-zero-one-zero in all bit positions of the display shift register 20. The operator then actuates the zero keyboard key nine times in order to place all zeroes in the display shift register 20. Thereafter, the read switch 10 is actuated in order to find a location on the drum 70 which contains all zeroes in a part number sector. The read sequencer 55 is energized by a pulse from the read switch 10 over the read request line RRQ. The read sequencer 55 treats all zeroes in the same manner as it would treat a part number. The first part number sector on the drum 70 which has all zeroes is therefore deemed to be an empty part number sector and the read sequencer 55 will deem a comparison to have been made. In actual operation, this comparison is made by the search shift register 50.

It should be observed that information from the display shift register 20 is transferred over the console data line CD to the search shift register 50, at the time of actuation of the read switch 10. Furthermore, the gates 51 are energized in such a manner that this information over the console data line CD is entered into the search shift register 50. After all 36 bits in a part number sector have been introduced into the search shift register 50, the gates 51 are energized in such manner that the search shift register 50 will perform a circular right shift so that the 36 bits contained in the register 50 will be circulated through the recirculate line 54. At this point in time, data bits in the part number sectors on the drum will be read by the heads 77 through the read data amplifier 81 and transmitted to the bit comparator 58. Accordingly, the bits introduced into the search shift register 50 from the display shift register 20 will be serially compared with the bits read from the memory 70 in the bit comparator 58 on a bit-by-bit basis. After comparison has been achieved, the read sequencer 55 is energized.

The operator then introduces the new part number into the console unit C by actuating the clear switch 9 and then the selected keys 7. Thereafter, the operator will actuate the write part number switch 13. At this point, the write sequencer 56 is energized from a pulse that is transmitted over the write part number line WPN. The write sequencer 56 is in a state where it awaits the transfer signal XF from the console unit C. When the transfer signal XF is received, the write sequencer 56 energizes the data transfer line DX. The data transfer line DX will carry the initiated transfer signal and also inhibit any further shifting of the display shift register 20. Simultaneously, with the energizing of the data transfer line DX, the write sequencer 56 inhibits the memory clock line MC. It is to be noted that zeroes are still located in the search shift register 50 and in the display shift register 20 and so the first part number read from the drum 70 and having all zeroes will render a comparison. However, when comparison is achieved, the desired sector has passed the reading heads 77. The sector counter 66 is reset upon the determination of an empty part number slot or sector on the drum. As indicated previously, 797 sectors are located on each track of the drum 70. Accordingly, when a count of 796 has been achieved by the sector counter 66, the beginning of the sector in which comparison was found (the empty sector for the introducing of part number data), the memory clock line MC will be energized and the data to be written will be transferred from the display shift register 20 to the central electronics E for writing on the drum 70.

All shifts in the console unit C and the central electronics unit E are performed at the memory clock rate. During the time of shifting bits in the display shift register 20, no display tube 5 can be energized. Furthermore, it should be noted that recirculation of the bits in the display shift register 20 occurs at memory clock time and the memory clock pulses generated from the drum 70 is the only means for generating the shift pulses to enable recirculation of bits in the display shift register 20. In addition, the generation of clock pulses by the central electronics unit E clocks all other functions of the console unit C. However, it should be recognized that generation of clock pulses to be used in the shifting functions in the console C could be performed by a pulse generator as well. It should also be observed that where a plurality of consoles C are used with the same electronics unit E, each console unit C is controlled individually by means of the memory clock data generated from the drum 70.

The output of the AND gate 38 in combination with the output of the AND gate 35' will cause the shifting in the display shift register 20. The gate 38 is controlled by the delay multivibrator 37 which de-energizes the line to the gate 38 for 100 microseconds so that no shift pulses can be generated through a shift line 82 which extends between the output of the AND gate 38 and the OR gate 36.

After 100 microseconds, the delay multivibrator 37 enables the AND gate 38 and thereby permits shift pulses to be sent through the shift line 83. The first memory clock pulse or so-called "shift" pulse shifts the bits in the display shift register 20 one bit position and, furthermore, will provide one count. The second clock pulse shifts the bits in the display shift register 20 to a second bit position and provides a second count. In like manner, the third and fourth clock pulses shift the bits in the display shift register 20 to the third and fourth bit positions and provides the third and fourth counts. An output to the delay multivibrator 37 and which is generated by the divide by four counter 39 enables the energizing the delay multivibrator 37 for this 100 microsecond period. It should be observed by reference to FIG. 2A that the output of the divide by four counter 39 also serves to shift the anode shift register one bit to the right.

In order to locate part data associated with a particular part number, the part number is entered into this display shift register 20 by means of the keyboard 6. The operator of the apparatus A can check the validity of the entered part number by observing the display tubes 5. The anode shift register 24, the anode driving circuit 27 and the cathode driving circuit 31 are selectively and consecutively actuated to energize the display tubes 5 in order to display in decimal digit form, the information which has been introduced into the display shift register 20. After the part number has been entered, the operator will actuate the read switch 10. As indicated previously, transfer of information from the console unit C to the electronics unit E is initiated by actuation of the read switch 10. Actuation of the read switch 10 will energize the read sequencer 55 so that the latter recognizes data bits are located in the display shift register 20 for transfer. Inasmuch as the information in the display shift register 20 is continually circulated, it may not necessarily be in correct order for transfer on the basis of the least significant bit first. Accordingly, when the data is lined up in the display shift register, with the least significant bit in the least significant bit flip-flop 21, transfer can be initiated. At this point in time, the data transfer line DX will carry a transfer signal and also inhibit any further circulation of the bits in the display shift register 20 by inhibiting the delay multivibrator 37. This function will enable the transfer to take place with the least significant bit being first transferred. The bit counter 62 in combination with the valid data detector 63 enables the transmission of clock pulses in groups of 36 to the display shift register 20. At the beginning of the group of 36 clock pulses, the read sequencer 55 enables the shifting of memory clock pulses to the display shift register 20. The sector of 36 clock pulses enables the shifting of all 36 data bits contained in the display shift register 20 to the memory search shift register 50 in serial form. Furthermore, this transfer takes place at the drum clock rate which is approximately 1.2 megabits per second.

After these data bits have been transferred to the search shift register 50, the read sequencer 55 enables the gating 51 to permit circulation of the bits contained in the search shift register 50. Serial comparison of the data bits in the search shift register 50 will be performed with the bits read from the drum 70 in the manner as previously described. It should be observed that the first bit, which is the least significant bit in the search shift register 50 will be compared with the first bit read from the memory drum 70, in the bit comparator 58, and this first bit from the memory drum 70 is also the least significant bit in the sector of 36 bits located in the memory drum 70. Accordingly, all bits in the search shift register 50 will be compared against all bits of the sectors in the drum 70 until a comparison, as observed by the bit comparator 58, is found, and this comparison will be made against the least significant bits first in each sector on the drum 70.

After the search has been made and comparison has been found, the read sequencer will enable the transfer of the next sector of 36 bits to the display shift register 20. The next sector contains the part data associated with the part number which was previously entered into the display shift register 20. The read sequencer 55 essentially monitors the action of the bit comparator 58. During the search operation, the read sequencer 55 has been holding the data transfer line DX energized or in a true condition. During the time that the data is being searched in the search shift register 50, data is being transmitted to the display shift register 20. However, while transmission of data to the display shift register 20 may be continuing, the bits which have been transmitted to the display shift register 20, are not transferred to any other component in the console unit C. After this comparison has been made, the part number/data flip-flop 64, in conjunction with the read sequencer 55, deenergizes the data transfer line DX inasmuch as the part data has been transferred to the display shift register 20. Deenergization of the data transfer line DX will remove the inhibiting factor and thereby permit circulation to begin in the display shift register 20. It should be noted that the various part numbers which are recorded on the drum 70 are actually stored in random fashion, but the search which is employed to find this particular part number is systematic in order to obtain a systematic search of randomly stored information.

Writing of part data associated with a part number is similar to the writing of the part number itself, with the one exception that the sector counter 66 is not used. In order to introduce this data onto the drum 70, the desired part data is introduced into the apparatus A by means of actuating the keys 7 on the keyboard 6. The data introduced will be transferred to the display shift register 20 and, in like manner, will be displayed for visual observation by the display tubes 5, in the manner as previously described. The part data is written onto the drum 70 by actuation of the write data switch 14. Actuation of the switch 14 will energize the write sequencer 56 to permit the new part data to be written into a part data sector positionally located with the particular associated part number on the drum 70.

It is possible to simply change any one or more decimal digits contained in a part number or in part data associated with the part number by operation of the digit change switches 32. In the event that it is desirable to change a digit in a part number, the part number is introduced into the display shift register 20 through actuation of the keys 7 on the keyboard 6. The combination of the anode shift register 24, the anode driving circuit 27 and the cathode driving circuit 31, as well as the other attendant components previously described, will enable the decimal digits of this part number to be displayed in the display panel 4. In order to change any selected decimal digit appearing in any display tube 5, the digit change switch 32 located immediately beneath the tube 5 is pressed. The operator then actuates the proper key 7 on the keyboard 6 for introduction of the new decimal digit and substitution of the desired new decimal digit for the existing digit and the desired new decimal digit will be displayed in the display tube 5.

It should be observed that the digit change switches 32 are each connected to the digit decode circuit 28 which will operate to introduce the new information into the display shift register 20 through the gate 22 and the parallel entry gates 17. It can also be observed that the output of the digit decode circuit 28 is anded in the AND gate 22 with the strobe from the diode matrix 8 through the delay 19. An output from the digit decode circuit 28 will occur when the four bits representing the character to be changed are located in the least significant bit positions (flip-flops 21) of the display shift register 20.

When one of the character edit switches 32 is actuated, an output from the anode shift register 24 will occur when the stage of the anode shift register 24 associated with that particular edit switch 32 is rendered true. For example, if the operator actuates the seventh character edit switch, an output from the digit decode circuit 28 will occur when the seventh stage of the anode shift register 24 is rendered true. One of the keys 7 on the keyboard entry block 6 is actuated after the actuation of a character edit switch 32. Actuation of this key 7 will generate four bits through the diode matrix 8 and which four bits are introduced into the parallel entry gate 17. Again, these four bits will only enter into the last four bit positions of the display shift register 20 when a strobe is received at the gate 22. Furthermore, these four bits will only enter the last four bit positions of the display shift register 20 when the seventh stage of the anode shift register 24 is rendered true.

It should also be observed that part data associated with any part number can be changed in like manner. In order to locate the part data on the drum 70 the proper part number is introduced into the display shift register 20 through the keyboard 6 and the read switch 10 is actuated. After comparison has been found by the bit comparator 58, the part data associated with the introduced part number is then shifted to the display shift register 20 in the manner as previously described. This data will then be digitally depicted by means of the display tubes 5. Again, any particular decimal digit number appearing in the display tubes 5 can be changed by proper actuation of the associated digit change switch 32. It should be observed that an actuation of any of the digit change switches 32 will generate four bits representative of the desired digits and this byte of four bits will replace the four bits in the display shift register 20 which represents the decimal digits to be deleted from the data.

Addition and subtraction to part data can be performed by actuation of the add switch 11 or the subtract switch 12 in combination with the thumbwheel digit switches 33. The part data associated with a part number is found by introducing the part number into the shift register and searching for the comparable part number on the drum 70 in the manner as described. After the part number has been found, the part data associated with that part number can be read from the drum 70 and transferred to the display shift register 20 in the manner as previously described. Accordingly, all 36 bits representing the nine digit part data are introduced into the 36 flip-flops 21 of the display shift register 20. Furthermore, these 36 bits will appear in decimal digit form by way of the nine display tubes 5. Changes in the part data decimal digits as they appear in the display tubes 5 can be made by addition and subtraction through entry of information through the thumbwheel switches 33. Thus, if it is desired to add a number to any one or more of the decimal digits as displayed on the display tubes 5, this number is introduced by the thumbwheel switch 33.

It is to be noted that the data for addition and subtraction must be in serial form, but the data generated by means of the two decades of thumbwheel switches 33 is generated in parallel form. The parallel to serial convertor 35 will convert the parallel generated bits from the digit switches 33 into serial format and will transfer the same to the serial BCD adder/subtracter 59 and the nines complement generator 60. In like manner, the data bits contained in the display shift register 20 will be transmitted over the console data line CD to the serial BCD adder/subtracter 59. Addition of these streams of bits from the register 20 and the parallel to serial convertor 35, can only take place when the least significant bit of each of the bit sectors is located in such order that it is the first bit in the sector to be received by the serial BCD adder/subtracter 59. Furthermore, the bit streams from both the convertor 35 and the shift register 20 are shifted by means of clock pulses from the central electronics unit E.

Upon actuation of the add switch 11, the write sequencer 56 is energized to recognize the change of data contained in the display shift register 20. A bit is taken from both the parallel to serial convertor 35 and the display shift register 20 and transmitted to the adder/subtracter 59 on a clock time basis. This bit, if unchanged, is written on the adder/subtracter 70 in the location from which it was previously removed. Otherwise, the sum of these bits is written on the drum 70 in this drum location. The search shift register 50 will enable the loading of the 36 modified bits in the same sector location from which the bits were previously read. At the leading edge of the sector clock pulse, the write sequencer 56 will permit the writing of the new or revised data in the BCD adder/subtracter 59 onto the drum, and this data is then transferred to the preamble register 67. Thereafter, a preamble and postamble are recorded with the data on the drum 70.

Subtraction functions are similar to the function of addition except that the subtract switch 12 is used. However a conversion must be made when subtracting when opposed to adding. The nine's complement of the number must be added in a subtraction function, and, accordingly, the BCD to nine's complement generator 60 is provided. The remainder of the subtraction function is substantially identical to that of addition.

It should be observed that the subtract switch 12 is connected directly to the write sequencer 56 and to the adder/subtracter 59. Since the data to be subtracted has been introduced by the decimal digit switches 33, the information introduced by these switches has been transferred to the parallel to serial converter 35. Accordingly, the subtraction function is performed in the serial BCD adder/subtractor 59 by adding the nine's complement of the bits from the parallel to serial converter 35 with respect to corresponding bits in the display shift register 20. A bit is taken from both the shift register 20 and the parallel to serial converter 35 on a clock time basis and serially transferred to the adder/subtracter 59 and the nine's complement generator 60. The difference is then capable of being written directly on the drum 70. Comparison is then immediately initiated since recirculation is taking place in the search shift register 50, which contains the part number (address) of the sector to be written. The gates 51 are actuated in such manner that a right circular shift occurs and comparison is found in the adjacent sector previous to the location in which the modified part data associated with the address is to be stored. The write sequencer 56 will enable the commencement of writing on the drum 70 at the leading edge of the sector clock pulse from the sector clock amplifier 72. It is also necessary to add a preamble and a postamble to the modified data.

From the foregoing, it should be noted that the display shift register 20 serves at least three main functions. First of all, the display shift register provides for circulation of the data bits therein enabling the strobing of the display tubes 5. Only one decoder is required since each display tube 5 is consecutively energized on a sequential basis. The one decoder 29 is capable of energizing all of the tubes 5 sequentially. The display shift register 20 serves a second major function which is to receive the data from the drum 70 and transmit data to the drum 70 at the drum bit rate. The information is transferred to the display shift register 20 through the valid data detector 63 and over the memory data line MD. In addition, information is transferred from the console unit C to the central electronics unit E at the drum bit rate. The third major function of the display shift register 20 is to serve as a storage medium. The data introduced from the keyboard 6 or from the digit change switches 32 are properly entered into the display shift register 20 in the manner as previously described.

The bit counter 62 is capable of counting two different types of clock pulses. When data is being read from the drum 70, clock pulses from the data clock amplifier 80 are used. However, when data is being written onto the drum, write clock pulses from the write clock amplifier 73 are used. Accordingly, the bit counter 62 is switched from read clock pulses to write clock pulses depending on whether the function is that of reading or writing. The clock switch 61 is controlled by the write sequencer 56. Normally, the clock switch 61 will enable the passage of read clock pulses except when the writing function has taken place as monitored by the write sequencer 56.

Whenever data is written onto the drum 70, such as by means of the add function, the subtract function and the write data function, the read sequencer 55 will provide a reading of the written data. When the write function has been completed, the read sequencer through a sequential state will locate the part number in the same manner as though the read function were initiated. The read sequencer 55 is not necessarily initiated on the writing function, but the portion of the read sequencer 55 which enables reading of the data has been energized. Accordingly, the information which has been written onto the drum 70 is displayed by means of the display shift register 20 so that verification of the written data can take place. In like manner, verification of addition and subtraction can also take place since the answer will be introduced into the display shift register 20, and hence, displayed by means of the display tubes 5.

It can be observed that the apparatus A uses data of a limited format and a limited quantity which is addressed in a specific manner. Furthermore, it should be observed that no programming is necessary since the apparatus uses "hard-wired" logic. Typical digital computers normally address by sector and track location. However, the address or existence of a location of a particular part number or data associated therewith is known because the data was placed in a particular position. It can be seen that addressing in the apparatus in the present invention is accomplished by a special case of content. In other words, addressing for each new item takes place in part number locations which have only zeroes.

MULTIPLE NUMERIC CONSOLE UNITS

It is possible to connect a plurality of console units C to one central electronics unit E in the manner as illustrated in FIG. 3. It should be observed that each of the console units C are schematically illustrated in FIG. 3, and only three of such units are shown. However, it should be recognized that at least two, three or more of these console units C could be connected to one central electronics unit E. For purposes of clarity, the three such console units which have been illustrated are designated as $C_1$, $C_2$, and $C_n$. The employment of a plurality of console units can be quite effective since the central electronics unit E which contains the memory section M is capable of providing information to each of such console units. Each of the console units are connected to an OR gate structure 100 and to a control switching circuit 101.

Each of the console units $C_1$, $C_2$, and $C_n$ receive data from the central electronics unit E at all times. It can be seen that the console data line CD, the add/subtract data line ASD, and the transfer line XF of each console unit are connected to the OR gate structure 100. For example, it can be seen that each of the console data lines CD from each of the console units $C_1$, $C_2$ and $C_n$ are all ORED together in an OR gate 102 and connected to the central electronics unit E. In like manner, each of the add/subtract data lines ASD from each of the console units $C_1$, $C_2$, and $C_n$ are all ORED together in an OR gate 103 and connected to the central electronics unit E. In addition to the above, each of the switching lines, namely the clear line CL, the write part number line WPN, the write data line WD, the read request line RRQ, the add line ADD and the subtract line SUB are all connected to the OR gate structure 100 and introduce inputs into this gating structure 100. Each of the console units receives data transfer information from the control switching circuit 101 over the data transfer line DX. The console units $C_1$, $C_2$ and $C_n$ receive memory data and memory clock pulses directly from the central electronics unit E over the memory data lines MD and the memory clock lines MC. A 20-volt power switching circuit 104 is connected to the console switching circuit 101 through inhibit lines 105 associated with each console unit C.

By further reference to FIG. 3, it can be seen that the five switch lines, namely the read line RRQ, the write data line WD, the write part number line WPN, the subtract line SUB and the add line ADD are all connected from the OR gate structure 100 to the central electronics section E. It should be observed that these five switching lines are illustrated as being connected between the various console units and the OR gate structure 100 by means of the thick sectioned lines with a designation of S. The central electronics unit E also receives console data and add and subtract data from the OR gating structure 100 through the CD lines and the ASD lines as illustrated in FIG. 3. The central electronics unit E additionally receives a write enable input WE from the OR gate structure 100 which, in turn, receives these inputs from the various console units $C_1$, $C_2$, and $C_n$. It should also be observed that the memory data line MD and the memory clock line MC are connected directly to the central electronics E, and do not pass through the OR gating structure 100 or the control switching circuit 101.

Actually, the OR gating structure 100 consists of a series of diode OR gates which receive one of seven switching lines from each console unit so that one major OR gate is associated with each function. In addition, a second major set of high speed OR gates are provided in the structure 100 so that all of the console data lines CD from each of the units are connected to one OR gate 102 and all of the add/subtract data lines ASD of each console unit is connected to the other OR gate 103. In essence, one OR gate is adapted to receive all of the read request lines RRQ; another OR gate is adapted to receive the write data line WD; a third OR gate is adapted to receive the write part number line WPN, etc. This information on these various lines from the last group of OR gates is then connected to the central electronics unit E. The console switching circuit 101 generally comprises a series of AND gates which receive the various input lines and a latch for each console. The actual structure of the control circuitry included in the OR gating structure 100 and the control switching circuit 101 is obvious to the skilled artisan in view of the schematic illustration of FIG. 3.

It should be observed that the central electronics unit E can be actuated by any of the console units $C_1$–$C_n$. Furthermore, each of the console units $C_1$–$C_n$ receive clock information from the single electronics unit E. The consoles are arranged in such manner that the console data line CD and the add/subtract line ASD all contain zeroes except when the data transfer line DX to that console is rendered true. It should be observed that the XF transfer signals from the console C were transmitted directly to the central electronics unit E to advise the central electronics E that data in the console unit was in proper format for shifting. However, it should be observed that with multiple consoles the DX line is now connected to the control switching circuit 101. The clear switch 9 with a single console unit C merely served the function of clearing the display shift register 20. However, with multiple consoles, actuation of the clear switch 9 signifies that the particular use of the central electronics unit E for a particular console unit C has terminated. With multiple console units C, actuation of any of the switches in a particular console unit C is sufficient to provide operative connections of that console unit to the central electronics unit E, thereby inhibiting all other console units from temporarily accessing the central electronics unit E. Furthermore, actuation of any of these switches on one console unit will cause deenergization of the busy lamp 40 and release of the central electronics unit E occurs when the clear switch 9 is actuated on the console unit C which was accessing the electronics unit E.

Appropriate inhibit signals generated by the console select latches contained in the control switching circuit 101 are in conjunction with the 20-volt power switching circuit 104 and cause all busy lamps 40 on all console units to remain extinguished except on the console unit which is accessing the central electronics unit E. All of the various switches previously described on the console units are powered from this same 20-volt power source 104. Thus, when one particular console unit is accessing the central electronics unit E, no other console unit in operative connection to the central electronics unit E is capable of sending switch outputs to the central electronics unit E. In this manner, the central electronics unit E receives switch inputs only from the particular console unit which may be accessing the central electronics unit E.

The reset signals to the various select latches in the console switching circuit 101 may be derived from either one of two sources; namely, reset signals from the central electronics unit E, or from the write enable line WE and the clear line CL, from the OR gate structure 100. If a read operation is being performed without the write enable switch being energized, the reset signal is received from the central electronics unit E. On the other hand, if the write enable switch 15 has been actuated, the reset signal is derived over the write enable line WE and clear line CL inputs from the OR gate structure 100.

DETAILED DESCRIPTION OF AN ALPHA-NUMERIC DATA SYSTEM

Figure 4:
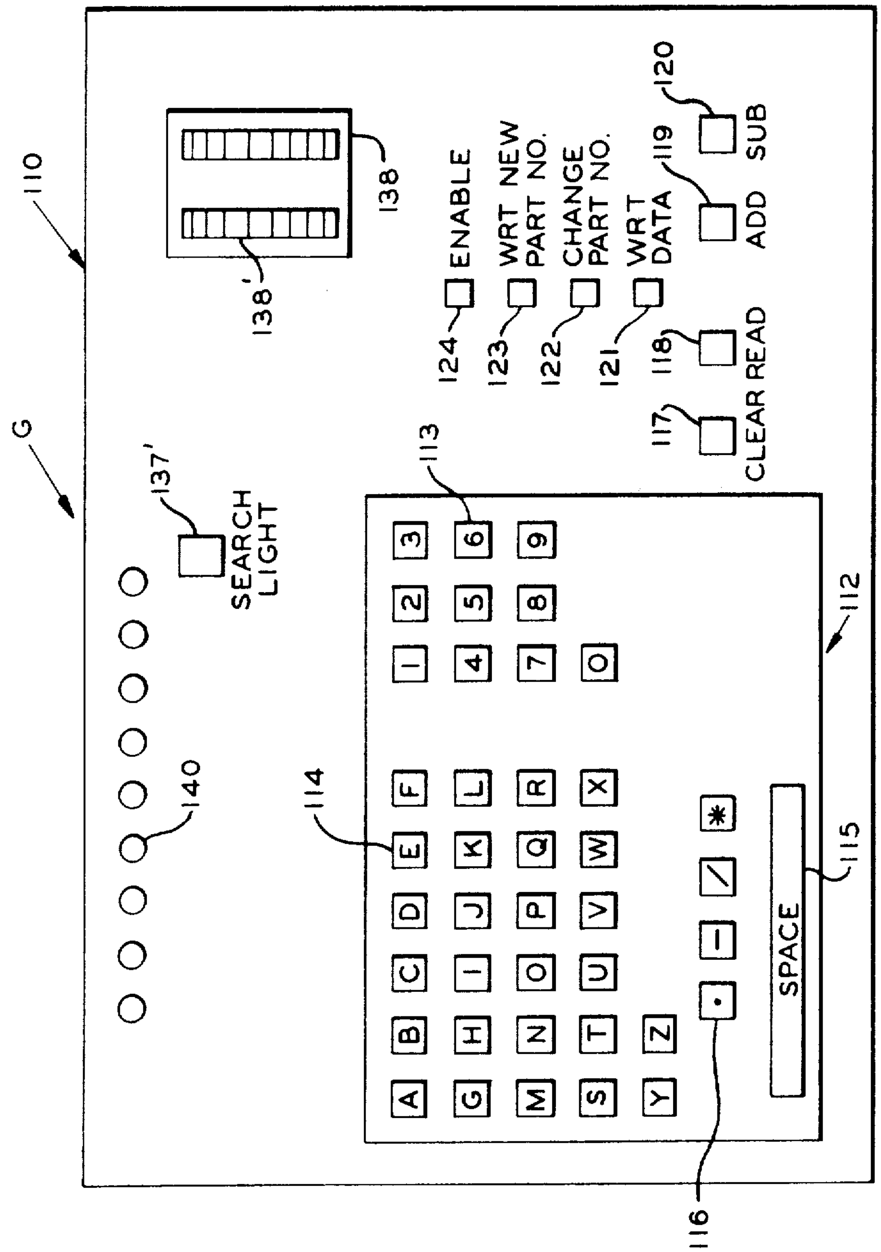
FIG. 4 is a top plan view of the control panel forming part of a console unit of a modified form of electronic data processing apparatus constructed in accordance with and embodying the present invention.
Figure 5A:
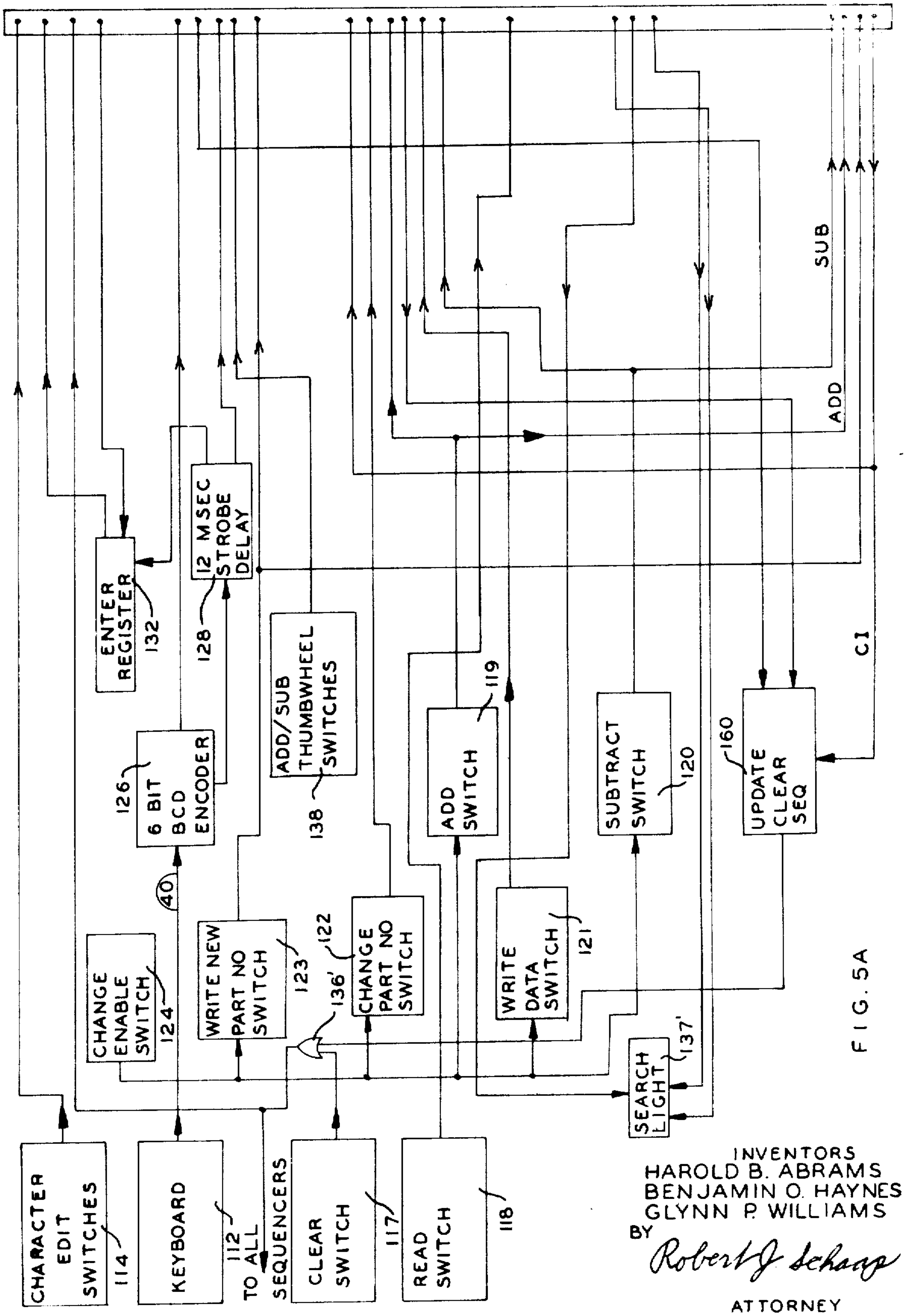
Figure 5B:
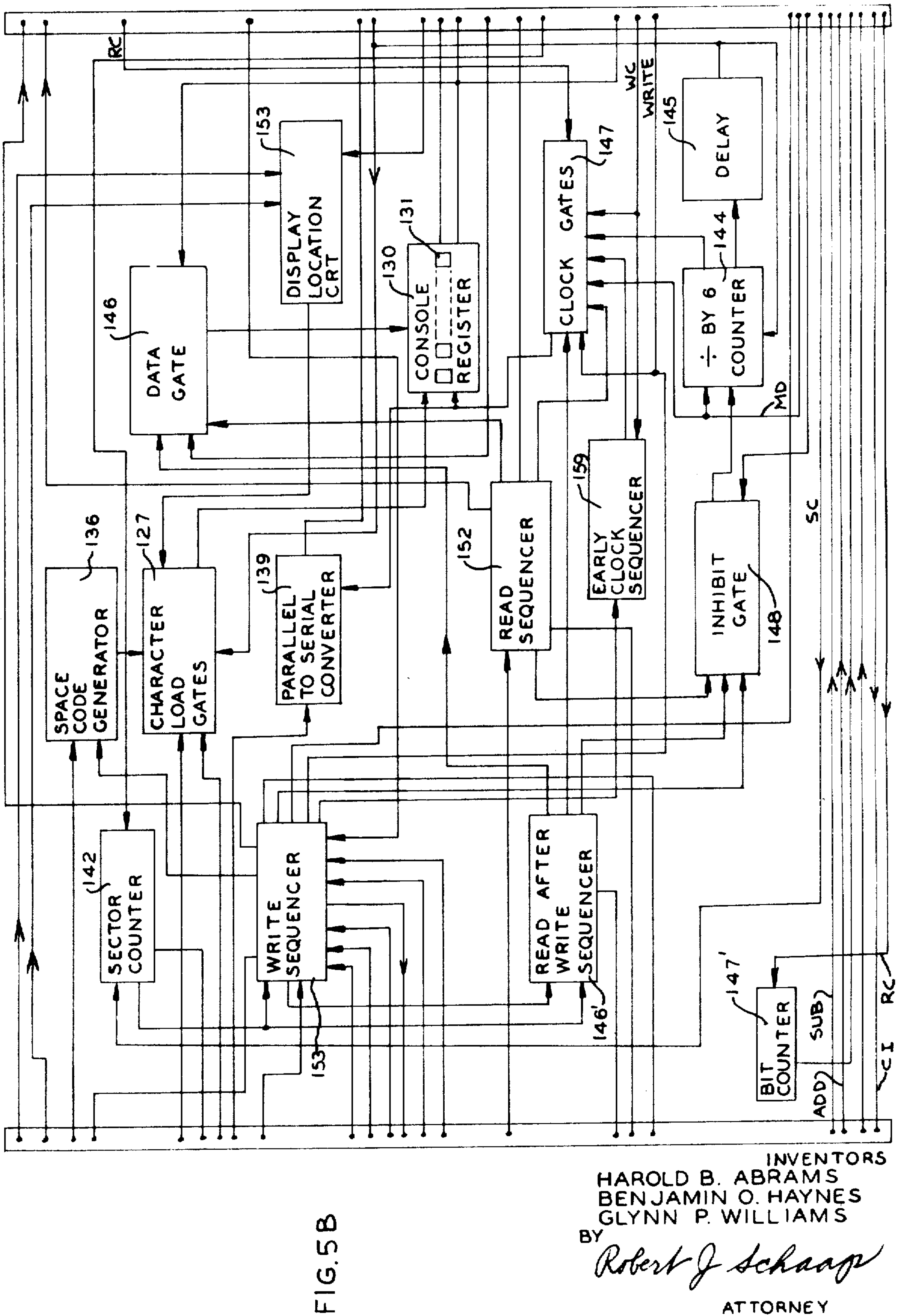
Figure 5C:
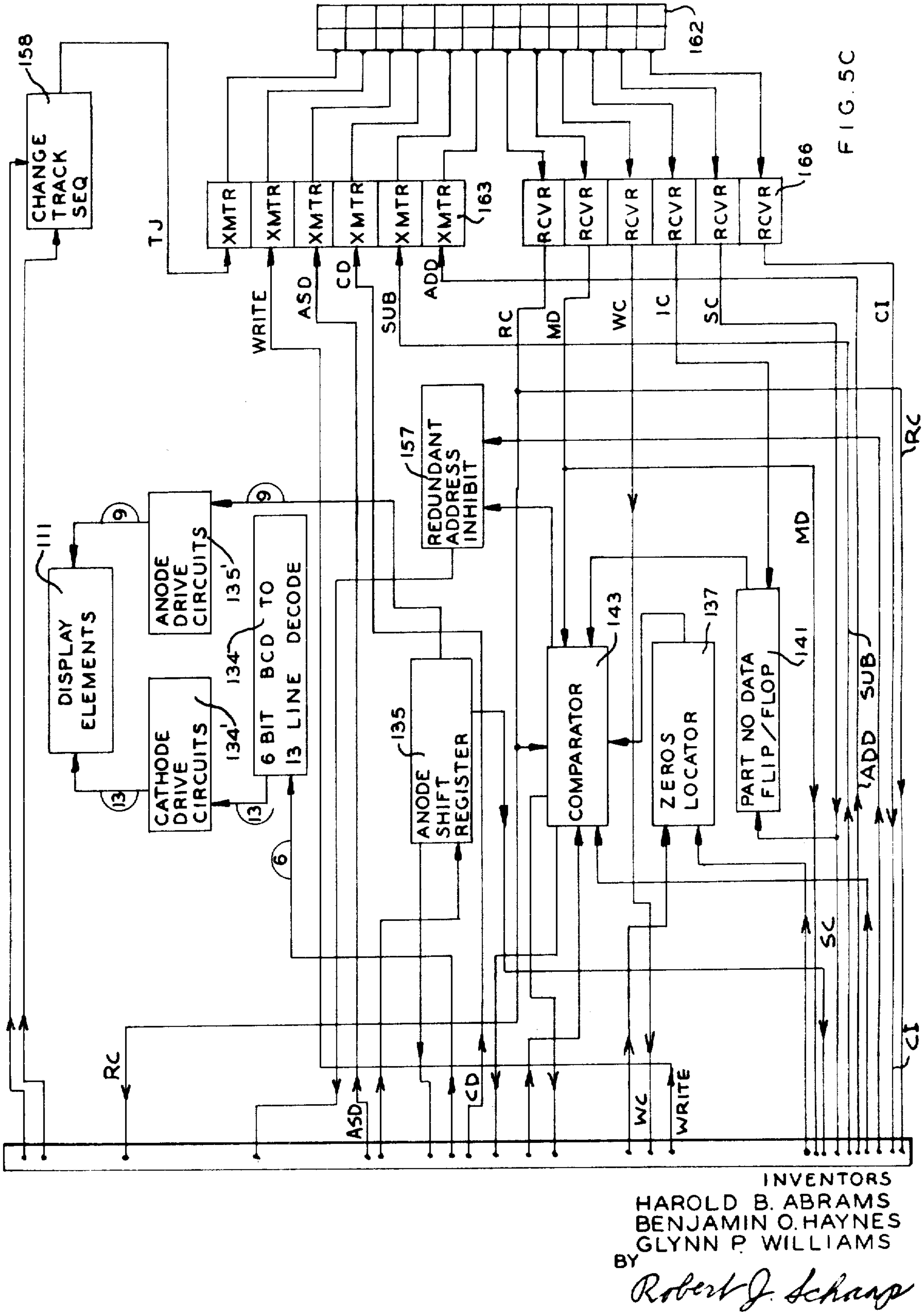
Figure 5D:
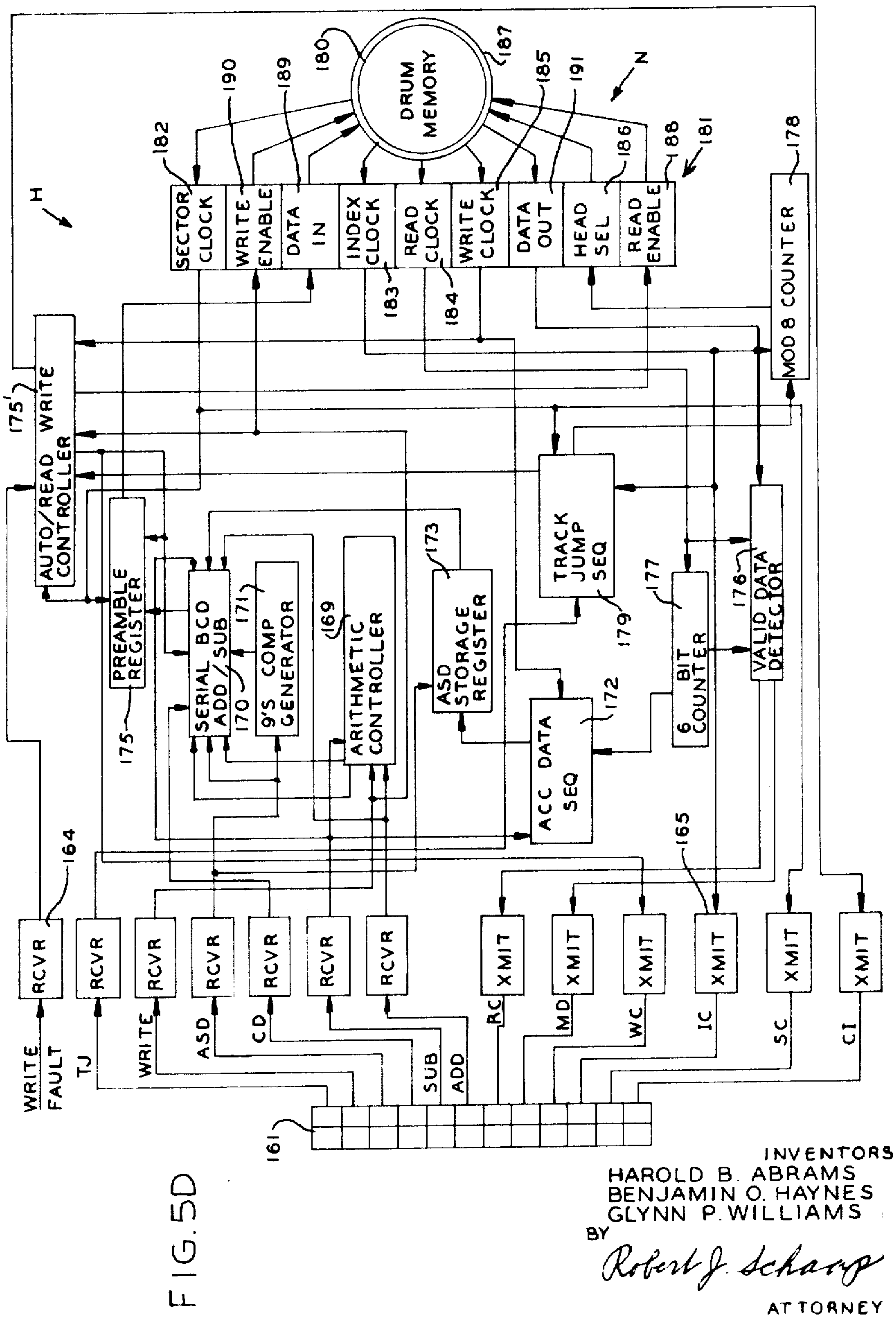
Figure 6:
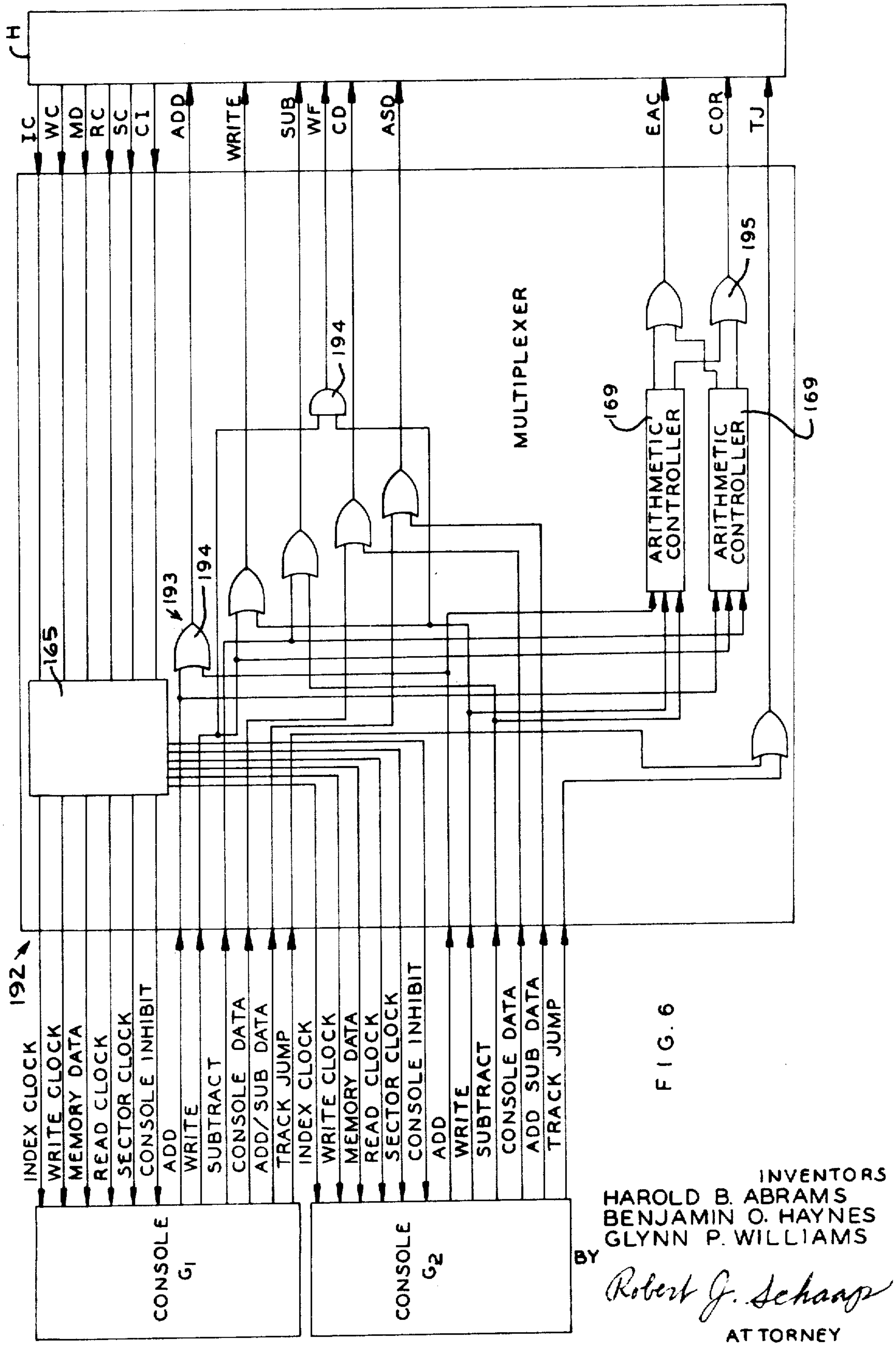
FIG. 6 is a schematic view of the electrical circuitry employed when multiple console units of FIGS. 5A, 5B and 5C are interfaced with a single central electronics unit of FIG. 5D.

It is also possible to provide an alpha-numeric apparatus B, which is more fully illustrated in FIGS. 4–6, and which generally comprises a console unit G and a central electronics unit H. The central electronics unit H also includes a memory section N. The console unit G, which is illustrated in the composite FIGS. 5A, 5B and 5C, is provided for removable attachment and connection to the central electronics unit N, the latter being illustrated in FIG. 5D. In like manner, the console unit G can be provided with terminal connectors in the same manner as the console unit C. Moreover, the central electronics unit H may be provided with the terminal connectors for attachment to the console unit G, in the same manner as the electronics unit E was provided with terminal connectors. It can also be observed that both the console unit G and the central electronics unit H can be conveniently mounted in one housing as a unitary assembly.

The apparatus B also includes an outer housing similar to the housing 1 and is provided with an upwardly inclined control panel 110 which forms part of the housing 1 in the same manner as the control panel 2 forms part of the housing 1. It should be recognized that the housing for the alpha-numeric apparatus B is substantially identical to the housing for the numeric apparatus A, except for the differences in the control panel employed. Accordingly, the remaining portions of the housing of the apparatus B are not further illustrated herein. The housing in the alpha-numeric apparatus B will also be provided with a display panel formed in such manner to provide visible viewing of nine cold cathode display tubes 111.

The control panel 110 is provided with a keyboard entry block 112 or so-called "keyboard" having a plurality of numerically labeled keys 113, the latter being labeled zero and one through nine. The keyboard 112 also contains 26 additional keys 114 having the letters of the alphabet, namely A, B, . . . Z imprinted on the surface of each of the respective keys in the manner as illustrated in FIG. 4. In addition, the keyboard 112 is provided with a space bar or space key 115 for introducing spaces or blank areas between letters or decimal digits introduced into the apparatus G. The keyboard 112 is also provided with four additional keys 116 which have labeled thereon an asterisk (*), a period (.), a dash (-), and a diagonal line or so-called "slash mark" (/). Thus, it can be seen that the keyboard 112 is capable of introducing 40 distinct characters in the alpha-numeric format.

A "clear" switch 117, a "read" switch 118 and an "add" switch 119, a "subtract" switch 120, a "write" data switch 121, a "change" part number switch 122, a "write new part number" switch 123 and an "enable" switch 124 are all mounted on the control panel in the manner as illustrated in FIG. 4. All of the aforementioned switches, with the exception of the enable switch 124, are pushbutton-type switches which enable an energized state upon actuation and are biased to return to the deactuated position. The enable switch 124 is a latching-type switch. The enable switch 124 is similar to the enable switch 15 in the numeric apparatus A, and is an alternate action type of switch. This enables switch 124 is connected to the write data switch 121, the change part numbers switch 122, the write new part number switch 123, the add switch 119 and the subtract switch 120 in order to enable actuation of these latter five switches in a manner to be described in more detail. It should be recognized that the enable switch 124 could also be in the form of a key operated switch, if desired. Thus, in order to actuate any of the five aforesaid switches, it is first necessary to actuate the enable switch 124. The various switches 117–124 all internally contain lights, such as small conventional neon tubes so that the face of the switch will be light-displayed when the enable switch 124 is actuated. When the enable switch 124 is actuated, and lit, the other switches 119–123 may also be actuated.

The keyboard 112 is connected through 40 bit lines 125 to a 40 line to six bit BCD encoder 126. The encoder 126 is capable of generating six bits in binary coded format for each character. In this connection, it should be noted that actuation of the space bar 115 on the keyboard 112 will also cause the generation of 6 bits representative of the space code in the same manner as any other character on the keyboard. Furthermore, the 40 line to six bit encoder 126 internally contains a diode matrix having a series of diodes connected in such fashion as to generate a binary code equivalent to any key actuated. Accordingly, actuation of any one of the keys 113–116 will cause the generation of the six bits in an alpha-numeric code to represent that character. It should be recognized that the keyboard 112 and the 40 line to six bit encoder 126 are conventional in their construction, and also within the design purview of the skilled artisan, and are therefore, neither illustrated, nor described in any further detail herein.

The term "part number" as used in this alpha-numeric apparatus represents a sector of a known number of bits, namely — 54 bits, and which sector of bits contains information identifying a particular good, item, service, or other element capable of being identified and addressed. However, the presently described embodiment of the present invention refers to such identified and addressed element as a "part number".

The term "part data" as used in this alpha-numeric apparatus represents a sector of a known number of bits, namely — 54 bits, and which sector of bits contains information relating to a part number identified by the preceding sector of the same number of part number bits. The term "data" is also used in its generic sense to represent this sector of a known number of bits, e.g. — 54 bits, and which bits contain useful information. Accordingly, a "data" sector of bits may represent a part number, part data or other allied information.

It should be recognized that while the present invention has been described in terms of apparatus for storing part characters (or other addressable indication) and respective data about those part characters, that other types of information could be stored as well. For example, the first 54 bits could be used to represent an account number such as a credit card account number. The additional sector of 54 bits would then provide information about that particular account number. However, for purposes of illustrating and describing the present invention, the apparatus will be described in terms of storing and operating upon part numbers or part characters and part data associated with such part numbers or part characters. Naturally, if other types of information are to be stored, the nomenclature on the various pushbutton switches located on the control panel 2 would be altered accordingly.

For example, it could be assumed that the second sector of 54 bits representing part data about a part number (nine alpha-numeric characters representing part data about the part number) will include three decimal digit or character positions for providing inventory quantity. The last three decimal digits of the decimal digit or character information, which is the least significant three digits, will represent such inventory data. The other six decimal digit or character positions can then be used in coded form to represent the name of the particular supplier, price, or location of the inventory, etc.

Any of a number of commercially recognized alpha-numeric digital type codes could be used for generating the six bit type representative of each character employed. The last THREE character positions of the nine character code have been reserved for decimal digits. However, it should be recognized that four or more of the nine character positions could be used to represent a decimal digit format.

The encoder 126 is connected through six bit lines to character load gates 127. In like manner, the encoder 126 is also connected to a strobe delay 128 which is, in turn, connected to the gates 127 through a strobe line 129. The strobe delay 128 serves the same function as the delay 19 in the numeric apparatus A. As indicated, in connection with the numeric apparatus A, the keys on the keyboard 112 will bounce for a few microseconds when actuated due to the elasticity of the metal-metal contact in the switches. Furthermore, each of the keys on the keyboard 112 are capable of rendering a 5-volt output when actuated. The strobe delay 128 will create approximately a 12-millisecond delay before the output from the character load gates 127 is transmitted to a 54 bit console shift register 130. This delay will be sufficient to enable the elimination of any rebound vibration in the keys on the keyboard 112 before transfer of the bit information in the encoder 126 to the console register 130. An output strobe from the strobe delay 128 will thereupon permit entry of this bit data into the console register 130.

In the numeric apparatus A, each part number of nine decimal digits was represented by a 36 bit code where each digit was capable of being characterized by a byte of four bits. As indicated previously, in the alpha-numeric apparatus B, each part number sector which also contains nine characters in alpha-numeric format, is capable of being represented by a sector of 54 bits. Thus, each of the nine characters is characterized by a byte of six bits. In like manner, a part data sector of 54 bits depicting information about that part number will follow each part number.

The character load gates 127 are connected to the console register 130 which contains 54 bistable multivibrators 131 in the manner as illustrated in FIG. 5B. The console register 130 is similar to the display register 20 used in the numeric apparatus A and is also a recirculating shift register. The register 130 serves at least the number of functions that the register 20 in the numeric apparatus A served. It can also be seen that the console register 130 is capable of holding 54 bits of information at any point in time.

The output of the strobe delay 128 is also connected to a nine bit enter register 132 which generally contains nine bistable multivibrators. The output of the enter register 132 is connected to a display location decode circuit 133 which, in turn, has an output connected to the character load gates 127, in the manner as illustrated in FIG. 5B. The display location decode circuit 133 operates in conjunction with an anode shift register (hereinafter described) and the enter register 132 to enable the loading of keyboard characters into sequentially located character positions of the console register 130 and, hence, sequentially located display positions. Six output lines from the bistable multivibrators 131 of the console register 130 representing the six least significant bits are inputs to a six bit to 13 line decoder 134. The decoder 134 also has 13 output lines connected to 13 cathode drivers in a cathode driving circuit 134 and the cathode driving circuit 134 has 13 output lines connected to the display tubes 111.

A nine bit anode shift register 134 has nine output lines, where each output line is connected to an individual display tube 111 through anode drivers in an anode driving circuit 135'. Nine such anode drivers are provided in the anode driving circuit 135' for each display tube 111. The anode shift register 135 also has nine outputs connected to nine input terminals of the display location decode circuit 133. Thus, the decode circuit 133, the decoder 134, the enter register 132 and anode shift register 135, as well as the cathode drivers and anode drivers in their respective circuits 134', 135', all cooperate with the console register 130 to energize the various segments in the display tubes 111 to represent the nine characters on the display tubes 111; and these nine characters correspond to the 54 bits located in the console register 130 at any point in time. It can be seen that the decode circuit 133, the decoder 134, the anode register 135, the cathode driving circuit 134' and the anode driving circuit 135' all function is a manner similar to the combination of the decoder 29, the anode shift register 25, the anode drivers 26, and the cathode drivers 30, respectively, in the numeric apparatus A. The display tubes 111 are somewhat different than the display tubes 5 in the numeric apparatus A. The output of the console register 130 contains six bits for each character and these six bits are decoded into a 13 segment code through the six bit to 13 line decoder 135. The display tubes 111 are segmented tubes where the segments in the tubes 111 form the various characters for display purposes.

The nine bit anode register 135 essentially serves the same purpose as the anode shift register 23 in that the register 135 monitors the energization of the various tubes 111. The anode register 135 actually provides an indication of a particular six bit location and its representation is displayed in a particular display tube 111; and the enter shift register 132 essentially depicts the desired location into which a keyboard character is to be introduced when outputs from the register 135 and the register 132 are coincident. Accordingly, coincidence of these two outputs enables the loading of the next keyboard character into the proper location for display purposes in the display tubes 111. It can be seen that each of the tubes 111 will be individually and consecutively energized in order to display the various characters represented by the 54 bits in the console register 130. Each display tube will internally form the 13 segments into a proper representation of the alphanumeric character introduced by means of the keyboard 112.

Prior to the entry of any new part number address into the console register 130, the clear switch 117 is actuated and, hence, the console register 130 will contain all spaces. The unique code adopted for spaces is loaded into the console register 130 by the space code generator 136 to be hereinafter described in more detail, upon actuation of the clear switch 117. When any one of the keys on the keyboard 112 is actuated, six bits are generated in a diode matrix of the six bit BCD encoder 126 and entered into the character load gates 127. By reference to FIG. 5B, it can be seen that the character load gates 127 have twelve lines which are connected to the preset and reset inputs of the last six flip-flops 131 of the display console register 130 for the purpose of loading a six bit character code into the console register 130. At the time that the first six bits are being loaded into the console register 130, the last six flip-flops (or stages) 131 represent the most significant characters of the nine characters which are entered into the console register 130. Inasmuch as the bits which are entered into the console register 130 are continually circulating, the bits representing each of the nine characters will be, in turn, entered into the last six flip-flops 131 of the console register 130. The anode shift register 135 is also a recirculating shift register containing nine bits. However, only one stage of the anode shift register 135 can be true at any point in time. The first stage of the anode shift register 135 located on the left end position of the anode shift register 135 represents the most significant stage. As indicated previously, the six bits which represent the most significant character were entered into the console register 130 through the character load gates 127. These six bits are only entered into the last six flip-flops 131 of the console register 130 when the most significant stage of the anode shift register 135 is true.

After the most significant character has been loaded in the console register 130, actuation of a second key on the keyboard 112 will generate six more bits which will also enter through the character load gates 127 into the last six flip-flops 131 of the console register 130 when the second stage of the anode shift register 135 is rendered true. This sequence continually takes place until all desired bits have been entered into the console register 130 from the keyboard 112 through loading, when the desired stage of the circulating anode shift register 135 is true.

Each time that a key on the keyboard 112 is released, a strobe from the strobe delay 128 is entered into the enter shift register 132 thereby causing successive stages to the right to be rendered true in the enter shift register 132. After the ninth key has been actuated, it is impossible to introduce any further characters into the console register 130 inasmuch as the enter shift register 132 is only capable of shifting to nine successive stages. The display location decode circuit 133 advises when the six bits of interest are in the proper stages of the console register 130 by comparing the location of the true bit in the anode shift register 135 with the required bit location as defined by the position of the true bit in the enter shift register 132.

The display decode circuit 133 continually renders a pulse during the time that the recirculating true bit in the anode shift register 135 and the momentarily static true bit in the enter shift register 132 coincide. This pulse is used in the load gates 127 to load a 6 bit code into the last six stages 131 of the console register 130 whenever a key on the keyboard 112 is actuated.

The anode drivers in the anode driver circuit 135' serve as level converters to take the one recirculating true bit of the anode shift register 135 and make it capable of illuminating one display tube 111. Since the one true bit is recirculating in the anode shift register 135, each of the display tubes 111 is illuminated in sequence. At the same time the bits in the anode shift register 135 are being recirculated, the bits in the console register 130 are also being shifted a corresponding amount. Inasmuch as the console register 130 stores six bits for each character, the console register 130 is shifted six times as the anode shift register is shifted once. As this occurs and a new display tube is illuminated, a new six bit code will appear in the six stages 131 of the console register 130, thus presenting a new code to the 6 to 13 line decoder 134. This decoder 134 selects the desired 13 segments or cathodes in each display tube 111 and the tube 111 will actually illuminate when the aforementioned anode is energized.

Illumination of the desired display tube in the manner thus described will cause a particular character representation to be displayed. As each new tube 111 is illuminated in sequence, the new six bit code causes a new character to be displayed. This process continues at a repetition rate sufficiently high that the human eye cannot detect the fact that the tubes 111 are being lit consecutively and, accordingly, all the tubes 111 appear to be illuminated continuously.

Each of the 13 cathodes in each of the display tubes 111 are common to the corresponding cathode in each of the other tubes 111 and are driven from one to 13 cathode drivers. Furthermore, the selected cathode drivers resulting from the examination of the six bit code presented to the 6 to 13 line decoder 134 would be switched to a ground condition. One bit in the anode shift register 135 is permitted to circulate and this bit will cause a selected anode driver to be driven from a 0 voltage state to a 170–230 volt state. As indicated, only one of the nine anode drivers in the anode driving circuit 135' will be energized at any one point in time. Accordingly, if six zero bits were being examined, the cathodes representing a zero in the display tube will be lit for a selected period of time. The register 130 again causes a shifting of six bits to the right.

These six bits which are used to shift the data in the register 130 are reduced to one bit by a divide by six counter 144 and then shift the anode shift register 135 by one bit. The proper anode driver in the anode driving circuit 135', along with the corresponding cathodes, is selected and the next tube 111 is, in turn, energized to its proper display when the anode driver has been energized to a 170–230 volt state. The aforesaid selected period of time for energization of any of the display tubes 111 is determined by a delay 145 which receives an input from the divide by six counter 144 and also has an output to the counter 144. By reference to FIGS. 5B and 5C, it can be seen that the anode shift register 135 also receives an output from the delay 145.

When all of the desired characters have been loaded into the console register 130, and it is desired to perform any operations with the console register 130, it is necessary to align the bits in the console register 130 so that the least significant character is in the six right-most stages 131. This is accomplished by observing when the one true bit in the anode shift register 135 is in the right-most position of the register 135.

The clear switch 117 is connected through an OR gate 136' to a space code generator 136 in the manner as illustrated in FIGS. 5A and 5B. It can be seen that the space code generator 136 is also connected to the character load gates 127. When the clear switch 117 is actuated, it will enable the space code generator 136 to insert a six bit space code through the character load gates 127 into the console register 130. Accordingly, a space code is introduced in each and all six bit locations of the console register 130 responsive to each actuation of the clear switch 117.

Introduction of a six bit space code into the console register 130 will cause a particular display tube 111 to remain de-energized. Accordingly, when the clear switch 117 is actuated, it is possible to introduce blank spaces into each six bit byte of the 54 bits. It should be pointed out that this space which is created by the generation of six bits is a valid code, and in fact, is as valid as the code generated by any other character on the keyboard 112. However, when writing into the console register 130, it is possible to write over these blank spaces. A zeros locator 137 is connected to the output of the shift register 130 for selecting a memory sector in the memory section of the central electronics unit H. A search light 137' is also located on the control panel 110 for reasons which will presently more fully appear.

Also mounted on the control panel 110 is a 2 decade thumbwheel add/subtract digit switch 138 containing a pair of thumbwheels 138' for introducing add and subtract data into the apparatus A. The thumbwheels 138' are provided with decimal digits numbered 0 and 1 through 9 on the peripheral surface thereof and represent the particular digit which is to be added or subtracted. For example, if it is desired to subtract one number from part data, this number is introduced into the apparatus B through the thumbwheel digit switch 138. The output of the 2 decade thumbwheel digit switch 138 is connected to a parallel to serial converter 139 by 8 output lines. The parallel to serial converter 139 also receives an input from a set of clock gates 147 through various clocking structure in a manner to be hereinafter described in more detail.

Also mounted on the control panel 110 in proximate relationship to the display tubes 111 are 9 pushbutton-type character edit switches or so-called "digit change switches" 140, each one of which is associated with a particular display tube 111. Thus, in order to change any individual number or character appearing in any of the display tubes 111, it is possible to merely press the switch 140 associated with such tubes and thereafter actuate the proper key on the keyboard 112 for introduction of the proper character. Each of the character edit switches 140 has an output connected to the display location decoder 133. In like manner, the decoder 133 receives an output from the anode shift register 135, as previously described.

The console unit G also includes a part number/data flip-flop 141 which receives a sector clock input over a sector clock line SC from the central electronics unit H. In like manner, this latter flip-flop 141 receives index clock pulses from the electronics unit H over an index clock line designated as IC, reference being made to FIG. 5C. The console unit G also includes a modulo *n*–557 sector counter 142, as illustrated in FIG. 5B, where n is the number of tracks located on a drum in the memory section to be hereinafter described. 557 sectors are located on each track and the sector counter 142 will control sector selection so that when a desired drum location is determined, the counter 142 will be initialized and each time that the counter cycles through its initialization point, it represents that desired memory location.

The console unit G also includes a comparator 143, the divide by 6 counter 144, and the 100 microsecond one-shot delay 145, all of which are connected in the manner as illustrated in FIGS. 5B and 5C. The delay 145 provides for a 100 microsecond delay after strobing of any of the display tubes 111 in the manner as previously described so that each display tube 111 remains energized for one hundred microseconds. The console unit G includes any number of gating structures as illustrated in FIGS. 5A and 5B. The comparator 143 has an output connected to one input of the sector counter 142. The sector counter 142 also receives sector clock pulses from the central electronics unit H over the sector clock line SC. Connected to the input of the console register 130 is a data gate 146 which determines the data streams entering the console register 130. It should be observed that recirculating data and memory data from the memory section N may both be introduced into the console register 130 through the data gate 146.

The data gate 146 receives a gating input from the comparator 143, memory data from the central electronics unit H over a memory data line designated as MD, an input from a read sequencer hereinafter described, and a gating input from a read-after-write sequencer 146'. The read-after-write sequencer 146' is connected in the console unit circuitry in the manner as illustrated in FIGS. 5A–5C and automatically causes a read sequence to be performed after any write operation to verify proper loading of the data written in the memory section N. In addition, the data gate 146 receives recirculating data from the output of the console register 130. A bit counter 147' used in an addressing operation to be hereinafter described has an output connected to the comparator 143. The bit counter 147' receives a read clock input from the central electronics unit H over a read clock line designated as RC.

A clock gate 147 has an output connected to the parallel to serial converter 139 and to the console register 130 in order to enable the shifting of the bits in the register 130 at clock pulse time. The clock gate 147, illustrated in FIG. 5B, actually constitutes of plurality of gates and receives write clock pulses over a write clock line designated as WC and read clock pulses over the read clock line RC from the central electronics unit H. The read clock pulses are used to maintain proper phasing with the data arriving from the memory section N. The write clock pulses are used to write data into the memory section N at clock pulse time. In addition, the data bits in the console register 130 are shifted in six bit bursts which are metered by the clock gate 147. Accordingly, these three clock functions are gated into the console register 130 depending upon which function is being served in the console register 130.

The clock gates 147 receive a number of clock inputs from the central electronics unit H for reasons which will presently more fully appear. The clock gates 147 receive read clock information from the central electronics unit H over the read clock line RC. The divide by six counter 144 also receives this read clock information, and the clock gates 147 receive an output from the divide by six counter 144 in the manner as illustrated in FIG. 5B. Finally, the clock gates 147 receive write clock information from the central electronics unit H over the write clock line WC.

The divide by six counter 144 receives an output from an inhibit gate 148 which receives inputs from the anode register 135, the read-after-write sequencer 146' and a read sequencer and a write sequencer to be hereinafter described. Essentially, the inhibit gate 148 provides an advisory signal to terminate the six bit bursts such as, at times when a least significant character is located in the least significant bit positions of the register 130. More specifically, this inhibit gate 148 will inhibit the six bit bursts immediately before comparison time or reading, or writing onto the memory section N.

The data gate 146 receives an input from the read-after-write sequencer 146' and the comparator 143, as indicated previously. The inhibit to the data gate 146 from the read-after-write sequencer 146' and the comparator 143 enables the data gate 146 to introduce information into the console register 130 on a proper time basis.

A read sequencer 152 receives an input from the read switch 118. The sequencer 152 essentially serves as a controller to instigate inhibition of divide by six clock pulses through the inhibit gates 148, select read clock pulses through the clock gates 147, and cause the register data to be recirculated through the data gates 146. These functions will continue until the comparator 143 determines the proper sector to be entered into the register.

The divide by six counter 144 receives an input from the one-shot delay 145 and a read clock pulse input from the central electronics unit H. The divide by six counter 144 is properly disenabled when the six bit bursts from the counter 144 are terminated. The read clock input to the divide by six counter 144 comprises a steady stream of clock pulses from the memory section N and the output from this counter 144 by virtue of the divide by six feature is a series of six bit bursts. Each six bit burst causes the 100 microsecond delay one-shot 145 to inhibit the divide by six counter 144 for 100 microseconds thereby yielding a 100 microsecond time delay between bursts of six pulses.

The sector counter 142 receives an initialization pulse from the comparator 143, the latter generating this pulse when the data from the central electronics unit H receives comparison with the data from the zeros locator 137. The zeros locator 137 transmits all zeros or register data to the comparator 143 depending on the command it receives from a write sequencer 153. The write sequencer 153 receives an input from the sector counter 142 and uses this input in conjunction with the various switch inputs, write data, write new part number, change part number, add, and subtract, to generate outputs to the zeros locator 137, the clock gate 147 and the inhibit gate 148 to perform the desired write operation. The write sequencer 153 also has an output to the control electronics unit H to command a write operation hereinafter described. The read-after-write sequencer 146' also receives an input from the sector counter 142 which is employed in association with a command from the write sequencer 153 to generate commands to the inhibit gate 148, the data gate 146 and the clock gate 147 to perform the desired read-after-write operation.

The search lamp 137' is used to indicate the period during which the drum of the memory section N is being searched for data and receives inputs from the read sequencer 152, the write sequencer 153 and the read-after-write sequencer 146' to indicate their respective search times. In other words, the search lamp 137' will be energized during the time that the drum in the memory section N is being accessed in a search for data.

The console unit G of the present invention also includes a redundant address inhibit circuit 157 which receives an input from the comparator 143 in the manner as illustrated in FIG. 5C. The redundant address inhibit circuit has an output which serves as an input to the write sequencer 153. This output to the write sequencer 153 is effective to nullify the writing of a new part number if the comparator 143 detects that the address of this new part number has already been recorded in the memory section N. The operation of the redundant address inhibit circuit is more fully described in detail hereinafter.

The console unit G also includes a change track sequencer 158 which cooperates with and has an output to a similar sequencer in the central electronics unit H to be hereinafter described. The change track sequencer 158 receives inputs from both the read sequencer 152 and the write sequencer 153. The change track sequencer 158 has the ability to permit the sequential changing of tracks on the drum in the memory section for purposes of reading and writing sectors of information. The change track sequencer 158 is used with a particular addressing system which is also described in more detail hereinafter. However, in this particular addressing system, the part numbers are all written on one track and the data sectors associated with those part numbers are written on one or more adjacent tracks.

The console unit G of the present invention also includes an early clock sequencer 159 which receives an input from the write clock line WC from the central electronics unit H. The early clock sequencer 159 also receives an input from the write sequencer 153 and has an output to the clock gates 147, in the manner as illustrated in FIG. 5B. The early clock sequencer 159 is used to permit the transfer of information from the console unit G to the central electronics unit H on an early clock time basis in order to obviate delays incurred in long transfer lines between the console unit G and the central electronics unit H.

Finally, the console unit G includes an update clear sequencer 160 which receives inputs from the write sequencer 153 and the sector counter 142. The update clear sequencer 160 also receives a console inhibit input from the central electronics unit H over a console inhibit line designated as CI from the central electronics unit H. It can also be observed that the write sequencer 153 similarly receives the console inhibit input over the line CI. The update clear sequencer 160 has an output which is ored with the output from the clear switch 117 in the OR gate 136, in the manner as illustrated in FIG. 5A. The update clear sequencer 160 is designed to prevent the visual display of data in the display tubes 111 in the usual event that at particular console unit and another remote console unit are attempting to update the same sectors of information in the central electronics unit H at the same point in time, or if information displayed on one remote console unit is updated by another remote console unit.

By further reference to FIGS. 5A–5C, it can be seen that the read sequencer 152 receives one input which is from the read switch 118. The read sequencer 152, however, has outputs directed to the comparator 143, the clock gate 147, the sector counter 142, the search light 137', the inhibit gate 148 and the change track sequencer 158. The write sequencer 153 receives inputs from the change part number switch 122, the sector counter 142, the write new part number switch 123, the add switch 119, the subtract switch 120, the write data switch 121, console inhibit signals from the console inhibit line CI, and the redundant address inhibit from the redundant address inhibit circuit 157. The write sequencer has outputs directed to the read-after-write sequencer 146', the search light 137', the inhibit gate 148, the zeros locator 137, the clock gate 143, and the WRITE output to the central electronics unit H. In addition, the write sequencer 153 has outputs directed to the space code generator 136, the enter register 132, the change track sequencer 158, and the early clock sequencer 159.

It should be recognized that the various gates previously described actually consist of one or more gates to perform the various functions. However, these gates will not be described in any further detail herein, since the design of a gate to accomplish the stated function is well within the purview of the skilled artisan.

By further reference to FIG. 5C, it should be observed that the console unit G receives inputs from a terminal board 161 located in the central electronics unit H. The console unit G receives index clock pulses over the index clock line IC, sector clock pulses over the sector clock line SC, write clock pulses over the write clock line WC, read data from a memory data line MD, console inhibit signals over the console inhibit line CI, and read clock data from a read clock line RC. In like manner, the console unit G is provided with a terminal board 162 for connection to the terminal board 161. The terminal board 162 has contacts which match comparable contacts on the terminal board 161 for transmitting add/subtract data over an add/subtract line ASD, console data on a console data line CD, write command on a WRITE line, add data on an add line ADD, subtract data on a subtract line SUB, and track jump signals on a track jump line TJ.

By reference to the composite view of FIGS. 5A, 5B and 5C, as well as FIG. 5D, it can be seen that the console unit G can be removably connected to the central electronics unit H. Furthermore, a plurality of console units G can be connected to and operable from one central electronics unit H in a manner to be hereinafter described in more detail. It is not necessary to employ a busy lamp as was required in the numeric apparatus A since each alpha-numeric console unit G can simultaneously operate from the central electronics unit G. It should also be recognized that the console unit G and the central electronics unit H can be conveniently formed as a unitary assembly in a housing similar to that illustrated in FIG. 1. Furthermore, these units can be formed as two distinct and separable units, which are capable of removable connection to each other. In order to view the composite illustration of FIGS. 5A through 5D, as a unitary circuit, it is only necessary to envision a connection of the various lines extending among FIGS. 5A–5C and to envision a connection of the various contacts presented in the terminal connectors 161,162.

By further reference to FIGS. 5C and 5D, it can be seen that the outputs of the console unit G are provided with transmitters 163 prior to connection to contacts on the terminal board 161. In like manner, the respective compatible lines on the central electronics unit H which receive the outputs from the console unit G are provided with receivers 164. Furthermore, the outputs of the central electronics section N are provided with transmitters 165 prior to connection to the contacts on the terminal board 162. In like manner, the respective compatible lines in the console unit G which receive these outputs from the central electronics section H are provided with receivers 166. These transmitters 163, 165 and the receivers 164,166 are substantially identical to the receivers 44 and transmitters 45 in the numeric apparatus A. These receivers and transmitters are necessary since the various lines connecting the console unit G and the central electronics unit H contain data for high speed transfer and these lines may have considerable length. Therefore, the transmitters 163,165 are low impedance drivers and are capable of supplying sufficient current to drive these lines when loaded with their characteristic impedance levels. Similarly, the receivers 164,166 are differential amplifiers with logic level outputs.

The central electronics unit H, which is more fully illustrated in FIG. 5D, generally comprises an arithmetic controller 169 and a serial BCD adder/subtracter 170, the latter of which is similar to the adder/subtracter 59 used in the numeric apparatus A. The adder/subtracter 170 receives both add/subtract data on the ASD line and console data on the CD line. In addition, the adder/subtracter 170 receives an add pulse on the ADD line and a subtraction pulse on the subtract line SUB. The adder/subtracter 170 also receives a pair of inputs from the arithmetic controller 169.

A nines complement generator 171 receives the add/subtract data on the ASD line as well, and provides an output to the adder/subtracter 170 so that information is provided for either addition or subtraction. The add and subtract pulses provide an informative signal to the adder/subtracter 170 to place the decimal digit component of a sector either in condition for adding or subtracting. In addition, the add signal line ADD and the subtract signal line SUB are connected to the arithmetic controller 169 so that the add and subtract signals are coupled with the write signal in the arithmetic controller 169. The arithmetic controller 169 also receives a WRITE command from the central electronics unit G over the WRITE line. In this manner, the arithmetic controller 169 issues a correct pulse to the adder/subtracter 170 to convert sums therefrom to BCD format and a set carry pulse to provide an end around carry for subtraction. The arithmetic controller 169 includes a flip-flop (not shown) which determines whether an add or a subtract function has been instituted as well as the necessary gating to send out either the add pulses or the subtract pulses when the write signal occurs. Both pulses may be generated but at different times, when an add operation and subtract operation are to take place in different parts of the sector. Furthermore, since only four bits of each six bit byte are used in either of these arithmetic functions, the adder/subtracter 170 internally includes a device to account for the extra two bits in each six bit byte.

In the particular code employed, only four bits in the least significant bit positions of each six bit byte are used in the arithmetic functions. The additional bits are not used in the add sequencing, and accordingly, no carry can be introduced into the fifth bit position or the sixth bit position. In the event that a carry exists with respect to the first four bits, the carry is added into the first four bits of the next byte. Contrasted to the numeric unit A, addition was performed with respect to each byte as they are introduced into the BCD adder/-subtracter 59. A carryover could exist without any implications since no non-numeric data bits were present. However, since characters including both numerals and arabic letters are included in the code employed in the alpha-numeric apparatus B, addition can only be performed to the first three least significant digit positions. It should be observed that any number of digits could be used in each sector for purposes of performing the arithmetic functions.

The nines complement generator 171 is similar to the BCD to nines complement generator 60 in the numeric apparatus A. This generator 171 serves to place the add/subtract data in proper condition for subtraction.

The central electronics unit H also includes an accumulated data sequencer 172 which receives a subtract data input over the subtract line SUB and a write clock input from the memory section N to be hereinafter described. The accumulated data sequencer 172 has an output connected to the input terminal of an ASD storage register 173 which also receives add/subtract information over the add/subtract data line ASD. The ASD storage register 173 also has an output to the serial BCD adder/subtracter 170.

The output of the serial BCD adder/subtracter is introduced into a preamble register 175 which is similar to the preamble register 67 and is designed to introduce both preamble and postamble bits to the data to be written into the memory section N. As previously indicated, each 54 bit sector of information, whether part number or part data, is provided with a preamble and a postamble. Furthermore, the preamble and postamble written into each 54 bit sector may be the same as the preamble and postamble written into the 36 bit sector in the numeric apparatus A. It should be observed by reference to FIG. 5D that the preamble register 175 also receives a reset in the form of a sector clock pulse from a sector clock amplifier located in the memory section N.

The preamble which is written by the preamble register 175 consists of eight zeros followed by a one. The preamble is always added to any part number sector or data sector which is to be written on the drum in order to allow synchronization of the read electronics on playback. The first eight zeros of the preamble allow sufficient time for the read electronics to synchronize upon receipt of a signal from the memory section N. A postamble of two zeros is added to each part number sector and each part data sector which is introduced into the memory section N. The postamble serves to insure that all of the permanent bits contained in any part number sector or any data sector has, in fact, been written in the memory section N.

The central electronics unit H also includes an automatic read-write controller 175' which receives an input from a write clock amplifier in the memory section N, to be hereinafter described, and the controller 175', in turn, provides an output to the preamble register 175, the serial BCD adder/subtracter 170 and a write clock output to the console unit G over the write clock line WC. An output from the read/write controller 175' is also directed to the read enable circuit in the memory section N. When multiple console units are employed in a manner hereinafter described in more detail, the clock pulses are transmitted in the multiplexer which controls the various console units. The automatic read/write controller 175' receives a write input from the console unit G over the WRITE line to inhibit a read signal to the drum in the memory section N. The automatic read/write controller 175' also receives a sector clock signal from the memory section N for the timing of the various functions performed by the read/write controller 175'. When multiple console units G are employed, the automatic read/write controller 175' will receive a write fault signal in the manner as illustrated in FIG. 5D, if two or more console units attempt to update the same sector on the drum in the memory section N.

The read signal to the drum in the memory section N is derived from the automatic read/write controller 175' and must be disabled for a certain period of time in order to insure that information being received from the memory section N is free of write transients. This procedure is significant inasmuch as it is desirable to maintain a write operation for a minimum amount of time. Accordingly, the central electronics unit H will normally be maintained in a read condition so that the memory section N is not inhibited and must be biased to a write condition by the write signal from the console unit G over the WRITE line. However, as soon as writing has been completed, the electronics section H will automatically shift to a read condition. As indicated, the read and write functions are complements of each other with delays incorporated to provide for transient conditions. It should also be observed that the console inhibit signal over the console inhibit line CI to the console unit G is derived from the auto read/write controller 175' and is generated by any write signal from any console unit G.

It should be observed that the clock pulses used in the writing mode are not synchronous with the memory section N and, therefore, the postamble serves the function of insuring that all bits are written into the memory section. This postamble will enable the obviation of variations in motor speed, clock pulse rate, etc.

The central electronics unit H also includes a valid data detector 176 which is similar to the valid data detector 63 used in the numeric apparatus A. The valid data detector 176 operates in conjunction with a six bit counter 177 and receives an input from the six bit counter 177 in the manner as illustrated in FIG. 5D. The valid data detector 176 operates in conjunction with the bit counter 177 to determine when a sector of 54 bits has been achieved. Accordingly after 54 bits have been counted by the bit counter 177, the postamble of an unknown number of bits can be removed. The preamble ending in the first "one" bit can also be removed from the next 54 bit sector. Counting will be performed on a clock time basis inasmuch as the bit counter 177 receives clock pulses from the read clock amplifier in the memory section N. It can also be observed that read clock pulses and read data are transmitted from the valid data detector 176 to the console unit G.

The central electronics unit H also includes a modulo 8 counter 178 which operates in conjunction with the memory section N in a manner to be hereinafter described in detail. The modulo 8 counter 178 sequentially selects the eight tracks of the drum in the memory section N. Unlike the numeric apparatus A, this sequence is never altered except in the case of track jumping operations to be hereinafter described. It should be observed that the alpha-numeric apparatus B does not require a search shift register which was employed in the numeric apparatus A.

As indicated, the valid data detector 176 receives an input from the six bit counter 177. The valid data detector 176 also receives a data output signal and a read clock signal from the memory unit N in the manner as illustrated in FIG. 5D. The valid data detector 176 thereupon provides a memory data output over the memory date line MD and a read clock output over the read clock line RC to the console unit G. The six bit counter 177 also receives a read clock input from the memory unit N and has an output directed to the accumulated data sequencer 172. The modulo 8 counter 178 receives an index clock input from the memory unit N and has an output to a head selection circuit in the memory unit N, in a manner to be hereinafter described in more detail.

The valid data detector 176 serves as a device for removing both a preamble and a postamble added to both part number sectors and part data sectors before the part numbers and part data are introduced into the memory section N. The valid data detector 176 is capable of receiving NRZ data from the memory section N in a manner hereinafter described and producing an NRZ output which is transmitted to the memory data line MD for transmission of this data to the console unit G. As indicated, the preamble associated with any part number sector or part data sector will be recognized by the valid data detector 176. In recognizing the preamble, the valid data detector 176 will determine when the preamble "one" occurs. This is determined by disregarding the read data subsequent to sector clock pulse for an amount of time determined by a delay (not shown). The valid data detector 176 is then capable of disregarding the preamble and postamble associated with any sector and generating an NRZ output for transmission to the console unit G. Furthermore, since it is undesirable to count preamble and postamble clock pulses, the bit counter 177 will only start counting when the valid data detector 176 sends an advisory signal to the bit counter 177 which occurs after the preamble and postamble removal.

The central electronics unit H also includes a track jump sequencer 179 which has an output connected to the modulo 8 counter 178 and an output connected to the auto read/write controller 175'. The track jump sequencer 179 also receives an input from the track change sequencer 158 over the track jump line JT in the manner as illustrated in FIG. 5D.

The memory section N is similar to the memory section M employed in the numeric apparatus A and generally comprises a magnetic drum or disc 180 of the type normally used in digital computing equipment and which is capable of having NRZ data or data in phase modulation format or other conventional transitional coding scheme written thereon. Furthermore, it should be observed that the drum 70 may be made of a metallic disc having a magnetic tape or a magnetic recording surface disposed on the annular surface thereof.

The memory section N includes a memory circuit 181 which comprises a sector clock amplifier 182 providing sector clock pulses to the preamble register 175, the track jump sequencer 179, the valid data detector 176, and which also provides sector clock pulses to the console unit G along the sector clock line SC. It can be observed that the sector clock amplifier 182 receives the sector clock pulses from the drum 180. The memory electronics 181 also includes an index clock amplifier 182 which provides index clock pulses to the modulo 8 counter 178, the tract jump sequencer 179, the valid data detector 176 and to the console unit G over the index clock line IC. The index clock amplifier 183 receives the index clock pulses from the drum 180. A read clock generator 184, which also receives the read clock pulses from the drum 180 provides a read clock output to the valid data detector 176 and the six bit counter 177. A write clock amplifier 185 also receives write clock pulses from the drum 180 and transmits these pulses to the console unit G over the write clock line after processing by the automatic read/write controller 175'. Write clock pulses are also introduced into the accumulated data sequencer 172. A head selection circuit 186 is operable in connection with the index clock generator 183 and receives pulses from the modulo 8 counter 178 based on index clock time. The head selection circuit 186 operates to select the proper track for reading and writing by eight read-write heads 187 which are located in contact with the surface of the drum 180. The eight heads 187 are illustrated as a circle in FIG. 5D.

When the index clock amplifier 183 provides a clock pulse, the head selection circuit 186 will be energized in such manner that it causes the head 187 to switch to the next adjacent track on the drum 180. In this connection, it should be recognized that the drum 180 has a total number of sectors on each track which is equivalent to 557 bits per track. Furthermore, it should be observed that any number of tracks may be located on the drum 180, the number of which is limited only by the size of the drum 180. Moreover, the overall diameter of the drum 180 can be increased to provide space for recording additional sector bits in each track on the drum 180.

The heads 187 function as both reading heads and writing heads and receive inputs from a read enable circuit 188, a data input circuit amplifier 189 and a write enable amplifier 190. The data in amplifier receives data from the preamble register 175 in NRZ format and is capable of introducing both part number and part data onto the drum 180 in the drum code format. The write enable amplifier 190 actually receives the write command from the console unit G on the WRITE line. The memory electronics 181 also includes a data output amplifier 191 where the data read from the drum 180 is transmitted through the amplifier 191 to the valid data detector 176. It can be seen that the read clock amplifier 184 also has an output connected to the valid data detector 176. Finally, the read clock amplifier 184 receives an input from the read enable circuit 188.

ADDRESSING SYSTEM

Prior to discussion of the operation of the alpha-numeric data system of the present invention, it is important to appreciate the unique internal addressing system which is employed for both recording part numbers and part data on the drum and reacquiring those part numbers and associated part data from the drum. The addressing system of the present invention which operates on the basis of the internal construction of the apparatus B does not require any external "softwear" programing.

As indicated previously, the present invention is capable of introducing and recording information containing a locator portion (i.e., part numbers) and a descriptor portion (i.e., part data associated with the part numbers). The information may be recorded in such manner that a part number and part data associated with that part number are all located in the same track of the memory section, though it is possible to space the part numbers and associated data by one or more sectors. Accordingly, in the case of the numeric apparatus A, a part number would be written in one sector of one track of the drum where the sector would contain 36 bits and the part data associated with that part number would be recorded in the immediately following sector of 36 bits on the same track in which the part number was recorded. In the alpha-numeric apparatus, the part number would be recorded in one sector of one track of the drum and the part data associated with that part number would also be recorded in the next succeeding sector on the same track of the drum. Naturally, it is possible to vary this arrangement by recording the part number in one sector on one track of the drum and recording the data associated with that part number in another sector on the same track, but which data sector is spaced from the part number sector by one or more additional sectors in that track.

Figure 7:
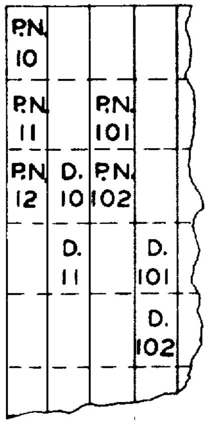
FIG. 7 is a schematic illustration of a magnetic drum or disc addressing scheme employed in the present invention.

In the preferred addressing technique of the present invention, the part numbers are written on one track of the drum and the data associated with those part numbers are recorded in sectors in another track of the drum which may be directly adjacent to the part number track or spaced from the part number track by a number of additional tracks. For example, it can be seen by reference to FIG. 7, that part numbers are recorded in consecutive sectors on the first track of the drum, that is, the left-hand track of the drum in FIG. 7. It should be recognized that only 4 tracks have been illustrated and a small number of sectors have been illustrated in each track. However, it should be understood that generally the drum contains a large number of tracks and a large number of sectors in each of these tracks. Furthermore, it should also be understood that each sector as illustrated in FIG. 7 is sized to contain 54 bits of information.

Returning to FIG. 7, it can be seen that a part number designated as P.N. 10 is recorded in the first sector of the first track. A second part number designated as P.N. 11 is recorded in the second sector of the first track, and a part number designated as P.N. 12 is recorded in the third sector of the first track. The data which is associated with the part number P.N. 10 and which data is designated as D 10 is recorded in the third sector of the second track. The data D 11 which is associated with part number P.N. 11 is recorded in the fourth sector of the second track. In like manner, a part number designated as P.N. 101 is recorded in the second sector of the third track, and the data associated with that part number, namely D 101, is recorded in the fourth sector of the fourth track. It can thus be seen that in the preferred form of addressing, the part numbers are located in consecutive sectors of one track. The data is located in the next adjacent track and is spaced from the part number with which it is associated by at least two sectors. In this manner, a number of console units can simultaneously search the drum for a particular part number and when that part number is found, the head can be switched to the next adjacent track in order to locate the data associated with that part number. The mechanism for accomplishing the switching of tracks is described in more detail hereinafter.

From the foregoing, it can be seen that the part numbers are recorded in a form of associative addressing. When the part numbers are recorded on the drum, the part number can be located by introducing the same part number in the console register 130. A comparative search is then performed in a manner to be hereinafter described until the desired part number is found on the drum. In this manner, the pre-recorded address is found by comparing the pre-recorded address with the particular address introduced into the console register, and recognizing the pre-recorded address and the desired address. On the other hand, it should also be observed that the data associated with this particular part number is directly addressed with respect to the part number. It should be observed that this data is located in a particular sector with respect to the part number. While the data may be located adjacent to the part number sector and in the same track, or it may be located in an adjacent track and even spaced from the part number by several sectors, it is nevertheless directly related in time and distance to the part number sector. Accordingly, when one searches associatively for the part number sector, the data associated with that number sector is automatically defined by virtue of the particular track and sector it would be recorded in, with respect to the part number sector.

It should be observed that the present invention provides a unique type of addressing system which is a combination of a form of associative addressing and a form of direct addressing. In essence, the combination associative-direct addressing can be defined as "a process for recording a word having a locator portion and a descriptor portion, or a group of words with a locator portion and a descriptor portion in a magnetic memory, or retrieving such word or words from such memory by serially recording bit combinations for a locator portion in a particular location of one sector of the memory thereby defining a locator address, and recording bit combinations for a descriptor portion in a particular location of another sector of the memory and which location of the descriptor portion is related to the locator portion in addressable manner, thereby defining a descriptor address; and retrieving such word or words by associatively selecting the locator address of the locator and directly selecting the descriptor address from the locator address."

Thus, in the combination associative-direct addressing, it can be seen that the 54 bits representing the part number are located in a particular sector of a certain track on the drum. The sector includes all of the bit combinations representing the part number recorded in serial fashion. The data (namely the descriptor) is recorded in either the same track or another track and in a particular sector in the data track. In other words, when the part number sector is located, it is located by an associative addressing technique in the manner as previously described. The data sector is located by referring to the location of the part number sector inasmuch as the data sector is located in a track and sector which is located in time and space with respect to the part number sector, and therefore automatically determinable.

In many cases, it is desirable to include two or more data sectors associated with a particular part number sector. The addressing scheme used in this latter case is more fully illustrated in FIG. 8. In this case, it can be seen that a part number designated as P.N. 10 is recorded in the first sector of the first track. The part number P.N. 10 will have two data sectors associated therewith which are designated as D $10_1$ and D $10_2$. The data sectors located in the track are adjacent to the first track, namely the data sectors are located in track No. 2. It can be seen that the data sector D $10_1$ is located in sector 3 of track No. 2 and the second data sector D $10_2$ is located in sector No. 4 of track No. 2. The next part number, namely the part number designated as P.N. 11, is recorded in the second sector of the first track. The two data sectors associated with P.N. 11 and which data sectors are referred to as D $11_1$ and D $11_2$ are located in the fourth and fifth sectors, respectively, of track No. 3. In like manner, the part number designated as P.N. 12 is located in sector No. 3 of track No. 1. The two data sectors associated with P.N. 12, namely, D $12_1$ and D $12_2$ are located in sectors 5 and 6, respectively, of track No. 2. Therefore, it can be observed that the two data sectors associated with the first part number are recorded in the next adjacent track, and are spaced from the part number by at least two sectors. For the next part number in the first track, the two data sectors are also spaced at least two sectors apart, and are located in the second adjacent track with respect to the part number track. The third part number has the two data sectors located in the next adjacent track and also spaced by at least two data sectors. For each succeeding part number, this arrangement is continued.

OPERATION OF THE ALPHA-NUMERIC DATA SYSTEM

From the foregoing description of the apparatus B, it can be observed that information may be entered into the console unit G by a plurality of techniques. First of all, both part numbers and part data associated with the part numbers can be introduced into the console G by means of actuation of the keys 113–116 on the keyboard 112. Secondly, data can be introduced into the console unit G, particularly for addition and subtraction functions, by means of the thumbwheel digit switches 138. Finally, data may be introduced into the console unit G by actuation of any one or more of the digit change switches 140. As indicated previously, information is introduced into the console unit G in such manner that a part number which may contain as many as 9 characters either in arabic form or decimal digit form is represented by 54 bits, or nine bytes of six bits each. Thus, a part number will be represented by a sector of 54 bits and the part data associated with that part number will be represented by a second sector of 54 bits.

When it is desired to write a new part number onto the drum 180, the operator of the apparatus B will actuate the clear switch 117. In the numeric apparatus A, it is necessary to introduce all zeros into the display shift register 20 and search the drum 70 for an all zero location. However, in the alpha-numeric apparatus B, the write new part number switch 123 operates with the zeros locator 137 to select an all zero sector location in the drum 180. After the clear switch 117 has been actuated, data may be introduced into the console register 130 through actuation of the various switches 113–116 on the keyboard 112. After the new part number has been introduced into the console register, circulation of this information will take place through the console register 130. It can be observed that the output of the console register 130 is recirculated back through the gate 146 and into the input of the console register 130. It should be observed that the data introduced through the keyboard is delayed slightly in order to account for any keyboard vibration as previously described in connection with the numeric apparatus A. The information introduced into the console register 130 will be visually depicted on the display tubes 111, in the manner as previously described. The anode shift register 135 and the six bit to 13 segment decoder 134, in combination with the console register 130 operate to collectively and consecutively energize each of the display tubes 111. Each character which is represented by six bits in the console register 130 will be visually depicted on one of the display tubes 111 for approximately 100 microseconds. Thereafter, the display will shift to the next adjacent display tube 111 for an additional 100 microseconds. This procedure of consecutive display of each of the characters represented by respective bits in the console register 130 is based on memory clock data which is received from the drum 180.

After the part number has been introduced into the console register 130, the operator can then press the write new part number switch 123. As this occurs, the gating structure previously described will be enabled in such manner to permit the part number to pass through the console data line CD into the central electronics unit H. This part number will pass through the serial BCD adder/subtracter and into the preamble register 175 where both a preamble and a postamble can be introduced onto the part number, and thereafter, the part number is written onto the drum 180. When the write new part number switch 123 is actuated, the display on the display tubes 111 will momentarily vanish and thereafter display the new part number. During this sequence, the search light 137' will be energized to indicate that no information can be written into the memory until the light 137' is deenergized. At the time that the display tubes 111 are deenergized, the console register 130 is not immediately available for new data due to the access time in the memory section N. Accordingly, if another switch on the console unit G is actuated during the time that the search light 137' is energized, no function can take place.

It should be observed that information in the console register 130 is continually circulating from the right-hand end of the register, reference being made to FIG. 5C, back to the input thereof. The information will shift in six bit bytes on a memory clock time basis. After six shift pulses have been generated for shifting six bits in the console register 130, a delay is created for the strobing of the display tubes 111. A second shift of 6 bits takes place on a memory clock time basis and strobing of the next display tube 111 then occurs. This sequence takes place continuously during the display operation.

When writing data onto the drum 180, the clear switch 117 is then actuated. The part number with which the data is to be associated is then introduced into the console register 130 by actuation of the various keys 113–116 on the keyboard 112. This information is then introduced into the console register 130 in the manner as previously described. Thereafter, the write data switch 121 is actuated which immediately causes the display tubes 111 to deenergize and the search light 137' to become energized. In addition, the part number which was displayed on the display tubes 111 will disappear leaving a blank display. During the time that the search light 137' is energized, searching will be accomplished to determine the location of the desired part number on the drum 180. The comparator 143 which is located in the console unit G will receive bits on a serial basis from the console register 130 through the zeros locator 137. In like manner, the comparator 143 receives data from the drum 180 on the read/data line. When the write data switch 121 is actuated, the data output amplifier 191 will receive the various part number sectors on the drum 180 through the heads 187. This information will pass through the valid data detector 176 for preamble and postabmle removal and for transmission over the memory data line MD. Accordingly, the information read from the drum 180 will be compared with the information from the console register 130 serially on a bit-by-bit basis.

After comparison has been recognized, the search light 137' will become immediately deenergized. It should also be observed that the sector counter 142 will be counting the sector clock pulses that are received from the central electronics unit H. The sector counter 142 will recognize the beginning of the sector in which comparison was found. As indicated, when comparison is found, the search light 137' will be deenergized. At this point in time, the operator can then introduce data into the console register 130 by actuation of the keyboard 112. Again, this data will be displayed on the display tubes 111 in the manner as previously described. The display of this data will enable the operator to make a visual check for accuracy of the information introduced into the console register 130. The operator then actuates the write data switch 121 for a second time. The display tubes 111 will again become deenergized and the new data will reappear thereafter in the display tubes 111. During the time that the display tubes 111 are deenergized, the search light 137' will be energized. When the write data switch 121 is actuated for the second time, the write data line is enabled thereby permitting the write amplifier 119 to cause the heads 187 to write this new data onto the drum 180. In addition, the write line WRITE will be activated causing the new data to be recorded.

Part data contained on the drum 180 can be read by first actuating the clear switch 117 and thereafter introducing the part number associated with the desired part data into the console register 130 by actuation of the keys 113–116 on the keyboard 112. After the desired part number has been introduced into the console register 130 and displayed on the display tubes 111, the operator can then actuate the read switch 118. It is to be noted that read information has been introduced into the console unit G at all times on the read data line. When the read switch 118 is actuated, the console register 130 will permit circulation of the bits contained therein until the least significant bit of the part number sector is located in the least significant bit position in the console register; that is, where the least significant bit is located in the right-hand flip-flop 131 in the console register 130. Comparison is then made with the information on the drum 180 on bit-by-bit basis in the manner as previously described. Comparison will be determined only at sector time, also in the manner as previously described. If the information in the console register 130 is compared with information read from the drum 180 on a bit-by-bit basis, then the next adjacent sector on the drum 180 in sequence, is the part data sector which contains the part data to be read. It should also be observed that the modulo 557 sector counter 142 was set in order to record the location on the drum 180 from which the part data was read and introduced into the console register 130.

This counter 142 is initialized so that each time the counter 142 achieves a count of 557 bits, the location of the desired data is recognized. At this point in time, the next sector is gated through the input gate 146 into the console register 130 and is circulated 6 bits at a time and displayed on the display tubes 111. When the read switch 118 is actuated, the display on the tubes 111 will momentarily vanish and the data associated with the part number will then appear. During the time that the display 111 is deenergized, the search light 137' will be energized in the manner as previously described. At this point in time, the data associated with the introduced part number has then been transferred to the console register 130. This data as indicated will be depicted on the display tubes 111.

In order to write or change an existing part number, the operator will actuate the clear switch 117. Thereafter, the operator will introduce the existing part number into the console register 130 by actuation of the keys 113–116 on the keyboard 112. This existing part number will be displayed on the display tubes 111 in the manner as previously described. Thereafter, the change part number switch 122 is actuated. At this point in time, the display tubes 111 will then clear and the search light 137' will become energized. During this portion of time, the existing part number which has been introduced into the console register 130 is being compared with information read from the drum 180 on a bit-by-bit basis in the manner as previously described. When comparison has been found, the search light 137' will be deenergized.

The operator can then introduce the new part number into the console register 130 by actuation of the selected keys 113-116 on the keyboard 112. The change part number switch 122 is actuated for a second time which will cause a deenergization of the display tubes 111 and a reenergization of the search light 137'. As this occurs, the changed part number which was introduced into the console register 130 is written on the drum 180. This information is passed through the output of the console register 130 over the console data line CD through the serial BCD adder/subtracter 170 and into the preamble register 175. A preamble and postamble will be added to this part number in the manner as described where the part number will be in a form to be properly written onto the drum 180 and the new part number is then redisplayed. If it is desired to read the part data associated with the rewritten part number, the read switch 118 is then actuated and this part data will appear in the console register 130 and the display tubes 111 in the manner as previously described.

As indicated previously, the preferred method of addressing the information which is recorded on the drum 180 resides in the recording of part number sectors on one track of the drum and part data sectors associated with those part numbers on at least the next adjacent track, and on a sector which is spaced in advance of the part number sector. It has been found that by recording the part numbers successively on an individual track or on a plurality of tracks, where the tracks contain only part numbers, that all part numbers can be examined in a substantially smaller amount of time then when data sectors are mixed with the part number sectors on the same track. Accordingly, the access time to the drum 180 is substantially reduced.

In the searching operation for a part number, the systematic search of all part numbers in the part number track will take place in the manner as previously described. When it is desired to acquire the data associated with that part number, the head select circuit 186 will select another track on the drum 180 containing the data sectors. In like manner, when it is desired to write data, the data is written on a sector of one of the tracks which does not include the part numbers. It is to be noted that the change track sequencer 158 has inputs from both the read sequencer 152 and the write sequencer 153. Accordingly, when it is desired to read or write in a sector located on a track other than a part number track, the read sequencer 152 or the write sequencer 153 is advised of the changes occurring in the change track sequencer 158. The change track sequencer 158 is connected to the track jump sequencer 179 and is capable of commanding a track jump to the central electronics unit H. This track jump signal is a high speed signal to the central electronics unit H which immediately causes the head select circuit 186 to select a different track. At the same time, the track jump sequencer 179 inhibits the data information and clock pulses from being transferred from the memory electronics 181 to the console unit G during the transition to and from the various tracks in the drum 180. This inhibition of information transfer is desirable after track changes in order to allow for head recovery. It should be noted that the inhibiting of the clock pulses is achieved by a signal from the jump track sequencer 179 to the autoread/write controller 175'. It should also be noted that the jump track sequencer generates an input signal to the modulo 8 counter 178.

It is to be noted that the data sector is located at least 2 sectors after the part number sector and on a different track in order to allow for head recovery time. Thus, when the reading head 187 detects the presence of the desired part number in a part number track, the change track sequencer 158 and the jump track sequencer 179 will cause another head 187 to read the next adjacent track in order to locate the correct data associated with that part number. In many cases, a sector of information is not read as the head switches from track to track and, accordingly, by locating the data sector at least two sectors in advance of the part number sector, the head 187 is capable of reading the data sector after the track switching operation. Furthermore, after the head 187 switches back to the original part number track, the head will remain on that track for at least one more revolution of the drum 180 before any additional track switching operations take place.

While the present invention speaks of switching the heads 187, it should be recognized that this terminology has been employed to maintain consistency with terminology of this art. Actually, the head 187 does not physically change position, during track switching operations, but only the head of the next adjacent track is caused to read or write in such next adjacent track. However, it should also be recognized that with proper circuitry, only one head 187 could be employed and with proper shifting mechanism, the head 187 could physically shift from track to track.

In the case where two or more sectors of data are employed with each part number, a sector counter (not shown) in the track jump sequencer 179 determines whether the part number sector is an even-numbered sector of an odd-numbered sector. This particular counter receives the sector clock pulses and index clock pulses for this purpose. It should be observed that the track jump sequencer 179 receives index clock pulses and sector clock pulses from the memory electronics 181. Accordingly, it is possible to maintain a recognition of the occurrence of the part number in the particular part number track. For example, in the situation where multiple data sectors are associated with one part number sector, the track jump sequencer will determine if the part number is an odd-numbered or even-numbered part number with respect to its location on the track. Thus, the part number P.N. 10 is an odd numbered part number since it occurs in the first sector of the part number track. Accordingly, the data associated with this part number sector is located in the next adjacent track. The part number designated as P.N. 11 is located in an even numbered sector, namely the second sector, and therefore, the data associated with this part number is located in the third track. In like manner, if three sectors of data were associated with a particular part number, data for the third part number in succession would be located in the fourth track.

The redundant address inhibit circuit 157 is designed to prevent the writing of a part number which has already been recorded, but still remains active in the drum 180. It is to be noted that all sequencers, and in fact, most of the components in this system are initialized by reset signals from the clear switch 117. The circuitry to each of the components from the clear switch 117 and the OR gate 136' has not been illustrated, in order to maintain clarity in the drawings. It is to be noted that the redundant address inhibit circuit 157 receives an input from the write part number switch 123 which provides indication to the redundant address inhibit circuit 157 when a write part number operation has been initiated upon actuation of the write part number switch 123. Further, the input to the redundant address inhibit circuit 157 from the comparator 143 advises when a sector of all zeros has been found in the drum 180 for the writing of a new part number. In like manner, the redundant address inhibit circuit 157 has an output to the write sequencer 153 which provides a nullify signal to the write sequencer 153 if the comparator detects the presence of the redundant address in the drum 180.

When the comparator 143 has found an all zeros location for writing a new part number, the write sequencer 153 will cause a review of the entire drum 180 to rearrive at the desired writing location. During the time interval between the finding of an all zeros location and the actual writing, which is equivalent to a full revolution of the drum 180, the comparator 143 is still looking for comparison with the console register data, namely the part number to be written. If during this period of time, the comparator finds that the part number has already been recorded on the drum 180, it inhibits any further writing as a result of the input to the write sequencer 153.

The bit counter 147 enables the use of partial sector addressing in the alpha-numeric data system of the present invention. In many cases, it is not necessary to employ all character positions in a sector for part number (locator) addressing. For example, a nine character sector space is available and if only five characters are necessary to identify a part number, the remaining four characters can be used for part data associated with the part number represented by the first five characters. In this case, the five six bit bytes or 30 bits would represent the part number and the additional 24 bits of the sector would represent part data associated with the five character part number.

When employing a partial sector address, the comparator 143 uses only those characters which comprise the address portion for purposes of comparison, and thereby ignores those characters representing data in that sector. In order to accomplish this partial address comparison, the comparator 143 is initialized after the data portion of the sector has passed in time. Inasmuch as the bit combinations representing the characters in the sector are recorded in reverse order, the first set of characters of a particular sector would then be data representing characters. Accordingly, if four of the characters in the nine character sector were data characters, the first four characters read by the comparator 143 would constitute the data characters. The bit counter 147' would count the first 24 bits representing these four characters, thereby rendering a determination that the data characters have passed beyond or passed through the comparator 143. At this point in time, the comparator then initiates comparison so that the remaining five characters in each part number sector are compared with five characters introduced from the keyboard 112 and then into the console register 130.

The data for addition and subtraction is introduced into the console unit G by means of the thumbwheel digit switches 138. This data is converted in the parallel to serial converter 139 and transmitted to the serial BCD adder/subtracter over the add/subtract data line ASD. The add/subtract data on the ASD line is also introduced into the nines complement generator 171 and the output of this generator 171 is reintroduced into the adder/subtracter 170.

In order to perform the addition or subtraction function, the operator firsts actuates the clear switch 117 and then introduces the part number associated with the part data to be changed by actuation of the keys 113–116 on the keyboard 112. The 6 bits representative of each character or the total sector of 54 bits is thereby introduced into the console register 130 in the manner as previously described. This part number will be displayed on the display tubes 111, also in a manner as previously described. Thereafter, the operator actuates the read switch 118 which will cause the display on the tubes 111 to momentarily vanish and the search light 137' to become energized. The part number address is searched in the memory 180 and when comparison is found, the search light 137' will be deenergized and will display the part data associated with that part number.

After the part number address has been found on the memory drum 180, the next adjacent sector to that part number contains the part data associated with that part number, and hence that part data will be displayed on the display tubes 111. The desired amounts to be added or subtracted are introduced into the console unit G by turning the thumbwheels 138 on the thumbwheel digit switches 138 to the desired quantities. If an addition function is to take place, the operator will then actuate the add switch 119 and, as indicated previously, the addition will take place in the adder/subtracter 170.

When the least significant bit is located in the least significant bit position in the console register 130, an inhibit line to the console register 130 will prevent clock pulses from being introduced into the console register 130. The sector counter 142 will then count the 557 bits and will recognize the address in the drum 180 when the least significant digit is located in the least significant bit positions of the console register 130. It should be observed that when the least significant bit of the sector is located in the least significant bit position in order to enable a subsequent writing operation, accordingly, clocking operations in the console register 130 terminate before receiving any sector clock pulses from the sector counter for proper addressing. Console data information and add/subtract data is simultaneously transmitted through the adder/subtracter 170. After addition has been accomplished, the sum is passed through the preamble register 175 where both the preamble and postamble are written onto the new part data. This sum is then written directly onto the drum 180 in the proper location.

The data generated by the thumbwheel digit switches 138 is in parallel form and is converted to serial format in the parallel to serial converter 139 and transmitted in this serial form to the adder/subtracter 170. In like manner, data from the console register 130 is also added to the serial BCD adder/subtracter 170 over the console data line CD. Addition of these streams of bits from the register 130 and parallel to serial converter 139 can only take place when the least significant bit of each of the bit sectors is located in such fashion that it is the first bit in the sector to be received by the serial BCD adder/subtracter 170. Furthermore, bit streams from both the converter 139 and the register 130 are shifted by means of clock pulses so that comparison is made on a clock pulse basis.

When the add switch 119 or the subtract switch 120 is actuated by the operator, the display tubes 111 will be momentarily deenergized and the search light 137′ will be energized. Actuation of the addition switch 119 or the subtraction switch 120 will also enable this information, which is operated upon in the adder/subtracter 170, to be written onto the drum 180 in the proper data sector after it passes through the preamble register 175. The new data is then displayed on the display tubes 111.

A character introduced into the console register 130 and displayed on the display tubes 111 can be changed in the same manner as the character was changed in the numeric apparatus A. When it is desired to change any particular character as represented by the display tubes 111, the operator merely presses the digit change switch 140 located proximate to that display tube 111 and the new character is introduced by actuating the proper key on the keyboard 112. The character will then immediately appear in the display tube 111 and the bits representing that new character will also be properly introduced in the proper bit positions in the console register 130.

It can be observed that the output of the display location decode circuit 133 is anded with the strobe from the six bit BCD encoder 126 through the delay 128 in the character load gates 127. An output from the display location decode circuit 133 will occur when the six bits representing the character to be changed are located in the least significant bit positions (flip-flops 131) of the console register 130. For example, when one of the character edit switches 140 is actuated, an output from the display location decode 133 will occur when the stage of the anode shift register 135 associated with that particular edit switch 140 is rendered true.

If the operator actuates the seventh character edit switch, an output from the display location decode circuit 133 will occur when the seventh stage of the anode shift register 135 is rendered true. One of the keys on the keyboard 112 is actuated after the actuation of a character edit switch 140. Actuation of this key will generate six bits through the six bit BCD encoder 126 and which six bits are introduced into the character gates 127. Again, these six bits will only enter into the last six bit positions of the console register 130 when a strobe is received at the character load gates 127. Furthermore, these six bits will only enter the last six bit positions of the console register 130 when the seventh stage of the anode shift register 135 is rendered true.

It should be observed that the part number/data flip-flop 141 monitors the various sectors which are part number sectors and the various sectors which are part data sectors. In essence, this flip-flop 141 maintains a monitoring of which sector should be allocated for part numbers. The first sector reached after a track change on the drum 180 is allocated for part numbers. This procedure eliminates the searching for a part number and avoids inadvertent possible comparison with part data. Accordingly, the flip-flop 141 discriminates between the various sectors in order to avoid any possibility of part data/part number confusion. It should also be observed that the particular clock pulses used will change with the particular memory section N employed. The index clock pulses are generated for each revolution of the drum 180. The sector clock pulses are provided by the sector clock amplifier 182 at the beginning of each sector. A write clock pulse is generated by the writer clock generator 185 which is essentially an oscillator used to clock the data on the drum. Read clock pulses are also generated from the data as it comes off of the drum 180 so that the read clock pulses are always in proper timing with the data read from the drum 180. Decoding is performed in the drum 180 by detecting flux reversal for generation of data as well as read clock pulses.

In the numeric apparatus A, the read sequencer 55 is always initiated at some state where it searches for bit comparison and reads the part data or part number for that location. In essence, the read sequencer 55 reads all sectors for which there is a data clock pulse from the valid data detector 63. The read sequencer 55 does not examine the sector next adjacent to which information is written, inasmuch as no clock pulse exists. As indicated previously, sector clock pulses are inhibited for one sector after a write operation. However, in the alpha-numeric apparatus B, the drum 180 is not generating data for any particular sector. Once data is transmitted from the preamble and postamble removal circuit 176, this data is ready for introduction into the console register 130.

The modulo 8 counter 178 by virtue of receipt of the index clock pulses selects the proper head 187 for reading from the drum 180. The head select circuit 186 actually selects one of the eight heads on the drum for this reading function. This selection operation is based on a continuous cycling for selection of the proper head 187 so that all sectors are examined sequentially. In essence, the sector clock pulses generated in the sector clock generator 182 indicate the beginning of each data sector of 54 bits and advises the console unit G of the beginning and ending of each sector in order to attain the proper 54 bits.

It should be observed that all clock information transferred from the console unit G to the drum 180 of the central electronics unit H and all return information to the console unit G are high speed transfers at the drum rate. However, it can be observed that if a long cable length were employed between the drum 180 and the console unit G, then all information transfers and the clock pulses would be delayed by as much as several hundred nanoseconds. Accordingly, the the alpha-numeric apparatus B of the present invention employs an early clock system which includes the early clock sequencer 159, illustrated in FIG. 5B.

Figure 9:
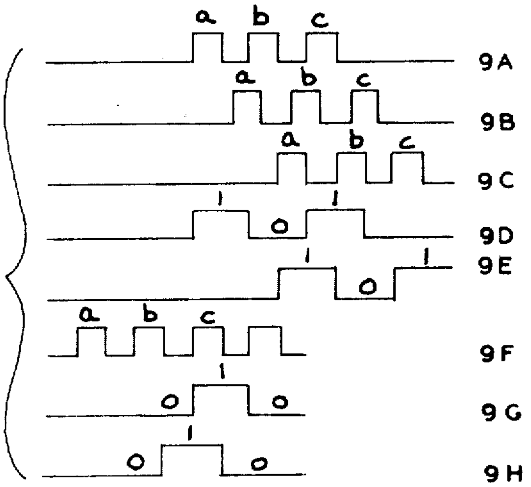

It can be seen that the early clock sequencer 159 receives a write clock input over the write clock line WC. It can also be seen that the auto read/write controller 175' generates the write clock signals from the central electronics unit H, and these write clock pulses are always used in any write operation for recording either part numbers or data on the drum 180. FIGS. 9A–9H illustrate the various timing relationships between the write clock pulses and the data that is to be written on the drum 180. FIG. 9A illustrates three write clock pulses designated as *a*, *b* and *c*, as they leave the central electronics unit H at the drum rate. If long cable transfer is involved, FIG. 9B illustrates the timing relationship with respect to the generation of the clock pulses and the time at which the three clock pulses *a*, *b*, *c* are received at the console unit G. FIG. 9C illustrates the timing at which data accompanied by these clock pulses would be received at the central electronics unit H after transmission from the console unit G. It can be seen that the clock pulses are received at the console unit G (FIG. 9B) approximately one and a half clock pulses late, due to long cable transfer. Again, it can be observed that the clock pulses received at the drum 180, as represented by the clock pulses in FIG. 9C, would be approximately three clock pulses late.

FIG. 9D illustrates the timing in which it is desired to have data from the console unit received at the central electronics unit for purposes of writing. However, it can be observed that due to the long cable transfer delay, the data which would accompany the clock pulses in FIG. 9C arrive in a time relationship as illustrated in FIG. 9E. Again, it can be seen that the 1 data pulse is again one and a half clock pulses late at the drum 180.

FIG. 9F illustrates the issuance of 3 clock pulses from the auto read/write controller 175' and which are two clock pulses early. By generating the clock pulse frame with two early clock pulses, it can be seen that the same 1 data pulse arrives at the central electronics unit H in accordance with FIG. 9G. Furthermore, it is possible to offset the data pulse with respect to the clock pulses so that the data pulse arrives in the manner as illustrated in FIG. 9H. Accordingly, to avoid the problem with temperature and time shifts, it is possible to add the proper delay so that the clock pulse falls essentially in the middle of the data pulse as illustrated by comparing FIG. 9A with FIG. 9H.

The number of early clock pulses which is utilized in any particular console unit G depends on the amount of cable delay incurred between that console unit G and the central electronics unit H. If a number of console units G were connected to the central electronics unit H, the amount of the number of early clock pulses utilized by each of the console units may differ, depending upon the amount of cable length. The maximum number of early clock pulses utilized by any one console unit would be sent to all console units and each of the individual console units would utilize the required number of early clock pulses for transmission of the data to the central electronics unit for a proper time basis. It can be observed that by employing early clock pulses, this excess in the total number of write clock pulses transmitted to all console units would interfere with reading operations. Those console units which are reading as opposed to writing would experience a net gain in clock pulses, and this would manifest itself during the recirculation of the data in the console register during write operations. Accordingly, the data would be shifted with respect to the sector clock pulse time, thereby nullifying the capability of reading. It can be observed that the data always lines up with the least significant bit first, and if three or four early clock pulses are directed to each console unit, there would be a shift in console data with respect to sector clock. Accordingly, the data shift in the console register 130 would be off at least three or four bits with respect to the first significant bit. In order to correct this possible situation, during the sector following any write operations the auto read/write controller 175 will send to all console units G, a number of clock pulses less than the normal amount, by an amount identical to the extra clock pulses or so-called early clock pulses during the writing operation. In other words, if three early clock pulses are sent to all console units during the writing operation, and in the sector following, three less clock pulses will be sent to each console unit, thereby rendering a net gain of zero clock pulses after two sectors.

Figure 11:
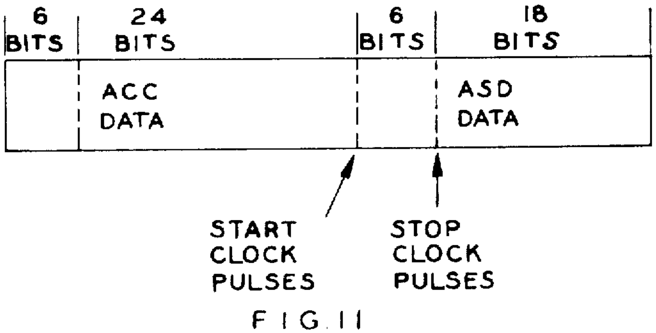
FIG. 11 is a schematic view of a 54 bit sector showing a portion of the sector reserved for arithmetic data and a portion of the sector reserved for accumulated data.

The alpha-numeric apparatus B of the present invention includes a provision for accumulating certain of the data in each of the data sectors, by virtue of the existence of the accumulated data sequencer 172, and the ASD storage register 173. It should be observed that in a nine character sector consisting of 54 bits, several of the bit positions would be reserved for an accumulated data portion where another portion of bits would be reserved for arithmetic data. Referring to FIG. 11, it can be seen that four character positions containing 24 bits are reserved for accumulated data, and three character positions consisting of eighteen bits are reserved for arithmetic data which is often called add/subtract data.

The accumulated data sequencer 172 is initiated by the subtract signal over the subtract line SUB, and also employs an input from the six bit counter 177, the latter of which indicates the position of the accumulated data in the sector. The six bit counter 177 will permit the gating of write clock pulses through the accumulated data sequencer 172 to the ASD storage register 173 in order to present add/subtract data to the serial BCD adder/subtracter 170. The clock pulses are added to the ASD storage register 173 during the portion of the sector which contains add/subtract data, and this data is the first group of bits which is read from the drum 180. The pulses directed to the ASD storage register 173 are stopped for the bit positions containing the next character which do not represent arithmetic data. The clock pulses are again started when the 37th bit is read from the drum 180, and this bit represents the beginning of the character positions. The clock pulses to the ASD storage register 173 and the adder/-subtracter 170 are controlled by the accumulated data sequencer 172. At a proper point in time, a clock pulse is directed to the ASD storage register 173 to cause the bit in the register 173 to be entered into the serial BCD adder/subtracter 170, so that these bits can then be serially added to data of the console register 130.

Thus, it can be seen that if data is entered by means of the thumbwheel switches 138 into the parallel to serial converter 139, data is transmitted over the ASD line through the arithmetic controller to the serial BCD adder/subtracter 170. This information is then subtracted from the ASD data portion of the sector and stored in the ASD storage register 173. This information is then clocked out of the ASD storage register 173 and then added to the accumulated data portion of the sector. Further, it should be noted that information can be continually accumulated in the portion of the sector reserved for accumulated data. Each time one wishes to add more data to this portion of the sector, the data merely accumulates itself as data is subtracted from the ASD portion of the sector. For example, if one wished to accumulate the number of sales, the four character positions consisting of 24 bits would be reserved for the accumulated sales.

It can be observed that there are a number of differences which exist between the alpha-numeric apparatus B and the numeric apparatus A. One major difference resides in the elimination of the search shift register in the apparatus B, which existed in the apparatus A. In the alpha-numeric apparatus B, the console register 130 is used for the multiple purpose of displaying the information in the display tubes 111, storing the data which is to be read, and assisting in the comparison. As indicated previously, this search shift register 50 in the numeric apparatus A is replaced with the sector counter in the alpha-numeric apparatus B. Secondly, in the writing of a new part number in the numeric apparatus A, all zeros are introduced into the display register 20; whereas in the alpha-numeric apparatus B, this function is obviated by virtue of the write new part number switch 132 and the attendant zeros locator 137. A third difference resides in the use of the 6 bit code for the alpha-numeric apparatus B as opposed to the 4 bit code for the numeric apparatus A. It should be observed that the console register 130 in the alpha-numeric apparatus B maintains its own addressing so that the multiple function console is more easily implemented, inasmuch as each console unit maintains its own address and each console unit can read in parallel. Furthermore, each console unit can read simultaneously for searching of the proper address. When the proper address of the part number or the part data associated therewith has been found, the console register G may simply permit the gating of the read data into the console register 130 for comparison in conjunction with the comparator 143. It should be observed that in multiple console units hereinafter described, one particular console unit G is not interfaced with any other console unit G.

One other significant difference resides in head selection, which in the alpha-numeric apparatus B is controlled only in the central electronics unit H. The head selection is not controlled by the console G. As indicated previously, head selection occurs by a cycle of monitoring through all sectors continuously. One other major difference between the two apparatus resides in the use of the transfer lines XS and DX which carry signals from the sequencers and the central electronics E to the console unit C. In the alpha-numeric apparatus B, the central electronics unit H essentially transmits transfer information to the console unit G at all times. The console unit G in the alpha-numeric apparatus B operates on the basis of comparison by reading the control data. This is performed on a sector clock time basis and the information is transferred to the drum 180 on a sector clock time. Transfer which was assisted by the central electronics unit E in the numeric apparatus A is now handled completely by the console unit G of the alpha-numeric apparatus B.

MULTIPLE ALPHA-NUMERIC CONSOLE UNITS

It is possible to connect a plurality of console units G to one central electronics unit H in the manner as illustrated in FIG. 6. It should be observed that each of these alpha-numeric console units G is schematically illustrated in FIG. 6 and only two of such units are shown. However, it should be recognized that at least 3 or more of these console units G could be connected to one central electronics unit H. When multiple console units are employed, these console units are interfaced to the central electronics unit H through a multiplexer 192. The console units have been designated as $G_1$ and $G_2$.

The data outputs of each of these console units $G_1$ and $G_2$ are all connected to an OR gate structure 193 including five OR gates 194 contained in the multiplexer 192. An individual arithmetic controller 169 is associated with each console unit so that a separate arithmetic controller will be provided for each console unit and each of these arithmetic controllers are contained in the multiplexer 192. Thus, it can be seen that the add/subtract data line from each of the console units $G_1$ and $G_2$ are connected to a first OR gate 194.

The console data line CD of each of these console units is connected to a second OR gate. In like manner, the write line WRITE, the add line ADD, and the subtract line SUB from each of these units is respectively connected to an OR gate 193 in the manner as illustrated in FIG. 6. In addition, the write, add and subtract lines are inputs to the arithmetic controller 169 associated with a particular console unit which issues "set carry" or end-around carry pulses labeled EAC and "correct" pulses labeled COR for each console unit to enable addition and subtraction functions. The outputs of each of these arithmetic controllers 169 are ored together in OR gates 195.

The outputs of the central electronics unit H do not pass through any gating structure but are connected directly to each of the individual console units $G_1$ and $G_2$ through the transmitters 165. For example, the sector clock line from the multiplexer 192 has two outputs, each being connected to a particular console unit. In like manner, the index output, the read clock output, the memory data output, the console inhibit output, and the write clock output from the central electronics unit H are each individually connected to the console units in the manner as illustrated. The data is sent continuously and sequentially to all console units from the central electronics unit except during the sector time in which any console unit performs a write operation, and the sector time immediately following the first sector time. It can be observed that multiple consoles are more easily implemented with the alpha-numeric apparatus B than with a numeric apparatus A, inasmuch as the alpha-numeric apparatus B maintains much of the electronic function in the console unit G.

When comparing FIG. 5D with FIG. 6, it can be seen that the components of the central electronics unit H and the memory section N have been combined into a unit schematically illustrated and labeled "Central Electronics". The central electronics unit of FIG. 6 contains all of the components of the memory section N and the central electronics unit H, the latter including the modulo 8 counter 178, the valid data detector 176, the six bit counter 177, the nines complement generator 171, the serial BCD adder/subtracter 170 and the preamble register 175, the auto read/write controller 175', the accumulated data sequencer 172, the ASD storage register 173 and the track jump sequencer 179, with the exception of the arithmetic controller 169.

The five input signals from each console unit, namely, the add, subtract, add/subtract data, console data and WRITE signals are all concerned with writing information on the drum 180 of the memory section N. Since these signals are only concerned with writing in one or more particular sectors of the drum 180, they can be gated so that a multiplicity of console units can virtually write into the memory section N simultaneously. In other words, the probability of two or more consoles functioning to write into the same memory sector of the drum during the same memory revolution is virtually zero, even with a large number of console units interfaced to the multiplexer 192.

The add, write and subtract lines after being regenerated by the receivers 160 (not shown in FIG. 6) are inputs to the arithmetic controller 169. The arithmetic controller 169, in turn, generates correct and set carry output signals based on the combination of the inputs to the controller 169. These outputs occur only at a sector time during which a write function is to take place. These outputs are then "ored" with the like signals from other console units in the OR gates 194.

The add/subtract data lines ASD and the console data lines CD are similarly "ored" in the gates 194. The outputs of all seven OR gates 194 are then transferred to the multiplexer 192. It can be seen that each console is able to access the memory section for a read or write operation without delaying or interfering with another console unit which is interfaced to the multiplexer 192.

When more than one console unit is connected to and capable of accessing a single central electronics unit, the system contains circuitry for (1) the detection of updates to observed data and (2) the prevention of a simultaneous changing of any part number or data from different console units. In other words, if one console unit G has accessed the memory section N and is displaying a part number or data sector on the display tubes 111, another remote console unit updating the part number or the data sector or sectors associated with that part number will cause the former console to blank its display. For this purpose, it is to be noted that the auto read/write controller 175' generates a console inhibit signal which is transmitted to each of the console units over the console inhibit line CI at the time any write operation takes place. Further, it is to be noted that the console inhibit signal is directed to the write sequencer 153 in each of the console units. In addition, the console inhibit signal is directed to the update clear sequencer 160 in each of the console units.

By means of this circuitry, if one console unit G has accessed the central electronics unit H in the memory section N by means of accessing the multiplexer, this first console unit G will have the part number or the data sector associated therewith displayed on the two display tubes 111. If another console unit G writes, a console inhibit signal is generated in the auto read/write controller 175' and the console inhibit signal is transmitted to each of the console units which are connected to the multiplexing unit. It should be noted that the sector address counter of the console unit G accessing the multiplexing unit will detect in time when the data or part number which is desired is passing the read and write heads 187 on the drum 180. Accordingly, if another remote console unit attempts to update that particular address by means of the part number or the data associated therewith, the remote console unit, which is also receiving the console inhibit signal, will generate a clear signal so that the data will be cleared from the display of the remote console unit. In addition, if two console units G attempt to update the same memory sector, the AND gate 194 in the multiplexer recognizes this update condition. Thereafter, a write fault signal is generated and transmitted to the auto read/write controller 175' inhibiting any write operation and generating a console inhibit signal to be sent to all console units G. This write fault signal is timed so as to clear all console units attempting to update this sector location.

As indicated previously, the inhibit signal which is generated in the central electronics unit is transmitted to all console units. Accordingly, the particular console unit G which intends to write data on the drum 180 also receives the same console inhibit signal. However, it is not desired to clear the console register 130 of the console unit G which is being operated to write information in the drum 180, so long as no other remote console unit is simultaneously accessing that particular address. Accordingly, when a particular console unit G is accessing the drum 180 at a particular address, the multiplexing unit issues a write fault signal and when the central electronics unit receives the write fault signal, the console inhibit signal is transmitted one sector away. Accordingly, two console units attempting to write in the same sector are subjected to a condition where the console register 130 and hence the display tubes 111 in both console units G are cleared in the same manner as if some remote console unit wrote in the same address. Furthermore, it can be seen that only the console unit G which is operating in a particular address can write information in that address, e.g., both the part number and data sectors. However, any other console units attempting to write in either that part number sector or data sector will generate a clear signal, thereby clearing the display tubes 111. This immediately advises the operator that someone else is accessing the drum 180 for those particular sectors. It can be seen that the auto read/write controller 175' will generate the console inhibit signal on the console inhibit line CI in the absence of any write fault signal. As indicated, in the presence of the write fault signal, the auto read/write controller 175' generates the console inhibit signal but waits for one sector before sending out this console inhibit signal. Furthermore, it should be recognized that the write fault signal is only illustrated as being generated in FIG. 6 inasmuch as this signal is only used with a multiplicity of console units. However, the write fault signal is generated by connecting each of the WRITE lines of each of the console units in an AND gate 194 in the manner as illustrated in FIG. 6. It should be observed that the receiver which receives the write fault signal in FIG. 5D does not have a compatible transmitter illustrated in FIG. 5C inasmuch as the signal is generated from the WRITE line as indicated previously and WRITE lines from all such console units are combined in the AND gate 194 as illustrated.

The update clear sequencer 160 is capable of clearing the console register 130 and the display tubes 111 when any other remote console unit attempts to change the data being examined in a particular console unit. It should be observed that the update sequencer receives inputs from the console inhibit line, the sector counter 142 and the write sequencer 153 in order to accomplish this function.

Figure 10:
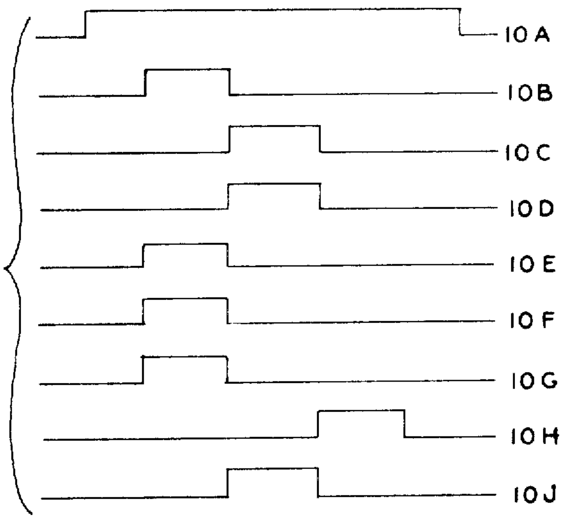
FIG. 10 is a composite view consisting of FIGS. 10A–10I and showing the temporal relationship of data pulses in such fashion that two sources cannot write in the same sector at the same time.

The timing relationship of the signals which prevents simultaneous writing of data is more fully illustrated in the composite illustration of FIG. 10 consisting of FIGS. 10A–10J. In this FIG. 10 it can be seen that FIG. 10A represents the size and timing relationship of the pulse from sector counter 142. FIG. 10B represents the size and timing relationship of the WRITE signal from each console unit for a normal write operation. FIG. 10C represents the size and timing relationship of the console inhibit signal over the console inhibit lines CI from the central electronics unit H. Furthermore, FIG. 10D represents the timing of the console inhibit override signal which is generated in the console unit to enable the particular console unit to write in a selected sector without regard to the console inhibit. It can be seen that both the console inhibit signal and the console inhibit override signal appear at the same time and, furthermore, both occur at the end of the WRITE signal.

If two or more console units attempt to update the same sector, FIG. 10E represents the WRITE signal for one console unit and FIG. 10F represents the WRITE signal for a second console unit, and both of which occur at the same point in time. FIG. 10G represents the timing of the write fault signal from the multiplex unit to the central electronics unit H. It can again be observed that the write fault signal occurs simultaneously with the WRITE signals from both of the console units. FIG. 10H represents the console inhibit signal sent to all console units if two console units attempt to write as shown in FIGS. 10E and 10F. The console inhibit override signal is represented by FIG. 10J and which is generated internally in each console unit that attempts to write.

If two console units G attempt to write in the same sector, as shown by two write signals (FIGS. 10E and 10F), a write fault signal (FIG. 10G) is generated in the multiplexer. This write fault signal inhibits any writing and causes the console inhibit signal (FIG. 10H) to be one sector later than normal, causing both consoles to clear since it negates the effect of the consoles own console inhibit override signal (FIG. 10J).

ADDITIONAL EMBODIMENTS

ZEROING OF ACCUMULATED DATA

The present invention also includes an optional circuit for adding and reading out, or so-called "zeroing-out" the accumulated data. In many cases, it is desirable to accumulate a certain portion of the data, such as sales, in order to provide a periodic summary of this data. For example, referring to FIG. 11, it can be seen that the first three characters consisting of eighteen bit spaces contains add/subtract data. The next three characters of the fifty-four bit sector contains eighteen bit positions representing other data such as price information, or the like. The next two characters consisting of twelve bit spaces would contain the accumulated data. Finally, the last character consisting of six bit spaces would contain other data. If the user of the apparatus desired to obtain a periodic reading of the accumulated data, such as a weekly or monthly indication of this accumulated data, it would be necessary to reduce the accumulated data to zero at the start of each week or monthly period in order to accumulate data only for that following week or month, or other selected period.

Figure 12:
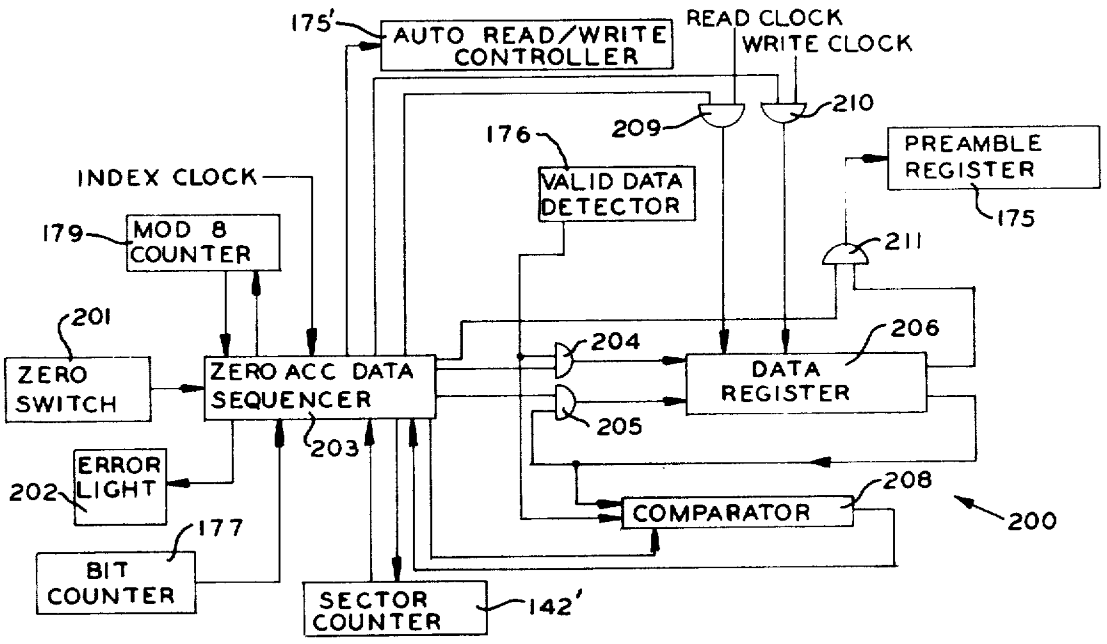
FIG. 12 is a schematic view of an optional electrical circuit which can be employed to zero-out any accumulated data in sectors of a memory section located in the central electronics unit.

The present invention therefore provides a zeroing-out circuit 200 which is more fully illustrated in FIG. 12 and which includes a zero switch 201 and an error light 202. The switch 201 and error light 202 are suitably mounted on the control panel 110 in any desired position. It can be seen that the zero switch 201 is connected to a zero accumulated data sequencer 203 which receives an input from the modulo eight counter 179 and also has an output directed to the modulo eight counter 179. The input to the zero accumulated data sequencer 203 essentially informs the sequencer 203 when the first track on the drum is ready for reading. The output from the sequencer 203 to the modulo eight counter 179 essentially inhibits the counter from counting on certain predetermined conditions, which are hereinafter described. The zero accumulated data sequencer 203 also receives index clock pulses from the memory section N in the manner as previously described. At this point it should be noted that the sequencer 203 is connected to many of the components which are described in FIGS. 5A–5D, and can be easily incorporated in the circuitry of FIGS. 5A–5D. Further, the zero accumulated data sequencer 203 receives an input from the auto read/write controller 175' and an input from the bit counter 177. This input from the bit counter 177 essentially informs the sequencer 203 in what portion of the sector the accumulated data may exist.

The zero accumulated data sequencer 203 also receives an input from a sector counter 142' which is similar to the sector counter 142 and which essentially informs the sequencer 203 when one complete revolution of one track has been performed in the memory section N. The output from the sequencer 203 to the sector counter 142 is designed to initialize the sector counter 142'.

The zero accumulated data sequencer 203 has a pair of outputs connected to AND gates 204, 205 which, in turn have outputs connected to a data register 206. One of the outputs of the sequencer 203 is anded with signals from the valid data detector 176 in the AND gate 204. The other of the outputs from the sequencer 203 is anded with recirculated data in a recirculating line 207 from the register 206 in the AND gate 205. By further reference to FIG. 12, it can be seen that an output from the recirculating line 207 and the output from the valid data detector 176 are both introduced into a comparator 208, which also receives an input from the zero accumulated data sequencer 203. Finally, the output of the comparator 208 is, in turn, introduced into the zero accumulated data sequencer 203. By further reference to FIG. 12 it can be seen that outputs of the zero accumulated data sequencer 203 are anded with both read clock pulses and write clock pulses, respectively, in AND gates 209, 210. It can also be observed that the outputs of the AND gates 209, 210 serve as inputs to the data register 206. The output of the data register 206 is anded with the output of the zero accumulated data sequencer 203 in an AND gate 211 which is, in turn, connected to the preamble register 175.

In order to zero-out the accumulated data contained in the accumulated data spaces of a particular data sector, the operator merely actuates the zero switch 201, which is located on the control panel 110, as previously mentioned. This action will cause the accumulated data in every sector on the drum to be reduced to a condition of all binary zeros, and hence, all character zeros. Actuation of the switch 201 will initialize the zero accumulated data sequencer 203. When the sequencer 203 receives a signal from the modulo eight counter 179, the sequencer 203 also sends an inhibit signal to the counter 179, thereby preventing any further track changes on the drum 180. At this point in time, the sequencer 203 will cause the first appropriate data sector to be read from the drum into the data register 206. This data from the drum will be introduced into the data register 206 at the read clock rate by virtue of the introduction of read clock pulses into the gate 209. When the particular sector containing the accumulated data has been read, the sector counter 142' will send a pulse to the zero accumulated data sequencer 203 advising the sequencer 203 when the track has been traversed and the sector in the data register is again available. The zero accumulated data sequencer 203 will thereby command a write operation to the auto read/write controller 175' and also permit the gating of write clock pulses to the data register 206 through the AND gate 210.

An input from the bit counter 177 to the sequencer 203 enables the sequencer 203 to prevent data from being recorded on the drum during the accumulated data portion of the sector, thereby causing zeros to be written on the drum during this portion of the sector. It should also be observed that during the write operation, the appropriate data is circular shifted in the data register 206 through the recirculation line 207 so that it will be retained in the register 206. During the succeeding revolution of the drum 180 in the memory section N, the sector counter 142' also advises the sequencer 203 where the data contained in the data register 206 was written on the drum 180 and will again appear. The sequencer 203 thereby commands the comparator 208 to make a bit for bit comparison of the data which was written on the drum with that data which is contained in the data register 206. If comparison does in fact exist, the zero accumulated data sequencer 203 will thereupon read the next appropriate data sector in sequence and repeat the above procedure. If, on the other hand, comparison did not exist, the sequencer 203 will cause the error light 202 to energize and also cause the cessation of further action.

When all data sectors on the track of the drum 180 which contain accumulated data character positions have been zeroes, the zero accumulated data sequencer 203 will allow the modulo eight counter 179 to increment the heads 187 to the next track. When the modulo eight counter 179 signifies track one is again the next track to be read, the zeroing sequencing has been completed and terminates.

MULTIPLE DATA SECTORS

The present invention also includes a provision for reading and writing in two or more data sectors associated with each particular part number sector. In many cases, the number of characters representing data associated with a particular part number often exceeds the number of characters representing that part number. Hence, if the part number is represented by nine characters or 54 bits, the data would contain more than nine characters and would exceed the length of a data sector of 54 bits. In this case, a second data sector is also employed, and if necessary, three or more data sectors may be employed. For the purpose of describing this facet of the present invention, only two such data sectors are described in connection with a particular part number sector. However, it should be understood that the same principle of operation applies to three or more data sectors associated with a particular part number sector.

In the event that two data sectors are used with each part number sector, the apparatus B is provided with a read data–1 switch 212, a read data–2 switch 213, and a read part number switch 214. These three switches 212, 213, 214 are all suitably mounted on the control panel 110 and will replace the read switch 118. The control panel 110 will also include a write data–1 switch 215 and a write data–2 switch 216. These two switches 215, 216 will replace the write data switch 121 which normally appears on the control panel 110 in the manner as illustrated in FIG. 4. The write new part number switch 123 and the clear switch 117 will also exist on the control panel 110 in the manner as illustrated in FIG. 4. The change part number switch 124 will also remain on the control panel 110.

It can be observed by reference to FIGS. 5A and 5B that the read switch 118 was connected directly to the read sequencer 152 and the read sequencer 152 had outputs directed to the data gate 146, the comparator 143, the clock gates 147, and the inhibit gate 148. When the dual read data switches, such as the switches 212, 213, are employed, the same general circuit structure exist except that additional sequencers are employed. By further reference to FIGS. 5A and 5B it can also be observed that the write data switch 121 was connected directly to the write sequencer 153 which had outputs directed to the read after write sequencer 146, the clock gate 147, the inhibit gate 148, the zeros locator 137 and the search light 118. When dual write data switches, such as the write data–1 switch 215 and the write data–2 switch 216, are employed, essentially the same circuit structure is present, except that additional sequencers are added to the circuit.

Figure 13:
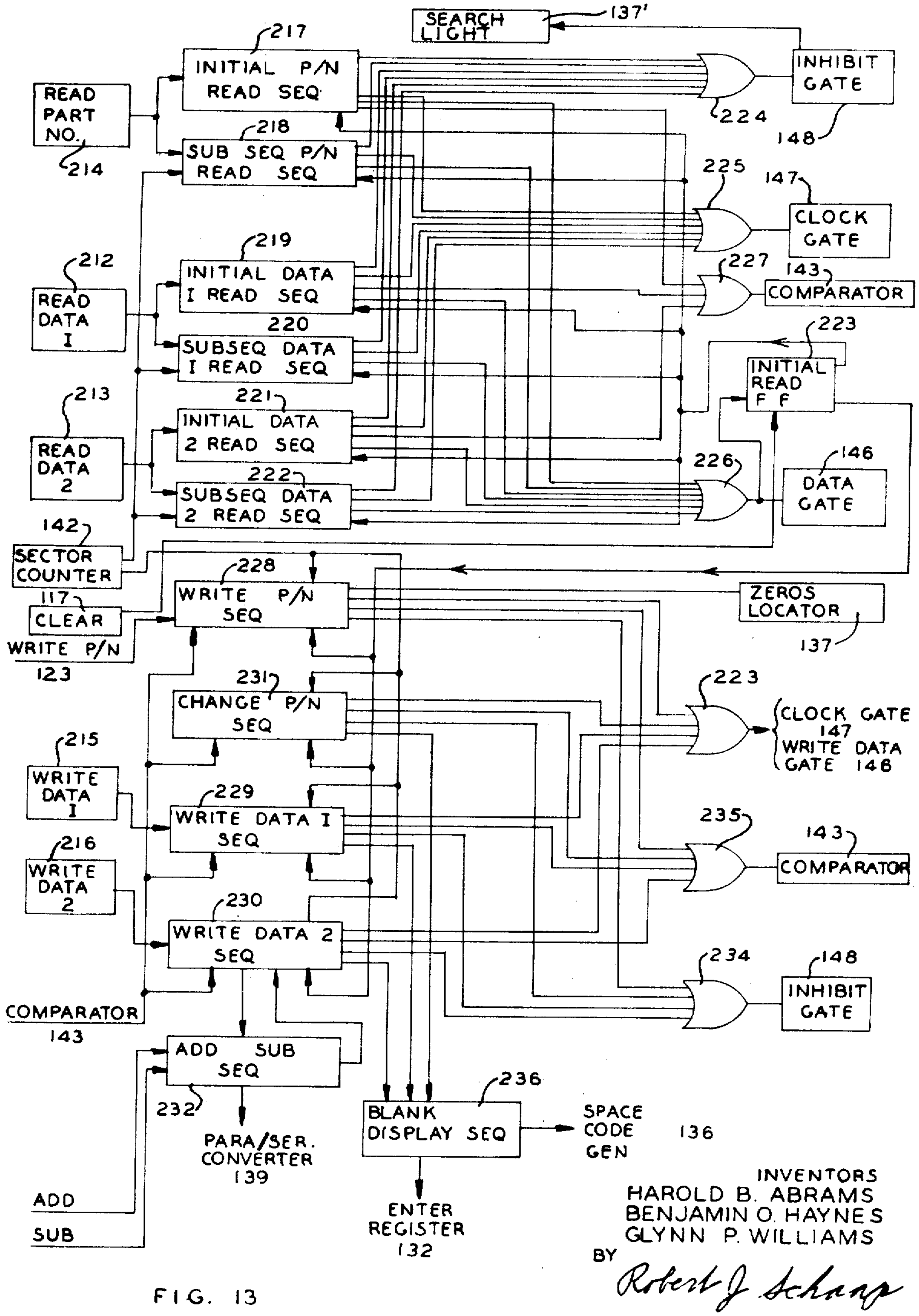
FIG. 13 is a schematic view of an optional electrical circuit which can be used for writing and reading two or more sectors of data associated with a particular part number; and, FIG. 14 is a schematic view of an optional electrical circuit which can be used for both major display tubes and minor display tubes.

Referring to FIG. 13, it can be seen that the read part number switch 214 is connected to an initial part number read sequencer 217 and a subsequent part number read sequencer 218. The read data–1 switch 212 is connected to an initial data–1 read sequencer 219 and a subsequent data–1 read sequencer 220. The read data–2 switch 213 is connected to an initial data–2 read sequencer 221 and a subsequent data–2 read sequencer 222. It can be seen that each of the sequencers 217–222 receive an input from an initial read flip-flop 223 which is connected to the clear switch 117.

Each of the sequencers 217–222 have first outputs which are ored together in an OR gate 224, the output of which is connected to the inhibit gate 148. It can also be observed that the inhibit gate 148 is connected to the search light 137' in the manner as illustrated in FIG. 13 and in FIG. 5A, as well. Each of the sequencers 217–222 have second outputs which are ored together in an OR gate 225, the output of which is connected to the clock gate 147. In addition, each of the sequencers have third outputs which are ored together in an OR gate 226, the output of which is connected to the data gate 146. The output of the OR gate 226 is also connected to the initial read flip-flop 223.

Each of the initial sequencers, that is the initial part number read sequencer 217, the initial data–1 read sequencer 219, and the initial data–2 read sequencer 221, have outputs which are ored together in an OR gate 227. The output of the OR gate 227 is connected to the comparator 143.

Each of the subsequent sequencers, that is the subsequent part number read sequencer 218, the subsequent data–1 read sequencer 220 and the subsequent data–2 read sequencer 222 each receive an input from the sector counter 142. It can also be observed that the output of the initial read flip-flop 223 is connected to read sequencer 152.

Figure 8:
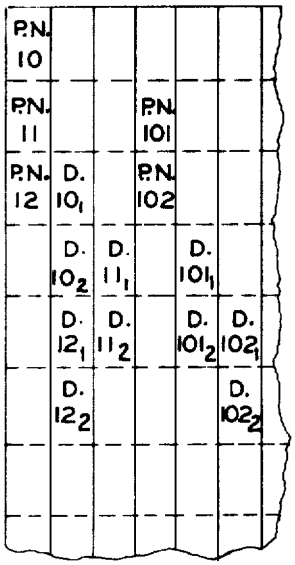
FIG. 8 is a schematic illustration of a modified form of magnetic disc or drum addressing scheme employed in the present invention.

For purposes of describing the operation of reading where two data sectors are associated with a particular part number sector, it may be assumed that each of the part number addresses have a data–1 sector and a data–2 sector relating to that part number address. Again, the data sectors would be directly addressed with respect to the part number sector in the manner as previously described and as illustrated in FIG. 8.

The read sequencers are divided into two types: (a) initial read sequencers 217, 219, 221 and (b) subsequent read sequencers 218, 220, 222. The initial read sequencers are activated only when a read switch, such as switches 212, 213, are actuated the first time after the clear switch 117 is actuated. In other words, the location of data associated with a part number is initially determined by a bit for bit comparison in the comparator 143. Once this comparison and location determination has occurred, the location of all the data sectors is maintained by the sector counter 142. Since it may be desired to read and re-read the data sectors without reentering the part number, the sector counter 142 can be used for all subsequent read operations. The first time a read operation occurs, the initial read sequencers are used. Once the sector counter 142 has been initialized, the subsequent read sequencers are used. The use of these sequencers is determined by whether or not a read has occurred since the clear switch 117 was first actuated.

In order to read either of the data sectors associated with a particular part number, the part number is introduced into the console register 130 by means of the switches on the keyboard 112. This part number will also be displayed on the display tubes 111 in the manner as previously described. When the read data–1 switch 212 is actuated, it will operate in conjunction with the initial read flip-flop 223 to initiate the initial data–1 read sequencer 219. The initial data–1 read sequencer 219 will enable the comparator 143, which will perform an associative comparison, to determine the location of that particular part number on the drum 180, in the manner as previously described. When the comparator 143 determines that the proper part number has been found on the drum 180, an input from the initial read data–1 sequencer 219 to the OR gate 226 and then to the data gate 146 determines which sector is loaded into the console register 130 for display.

Simultaneously with the loading of this information in the console register 130, the sector counter 142 is initialized and the initial read flip-flop 223 is set. A subsequent action of the read data–1 switch 212 will work in conjunction with the now set initial read flip-flop 223 to initiate the subsequent read data–1 read sequencer 220. This sequencer 220 uses an output from the sector counter 142 to determine which sector to load into the console register 130 by means of the OR gate 226 and the data load gate 146. The other read sequencers work in a similar manner to load the desired data into the console register 130. When the clear switch 117 is actuated, all of the sequencers 217–222 will be reset and cleared. Accordingly, it is possible to introduce a new part number for associatively searching the drum to find that part number and hence read the data sectors associated with that part number in the manner as previously described.

Referring again to FIG. 13, it can be seen that the write part number switch 123 is connected to a write part number sequencer 228, the write data–1 switch 215 is connected to a write data–1 sequencer 229, and the write data–2 switch 216 is connected to a write data–2 sequencer 230. It should also be observed that a change part number sequencer 231 is also provided. Each of the sequencers 228–231 receive input signals from the comparator 143 and input signals from the sector counter 142. The sequencers 228–231 each receive a reset signal from the initial read flip-flop 223 in the manner as illustrated in FIG. 13.

The write data–2 sequencer 230 has an output connected to an add/subtract sequencer 232 which receives add data from the console unit G over the add line ADD and subtract data from the console unit G over the subtract line SUB. The add/subtract sequencer 232 also has an output connected to the parallel/serial convertor 139 and an output back to the write data–2 sequencer 230. Each of the sequencers 228–231 have first outputs which are ored together in an OR gate 233 and second outputs which are ored together in an OR gate 234. The output of the OR gate 233 is connected to the clock gate 147, to the write line WRITE and the data gate 146. The OR gate 234 has an output which is connected to the inhibit gate 148. Finally, each of the sequencers 228–231 have third outputs ored together in an OR gate 235 which, in turn, has an output to the comparator 143. The write part number sequencer 228 also has an output to the zeros locator 137. The remaining three sequencers, namely the data–1 sequencer 229, the write data–2 sequencer 230 and the change part number sequencer 231, all have outputs which are connected to a blank display sequencer 236. It can be observed by reference to FIG. 13, that the blank display sequencer has an output to the space code generator 136 and an output to the enter register 132.

If it is desired to write a part number recorded in a fifty-four bit part number sector and which has two or more data sectors associated therewith, the operator merely actuates the write part number switch 123. Actuation of the switch 123 will initialize the zeros locator 137. By reference to FIGS. 5B and 5C it can be seen that the zeros locator 137 receives an input from the write sequencer 153. Actuation of the write part number switch 123 also will initialize the comparator 143. It can be observed that all of the sequencers 228–231 utilize a sector counter or sector clock pulse from the sector counter 142 to determine the actual writing location.

As indicated previously, when only one data sector was associated with a part number sector, the add and subtract data which was entered through the thumbwheel switches 138 was formerly entered into the write sequencer 143. However, when employing two or more data sectors, the add/subtract sequencer 232 is necessary. Only one of the data sectors associated with a particular part number sector will contain the arithmetic data, such as the add data or the subtract data. For the purpose of describing the operation of the present invention it will be assumed that the second data sector contains the arithmetic data; however, it should be recognized that the first data sector could otherwise contain the arithmetic data. It should also be recognized that the entire sector of 54 bits could be utilized for arithmetic data, or only a portion of the sector could be utilized to contain arithmetic data. In the event that the first data sector would contain the arithmetic data, the output of the add/subtract sequencer 232, which is illustrated as being connected to the write data–2 sequencer 230, would instead be connected to the write data–1 sequencer 229.

When it is desired to either add or subtract information to any of the arithmetic data portions of the second data sector, the operator introduces the second data sector into the console register 130 by actuation of the read data–2 switch 213 in the manner as previously described. The add or subtract data is introduced by means of actuation of the thumbwheel switches 138. It can be seen that this add and subtract data is transmitted to the parallel to serial converter 139 in a manner commanded by inputs to the parallel to serial converter 139 from the add/subtract sequencer 232.

The blank display sequencer 236 is connected to the enter register 132 and to the space code generator 136 for purposes of removing the display in the display tubes 111 after actuation of any of the write switches, such as the switches 123, 215 or 216. If the operator attempts to write any information in the wrong data sector, the display tubes 111 will immediately generate an all blank display upon actuation of the improper write switch. In other words, if the operator intends to write information in the second data sector and calls up the second data sector from the drum 180, he will actuate the write data–2 switch 216. If the operator thereafter introduces information by means of actuation of the switches on the keyboard 112 and inadvertently actuates the write data–1 switch 212, the display tubes 111 will immediately "blank" and all blanks will be entered. However, a subsequent actuation of the same write data switch, namely the write data–1 switch 212, will actually write the new data introduced through the keyboard 112 onto the drum 180.

If the sector in which it is desired to write is already displayed on the tubes 111, actuation of the proper write data switch will rewrite the data that is displayed and subsequently read that data back through the console register 130 and the display tubes 111. In other words, if the operator introduces the first data sector into the write data–1 sequencer 229 by actuation of the write data–1 switch 215 and enters new data through the keyboard 112 into the console register 130, a subsequent actuation of the write data–1 switch 215 will cause the information introduced into the console register 130 to be written into the first data sector and hence the information which he has previously introduced into the first data sector on the drum. Thereafter, this information will be automatically read back through the console register 130 and displayed on the display tubes 111.

For example, if the operator introduces a part number into the console register 130 by means of actuation of the switches on the keyboard 112 and actuates the write data–1 switch 215, an associative search is performed until that particular part number address is found on the drum 180. The blank display sequencer 236 will then blank the display and allow the operator to introduce additional data by means of the keyboard 112 and actuates the write data–1 switch 215 again. This action will introduce the information into that first data sector. It should be observed that this feature of blanking the display tubes 111 allows the employment of the character edit switches 140. Furthermore, it should be observed that any time a write operation is performed through actuation of any of the switches 123, 215 or 216, a read operation is thereafter automatically performed.

The add/subtract sequencer 232 actually serves two main purposes in that it loads the parallel-serial converter 232 with the add/subtract data from the console unit G, and sequencer 232 renders a signal to the write data sequencer 153 to write this data on the drum 180 and display the data in the display tubes 111. The addition functions merely involve the sending of console data to the central electronics unit H to be written along with the add/subtract data in the parallel-serial converter 139. The central electronics unit H actually performs the addition through the use of the arithmetic controller 169 and subtraction through the use of the arithmetic controller 169 in conjunction with the nines complement generator 171 and will cause this information to be written on the drum 180.

The initial read flip-flop 223 serves as a sequencer select flip-flop since it determines whether the sequencers will use the comparator 143 or the sector counter 142. If the operator actuates the clear switch 117 and introduces a part number by means of the switches on the keyboard 112 and then further actuates the write data–1 switch 215, the display tubes 111 will immediately display the part number and will blank. However, during this sequence the comparator 143 is used to search the part number on the drum 180 and also sets the sector address counter 142. If a subsequent write or read operation is initiated before the clear switch 117 is actuated, the sequencers 228–231 will always utilize the input from sector counter 142 rather than from the comparator 143.

The initial read flip-flop 223 also prevents the accidental writing or changing of a part number after an operation. The write part number sequencer 228 and the change part number sequencer 231 are disenabled by the initial read flip-flop 223 to prevent accidental use while other operations are being performed. In order to use these sequencers again, it is necessary to clear the system by actuation of the clear switch 117.

MAJOR AND MINOR DISPLAYS

Figure 14:
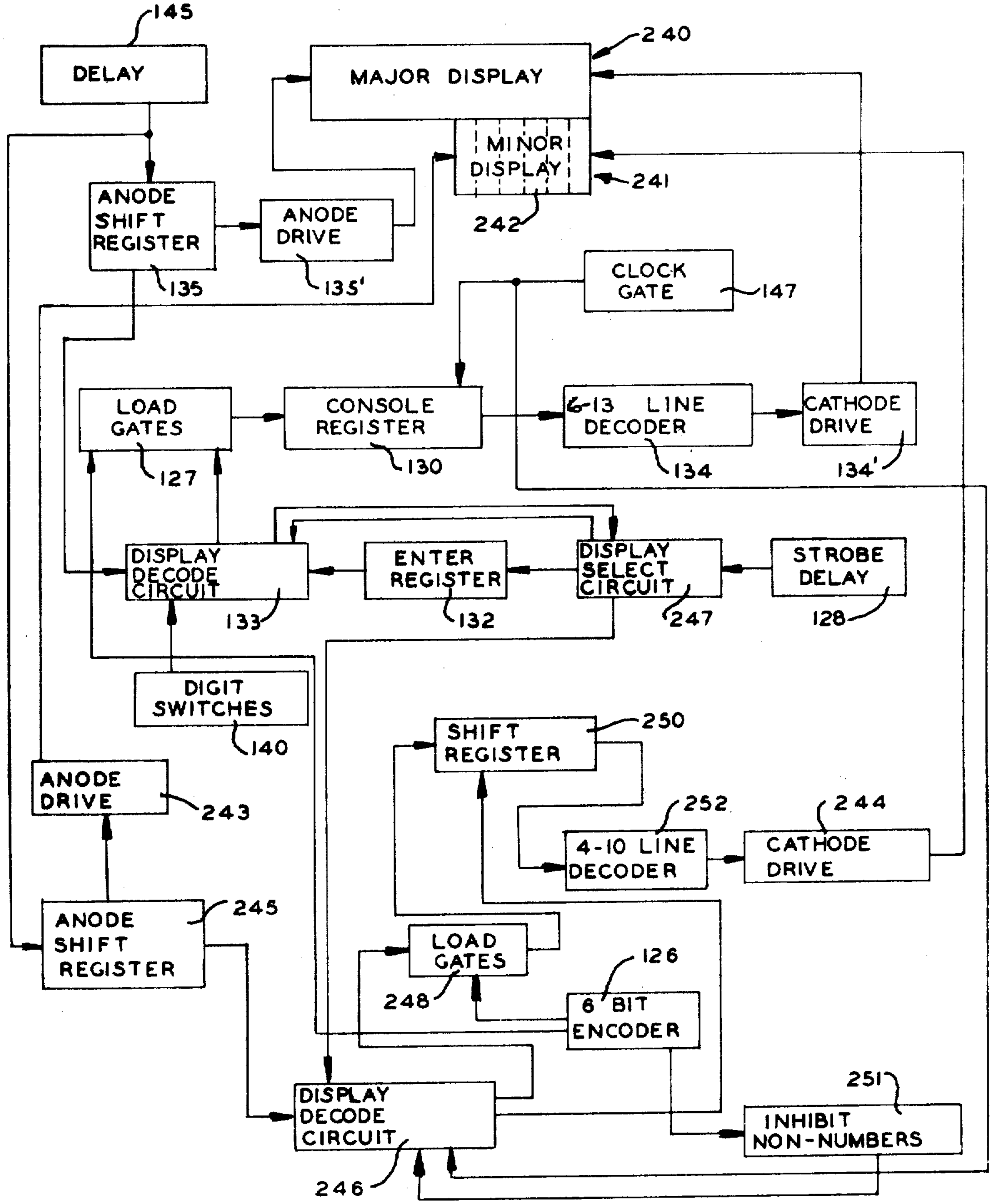

If the two digits of add/subtract data which are introduced with the thumbwheel switches 138 are not sufficiently long for their desired function, an electronic display with display tubes similar to the main console display may be used. This display can contain any number of numeric characters, but for the following discussion will be five characters long. This display is called the minor display 241 as opposed to the main console display previously discussed which will be referred to as the major display 240. The minor display 241 contains five cold cathode display tubes 242. FIG. 14 shows the two displays 240, 241 and their interaction. It should be recognized that the display tubes 242 would also be in a visible location on the console unit B and preferably located under the display tubes 111 of the major display 240.

The major display 240 operates in substantially the same manner as previously described. The major display 240 is operated by means of the delay 145, the anode shift register 135, the anode driving circuit 135', the six bit BCD to 13 line decoder 134, the cathode driving circuit 134', the display decode circuit 133, the enter register 132, the load gates 127 and the strobe delay 128. It can be seen by comparing FIG. 14 to FIGS. 5B and 5C that the components which operate the major display 240 in conjunction with the console register 130 are connected in substantially the same manner.

Thus, the delay 145 has an input to the anode shift register 135 which, in turn, has an input to the anode driving circuit 135'. The major display 240 receives an output from the anode driving circuit 135'. The anode shift register 135' also has an output connected to the display decode circuit 133 which receives an input from the character edit switches 140 and the enter register 132. Furthermore, the display decode circuit 133 has an output to the load gates 127 which, in turn, introduces the information to be displayed into the console register 130. The load gates 127 also receive an input from the six bit encoder 126. The information in the console register 130 is introduced on a clock time basis by means of clock pulses which are introduced into the console register 130 from the clock gate 147. The output of the console register 130 is directed to the six bit to thirteen line decoder 134 which, in turn, operates the cathode drivers 134'. By reference to FIG. 14, it can be seen that the cathode driving circuit 134' has an output to the display tubes 111 of the major display 240.

The minor display 241 is operated by similar circuitry and receives inputs from an anode driving circuit 243 which is similar to the anode driving circuit 135' and a cathode driving circuit 244 which is similar to the cathode driving circuit 134'. The anode driving circuit 243 receives an input from an anode shift register 245 which is similar to the anode shift register 135 and also serves to monitor the energization of the various tubes 242 in the minor display 241. The anode register 245 actually provides an indication of a particular six bit location and its representation constitutes the energization of a particular display tube 242. The anode shift register 245 receives an input from the delay 145 for purposes which will presently more fully appear. The anode shift register 245 also has an output directed to a display decode circuit 246 which is similar to the display decode circuit 133. The display decode circuit 246 operates in conjunction with the anode shift register 245 in a manner to be hereinafter described in more detail.

By reference to FIG. 14, it can be seen that the display decode circuit 246 receives an input from the clock gate 147 and an input from a display select circuit 247. The display select circuit 247 provides an input to the enter register 132 and an input to the display decode circuit 133 and also receives an input from the display decode circuit 133. In addition, the display select circuit 247 receives a strobe input from the strobe delay 128. The display decode circuit 246 has an output directed to load gates 248 which also receives an input from the six bit encoder 126. The load gates 248 have an input to a shift register 250 which is similar to the console register 130 and which operates in the same manner as the console 130 for purposes of energizing the display tubes 242. Accordingly, the shift register 250 will contain thirty multi-stable elements such as flip-flops (not shown).

The shift register 250 receives an input from the display decode circuit 246 and the display decode circuit 246 receives an input from an inhibit non-number circuit 251, the latter also having an input from the six bit encoder 126 for purposes which will presently more fully appear. The output of the shift register 250 is directed to a four-to-ten line decoder 252 which, in turn, provides an input to the cathode driving circuit 244.

The display decode circuit 133 operates in conjunction with the anode shift register 135 and the enter register 132 to enable the loading of keyboard characters into sequentially located character positions of the console register 130 and, hence, sequentially located display positions. In like manner, the display decode circuit 246 operates in conjunction with the anode shift register 245 to enable the loading of keyboard characters into sequentially located character positions of the shift register 250 and hence, sequentially located display positions. The display tubes 242 are also individually and consecutively energized in order to display the various characters represented by the thirty bits in the shift register 250. Each display tube will internally contain 10 cathodes, each representing the digits 0–9 and the four to 10 line decoder 252 will cause the character corresponding to the character introduced into the shift register 250 to be illuminated.

The anode driving circuit 243 actually contains five anode drivers which serve as level converters to illuminate the tubes sequentially. Each time that six bits are shifted out of the shift register 250 into the decoder 252, six new bits will be located in the last six spaces of the shift register 250 and these six bits describe the next decimal digit to be displayed.

All of the zero cathodes of the display tubes 242 are connected to one cathode driver in the cathode driving circuit 244. Thus, if the six bits shifted into the anode shift register 245 were zeros, the six bits would, in fact, decode as a zero. Furthermore, the selected cathode driver resulting from this examination of the zero would be switched to a ground condition. One bit in the anode shift register 245 is permitted to circulate and this bit will cause a selected anode driver to be driven from a zero voltage state to a 170–230 voltage state. However, only one of the five anode drivers in the anode driving circuit 243 will be energized at any one point in time. Accordingly, if a zero was being examined, a zero in a display tube 242 will be lit for a selected period of time. This period of time for energization of any of the display tubes 242, as well as any of the display tubes 111 in the major display 240, is determined by the delay 145.

The anode shift register 245 has five stages compared to the anode shift register 135 which has nine stages. Each of the five stages in the anode shift register 245 will represent one character. The last stage of this register 245 will represent the least significant character. One of the stages in the anode shift register 245 will be true when the six bits representative of this stage are located in the shift register 245. Accordingly, all transfers will take place with the least significant bit first. Furthermore, when the particular stage is true, the data contained in the shift register 250 is serially aligned with the least significant bit in the first position.

The remaining portion of the circuitry which operates the minor display 241 operates in the same manner as the circuitry which operates the major display 240; many of the components which operate the minor display 241 being functional duplicates of the components which operate the major display 240.

The bits which have been entered into the shift register 250 are shifted into the four-to-ten line decoder 252. A pulse from the display decode circuit 246 is also introduced into the load gates 248 for shifting the data in the shift register 250. This pulse will last for approximately 100 microseconds. Each time that six bits which correspond to an entered character are located in the last six flip-flops of the anode shift register 243 and the last six stages of the shift register 250, a pulse will be generated by the decode circuit 246 enabling display through the display tubes 242. Each tube 242 will remain energized for approximately 100 microseconds. Thereafter, six new bits representing a decimal digit or arabic character are shifted into the shift register 250 and a new character representing the next six least significant bits is displayed on the display tubes 242. As six bits are shifted into the last six bit positions of the shift register 250, these six bits are also presented to the four-to-ten line decoder 252 in order to provide for energization of a new cathode driver in the cathode driving circuit 244. Simultaneously therewith, shifting will also occur in the anode shift register 245.

As indicated previously, data entered into the display tubes 111 always enters from the left, reference being made to FIGS. 4 and 14. However, data entered into the display tubes 242 of the minor display 241 will always enter from the right, reference being made to FIG. 14. Accordingly, the anode shift register 245 will always be loaded with the latest number introduced from the keyboard as the rightmost display tube 242 is energized with this latest introduced number. As new numbers are introduced, all such numbers will shift to the left and this shift will be caused by the display decode circuit 246.

It should be observed that the console register 130 receives clock pulses from the clock gate 147 and the two anode registers 135 and 245 also are shifted by clock pulses from the delay 145. The display decode circuit 246 causes a shift as indicated previously, and will inhibit a shift every time that a strobe is detected from the display select circuit 247. In essence, the display decode circuit 246 inhibits one group of divide by six clock pulses to the shift register 250. The anode shift register 135 meanwhile allows the shift to cause a different phase relationship between the anode shift register 245 and the shift register 250 thereby causing an apparent shift in the displayed data. Inasmuch as information is loaded from the right into the minor display 241, the need for an enter shift register, such as the enter register 132, is obviated.

As indicated previously, the shifting of the information in the console register 130 is effected by clock pulses from the clock gate 147. The shifting of the information in the shift register 250 is effected by one group of divide by six clock pulses to the shift register 250. Each six bits will shift when data is entering into the shift register 250. The display select circuit 247 determines whether information entered into the keyboard 112 will be displayed through the major display 240 or the minor display 241.

Prior to any read operation, all keyboard entries will enter into the major display 240 unless the major display is filled, in which case the subsequent entry of numeric information will enter into the minor display 241. The minor display 241 has been reserved for numeric characters whereas the major display 240 is reserved primarily for arabic characters. Accordingly, any time that a number switch on the keyboard 112 is actuated, the number will be displayed on the minor display 241 and any time that an arabic character is introduced by means of a keyboard 112 this character will be displayed in the major display 240. For this purpose, the inhibit non-numbers circuit 251 is provided. It can be observed that this inhibit non-number circuit 251 has an output to the display decode circuit 246 and an input from the six bit encoder 249. Accordingly, this circuit 251 takes the six bits which were introduced and determines if the six bits represent a numeric character. If the six bits do not represent a numeric character, the inhibit non-number circuit 251 will inhibit the decode circuit 246 from operating. On the other hand, no inhibit will exist if the character introduced was in fact a number. If each of the tubes 111 in the major display 240 has been filled with characters, any subsequent numeric characters will be introduced into the minor display tubes 242 of the minor display 241.

Furthermore, if a read or write operation has been performed, actuation of any numbers will also be introduced into the minor display, unless a character edit switch 240 has been actuated, in which case the numbers or letters will be introduced only into the major display 240. This process is accomplished by examining the output of the major display decode circuit 133 which output will only be present if bits are contained in the enter register 132, or one of the character edit switches 140 has been actuated. Furthermore, any read or write operation will automatically clear the enter shift register 132.

It should be understood that changes and modifications in the form, construction, arrangement and combination of parts presently described and pointed out in the claims can be changed and substituted for those herein shown without departing from the nature and principle of our invention.

Having thus described our invention, what we desire to claim and secure by letters patent is:

1. A non-programmable data storage and retrieval apparatus for storing and retrieving information therein on a real time basis by means of direct switch actuation, said apparatus comprising:

a. switch-type input means for introducing a plurality of informational characters into said apparatus and where said characters are unrestricted to format by apparatus parameters, b. translation means operatively connected to said input means for converting such informational characters into a sector of informational data bits, c. a data register member having a plurality of data register elements and being operatively connected to said translation means for receiving said sector of data bits, said number of data register elements being at least equal to the number of data bits in said sector, d. a data storage device operatively connected to said data register member and capable of having a first sector type of informational data bits recorded thereon and a second sector type of informational data bits recorded thereon,
e. said data register member being operatively interposed between said data storage device and translation means to receive informational data bits from said translation means for ultimate delivery to said data storage device and to receive data bits from said data storage device to thereby enable both read and write operations,
f. sequencing means operatively connected to said data storage device to perform read-write sequencing and to control the mode of operation with respect to said data storage device,
g. and switch means operatively connected to said sequencing means and being operable to control said mode of operation.

2. The data processing apparatus of claim 1 further characterized in that the apparatus includes means for introducing clock pulses to said read-write sequencing means to control same on a clock time basis.

3. The data processing apparatus of claim 1 further characterized in that the apparatus includes means for introducing clock pulses to said read-write sequencing means to control same on a clock time basis, means for adding shift pulses to said data register means and gating means operable to permit introduction of said shift pulses to said data register means to enable a recirculation of the informational data bits therein on a clock time basis.

4. The data processing apparatus of claim 1 further characterized in that the apparatus is provided with counter means operatively connected to said read-write sequencing means and to said data register member to recognize and distinguish between said first sector type and said second sector type.

5. The data processing apparatus of claim 1 further characterized in that the apparatus is provided with counter means operatively connected to said read-write sequencing means and to said data register member to recognize and distinguish between said first sector type and said second sector type, and comparison means operatively associated with said last named means to compare each first sector type in said data storage device with the informational characters introduced into said apparatus.

6. The data processing apparatus of claim 1 further characterized in that the apparatus is provided with counter means operatively connected to said read-write sequencing means and to said data register member to recognize and distinguish between said first sector type and said second sector type, a search register member operatively connected to said counter means and said data storage device for receiving sectors of informational data bits from said data storage device, said search register member also being operatively connected to said data register member to recognize informational data bits introduced into said data register member, and comparison means operatively associated with said search register member to recognize comparison when it exists.

7. The data processing apparatus of claim 1 further characterized in that the apparatus is provided with counter means operatively connected to said read-write sequencing means and to said data register member to recognize and distinguish between said first sector type and said second sector type, a comparator mechanism operatively connected to said counter means and having an operative input to said data register member, said comparator mechanism being operatively connected to said data storage device for receiving sectors of data bits and enabling comparison determinable by said data register member.

8. The data processing apparatus of claim 1 further characterized in that means is included in said translation means to generate the informational data bits in BCD format.

9. The data processing apparatus of claim 1 further characterized in that means is included in said translation means to generate the informational data bits in alpha-numeric code format.

10. The data processing apparatus of claim 1 further characterized in that the apparatus comprises display means operatively associated with said data register member for retranslating the data bits introduced in said data register member to the informational character form and visually displaying said information characters.

11. The data processing apparatus of claim 10 further characterized in that said display means comprises a plurality of individual display members, an anode driving means including a plurality of anode drivers and a cathode driving means including a plurality of cathode drivers operatively connected to said display means and said data register member, and selective register means operatively connected to said anode driving means and cathode driving means to energize selected ones of said anode and cathode drivers to thereby energize selected ones of said display members.

12. The data processing apparatus of claim 11 further characterized in that said data register member is a recirculating shift register and means operatively connected to said data register member and said selective register means to inhibit recirculation of data bits in said shift register during display of any selected individual display member.

13. The data processing apparatus of claim 10 further characterized in that said display means comprises a plurality of individual display members, an anode register member operatively connected to each of said display members, a segment decoder operatively connected to said display means and said data register member, and a display location decoder operatively connected to said anode register member and said data register member for energizing selected ones of said display members.

14. The data processing apparatus of claim 12 further characterized in that said data register member is a recirculating shift register and means is operatively connected to said data register member and said segment decoder to inhibit recirculation of data bits in said shift register during display of any selected individual display member.

15. The data processing apparatus of claim 1 further characterized in that the apparatus comprises display means operatively associated with said data register member for retranslating the data bits introduced in said data register member to the informational character form and visually displaying said informational characters, said display means comprising a plurality of individual display members, change switches operatively connected to said data register member for changing the informational data bits in only selected ones of said data register elements and changing the informational character on associated selected display members.

16. The data processing apparatus of claim 15 further characterized in that an individual change switch is operatively associated with each individual display member for editing the character displayed thereby.

17. A data processing apparatus capable of storing and retrieving information therein and performing selected arithmetic functions thereon on a real time basis by means of direct switch actuation, said apparatus comprising:

a. switch-type input means for introducing a plurality of informational characters into said apparatus and where said characters are unrestricted to format by apparatus parameters, b. translation means operatively connected to said input means for converting such informational characters into a sector of informational data bits, c. a data register member having a plurality of data register elements and being operatively connected to said translation means for receiving said sector of data bits, said number of data register elements being at least equal to the number of data bits in said sector, d. switch-type means for introducing arithmetic data bits into said apparatus to perform arithmetic functions on said sector of data bits, e. conversion means operatively associated with said last named means to insure serial format of said arithmetic data bits, f. arithmetic function means operatively connected to said data register member and to said conversion means for adding or subtracting the arithmetic data bits with respect to said sector of informational data bits, g. a data storage member operatively connected to said arithmetic function means and capable of having the informational data bits recorded thereon, h. said data register member being operatively interposed between said data storage member and translation means and operating substantially at the rate of operation of said data storage device to receive informational data bits from said translation means for ultimate delivery to said data storage device and to receive data bits from said data storage device to thereby enable both read and write operations, i. and a number complement generator operatively connected to said arithmetic function means and said conversion means for energizing said conversion means to a proper state for either subtraction or addition.

18. The data processing apparatus of claim 17 further characterized in that a write enable member is operatively connected to said arithmetic function means and enables the recording of informational data bits introduced with respect thereto.

19. The apparatus of claim 17 further characterized in that an add switch and a subtract switch is operatively connected to said arithmetic function means and said write enable member and to said number complements generator to locate said arithmetic function means in a proper state for addition upon actuation of said add switch and to locate said arithmetic function means in a proper state for subtraction upon actuation of said subtract switch.

20. The apparatus of claim 18 further characterized in that an add switch and a subtract switch are operatively connected to said arithmetic function means and said write enable member and to said number complement generator to locate said arithmetic function means in a proper state for addition upon actuation of said add switch and to locate said arithmetic function means in a proper state for subtraction upon actuation of said subtract switch, said add switch and said subtract switch being operatively connected to said write enable member.

21. The data processing apparatus of claim 17 further characterized in that:

a. said input means is an input having a plurality of switch mechanisms thereon to introduce information into said apparatus, b. said translation means is a diode conversion matrix, c. said data register member is a shift register, d. said means for introducing arithmetic data bits are multidecade digit switches, e. said conversion means is a parallel to serial convertor, f. said arithmetic function means is a serial BCD adder/subtracter, g. and said number complement generator is a nines complement generator.

22. The data processing apparatus of claim 17 further characterized in that the apparatus includes means for adding clock pulses to said arithmetic function means to enable the arithmetic function to be performed on a clock time basis.

23. The data processing apparatus of claim 17 further characterized in that the apparatus includes means for adding clock pulses to said arithmetic function means to enable the arithmetic function to be performed on a clock time basis, and sector selection means for selecting the proper sector of data bits in which arithmetic functions can take place and inhibiting the performance of arithmetic functions in selected other sectors of data bits.

24. The data processing apparatus of claim 23 further characterized in that means is operatively associated with said sector selection means for inhibiting the performance of arithmetic functions in selected bit positions in said selected sectors.

25. A method of storing and retrieving information and performing selected arithmetic functions thereon on a real time basis, said method comprising:

a. operating a plurality of switch-type elements to generate a plurality of first sectors of informational data bits representing informational characters, b. randomly introducing said plurality of first sectors of informational data bits onto a data storage device, c. operating said plurality of switch-type elements to generate a plurality of second sectors of data bits representing informational characters, d. introducing said plurality of second sectors of data bits onto said data storage device in such manner that each second sector is located in a specified location with respect to a first sector with which said second sector is associated, each of said second sectors providing information about the first sector with which it is associated, e. converting a plurality of informational characters into a plurality of identification data bits, f. introducing each identification data bit representing said last named informational characters into a multistable data register element forming part of a data register, g. comparing the introduced identification data bits with the informational bits of the first sectors in said data storage device and recognizing comparison with a particular first sector when it exists, h. and sequentially thereafter displaying the second sector of data bits associated with said last named first sector.

26. The method of claim 25 further characterized in that the method includes the step of introducing clock pulses during the comparison operation for comparing the identification data bits with the bits of the first sectors on a clock time basis.

27. The method of claim 25 further characterized in that the method includes the continually circulating the first sector of identification bits introduced in said data register during said comparison.

28. The method of claim 25 further characterized in that the method includes the consecutively and sequentially energizing a plurality of display tubes to display the informational characters represented by said data bits introduced into said data register.

29. The method of claim 25 further characterized in that the method includes introducing a plurality of arithmetic data bits into said data register to enable the performance of selected arithmetic functions on selected ones of the second data sectors which may be introduced in said data storage member.

30. The method of claim 29 further characterized in that the method includes introducing clock pulses with respect to said data register to perform the arithmetic functions on a clock time basis.

31. A method for identifying and locating sectors of indicia to be stored and retrieved from a rotatable magnetic type digital storage member capable of holding digital indicia thereon and where each sector of indicia is comprised of a plurality of bits, said method comprising:

a. forming a plurality of indicia sector spaces on said storage member capable of holding indicia bits, b. serially introducing a selected digital bit into all available bit positions of certain selected sector spaces on said rotatable digital storage member which are available for receiving digital indicia therein, and where all selected digital bits in all available bit positions of such sector spaces are the same type of digital bits, c. serially examining sector spaces on said storage member on the basis of bits contained in each such sector space, d. identifying a particular sector space having only said selected digital bits therein, e. and introducing into said last named particular sector space bits representing a particular indicia to be stored in said particular sector space.

32. The method of claim 31 further characterized in that the bits forming the plurality of sectors of indicia are logical "ones" and logical "zeros" and further that said selected digital bits is "zeros" whereby only "zeros" exist in said certain selected sector spaces.

33. The method of claim 31 further characterized in that the method includes the forming of said bits in RZ or NRZ data format for storage on a magnetic data storage element.

34. The method of claim 31 wherein said storage member has a plurality of tracks and the method is further characterized in that a plurality of sector spaces are located on each track, and said method further including examining such tracks for said selected digital bits until a sector space having only said selected digital bits is located.

35. An apparatus for storing and retrieving digital data, said apparatus comprising:

a. a rotatable magnetic type digital storage member having a plurality of sector spaces thereon and capable of having sectors of digital data bits recorded thereon, and where each said sector is comprised of a plurality of digital data bits, b. indicia introduction means on said apparatus to initially introduce in serial format a selected digital data bit in each available bit position of each sector space on said storage member which is available for receiving digital indicia therein and where all selected digital bits in each such available bit position are the same type of digital bits, c. examination means operatively associated with said apparatus to selectively serially examine each bit contained in each said sector space until a sector space having only said selected digital bits in each bit position thereof is recognized, d. selection means operatively associated with said examination means for identifying a particular sector space having only said selected digital data bits in all bit positions of said sector space, e. identification means operatively associated with said selection means to identify the location on said storage member of said particular sector space, f. and means forming part of said indicia introduction means for serially introducing into said last named particular sector space indicia bits to be stored in said particular sector space.

36. The apparatus of claim 35 further characterized in that the bits forming said sector of indicia are logical "ones" and logical "zeros" and that said selected digital bits is "zeros" whereby only "zeros" exist in said particular selected sector spaces.

37. The apparatus of claim 35 further characterized in that said digital storage member is a magnetic data storage element of the type capable of storing RZ or NRZ data.

38. A method for recording and addressing information comprising a plurality of identification characters and a plurality of informational characters related to said identification characters in a first intelligible code on a rotatable magnetic storage type digital storage member, said method comprising generating a plurality of identification data bits in a second code for each of said identification characters, grouping each of said last named identification data bits to form an identification sector comprising said identification data bits, examining said storage member for an identification sector space having only selected digital identification data bits therein which represent only selected identification characters, serially recording the sector of identification data bits representing said identification characters in said last named identification sector space, generating a plurality of informational data bits in said second code for each of said informational characters, grouping said last named informational data bits to form an information sector comprising said informational data bits, serially recording the sector of informational data bits in a sector space available on said storage member which is related to said identification sector space.

39. The method of claim 38 further characterized in that the method includes the locating of the sector of informational data bits by examining the storage member for the sector of identification data bits associated with the sector of informational data bits.

40. The method of claim 38 further characterized in that the sector of informational data bits has the same number of bit positions as the sector of identification data bits.

41. The method of claim 38 further characterized in that the sector of informational data bits has the same number of bit positions as the sector of identification data bits, and that the number of identification characters in a sector thereof is the same as the number of informational characters present in a sector of informational characters.

42. The method of claim 38 further characterized in that the first code of informational characters and identification characters is a numeric code having decimal digits and that the second code of identification data bits and informational data bits is a BCD code.

43. The method of claim 38 further characterized in that the first code of informational characters and identification characters is a code having decimal digits and alphabetized characters, and that the second code of identification data bits and informational data bits is a six-bit alpha-numeric code.

44. The method of claim 38 further characterized in that the method includes the examining of the storage member for an identification sector space having bits therein which initially represent all zeros characters.

45. In a data storage and retrieval apparatus for storing and retrieving information therein on a real time basis and where said apparatus includes input means for introducing a plurality of informational characters into said apparatus and where said characters are unrestricted to format by apparatus parameter, a display member for displaying said characters, and a magnetic storage member; the improvement comprising a single data register member having a plurality of data register elements for receiving data bits from said input means corresponding to said informational characters, said number of data register elements being at least equal to the number of data bits, means for recirculating the data bits generated from characters introduced by said input means in said register member to enable display of said characters on said display member, means enabling said data register member to temporarily access said magnetic storage member to permit associative searching of data bits from said magnetic storage member in said data register member to enable display of characters on said display member corresponding to the data bits from said storage member.

46. The improvement in the data storage and retrieval apparatus of claim 45 further characterized in that means is operatively associated with said data register member for introducing data bits into said data register member for writing on said magnetic storage member, and means operatively associated with said last named means for providing operative connection between said data register member and magnetic storage member so that the last named bits in said data register member can be recorded in said magnetic storage member.

47. A data storage and retrieval apparatus for storing and retrieving information therein on a real time basis and displaying said information, said apparatus comprising:

a. switch-type input means for introducing a plurality of informational characters into said apparatus and converting such informational characters into informational data bits,
b. a data register member having a plurality of data register elements and being operatively connected to said input means for receiving said data bits, said number of data register elements being at least equal to the number of data bits,
c. a display member operatively connected to said data register member and having a plurality of radiation active display elements for displaying characters corresponding to the data bits in said data register member,
d. an individual character edit switch associated with each radiation active display element and being operatively connected to said data register member, and
e. character change means for changing a character depicted on a radiation active element by actuation of the edit switch associated with said radiation active element and substantially simultaneously changing the data bits in said register member to correspond to the changed character depicted on said last-named radiation active element.

48. The data storage and retrieval apparatus of claim 47 further characterized in that a data storage member is operatively connected to said data register member and which data storage member is capable of having the data bits recorded thereon, and that the character change means also substantially simultaneously changes the data bits in the data storage member along with the changing of the bits in the register member to correspond to the changed character depicted on the radiation active element.

49. The data storage and retrieval apparatus of claim 47 further characterized in that the character change means includes a character decode circuit operatively connected to each such character edit switch and a character loading element interposed between said character decode circuit and data register member.

50. A non-programmable data storage and retrieval system for storing and retrieving information on a real time basis, said system comprising a combination electronic control and memory unit and a plurality of console units operatively connected to said control and memory unit, switch-type input means on each of said console units for introducing a plurality of informational characters into said system and converting such informational characters into informational data bits, a data register member in each of said console units and each said register member having a plurality of data register elements for receiving said data bits, said number of data register elements being at least equal to the number of data bits, a magnetic data storage member in said control and memory unit and capable of having said informational data bits from said console units recorded thereon,read-write sequencing means associated with each of said console units and being operatively connected to the data register member of each such console unit to control the mode of operation with respect to said data storage member, and multiplexing means including a gating circuit and switching means operatively connected to each of said plurality of console units enabling each of said console units to individually and simultaneously access said electronic control and memory unit and control the mode of operation thereof.

51. The data storage and retrieval system of claim 50 further characterized in that each said console unit includes means for introducing data from said console unit into said multiplexing means and write command signals from said console unit to enable recording of said data in said magnetic data storage member.

52. The data storage and retrieval system of claim 51 further characterized in that each said console unit includes an arithmetic controller and that each said console unit introduces arithmetic data into said magnetic data storage member for recording thereon.

53. The data storage and retrieval system of claim 50 further characterized in that each said console unit includes means for receiving indexing clock signals, write clock signals and read clock signals from said multiplexing means.

54. The data storage and retrieval system of claim 50 further characterized in that each said console unit includes an arithmetic controller and that each said console unit introduces into said multiplexing means data introduced in said console unit by said switch type input means, and arithmetic data generated in said console unit, each said console unit also introducing into said multiplexing means write command signals from said console unit to enable recording of any such data in said magnetic data storage member, each said console unit also receiving indexing clock signals, write clock signals and read clock signals from said multiplexing means.

55. A method of recording and addressing information comprising a plurality of informational characters in a first intelligible code on a digital storage member and where a first portion of said informational characters are identification characters forming an identification word and a second portion of said informational characters are descriptive characters forming a descriptive word; said method comprising generating a plurality of bits of a second intelligible code for each character in each of said portions to render an identification word formed of identification bits and a descriptive word formed of descriptive bits, serially recording all of the identification bits forming one identification word on a single sector space on said storage member to be associatively retrievable and serially recording all of the descriptive bits forming one descriptive word in another single sector space on said storage member to be directly retrievable with respect to said identification bits, the sector space containing only said descriptive word being related in time and space on said storage member to the sector space containing only the associated identification word.

56. The method of claim 55 further characterized in that the method includes recording the identification bits on a first sector space of said storage member reserved only for identification words and recording the descriptive bits on a second sector space of said storage member reserved only for descriptive words.

57. The method of claim 55 further characterized in that the method includes recording the identification bits comprising an identification word on a first sector space of said storage member in a number of first bit spaces available for each of said identification bits, selecting a second sector space on said storage member which is spaced from the first sector space by a predetermined number of sector spaces, and selecting second bit spaces in said second second sector which are advanced from the first bit spaces by a predetermined number of bit spaces, and recording the descriptive bits comprising the descriptive word in the second bit spaces of said second sector space.

58. The method of claim 55 further characterized in that the method includes recording the identification bits comprising an identification word on a first sector space of said storage member in a number of first bit spaces available for each of said identification bits, selecting a second sector space on said storage member which is spaced from the first sector space by a predetermined number of sector spaces, and selecting second bit spaces in said second sector which are advanced from the first bit spaces by a predetermined number of bit spaces, and recording the descriptive bits comprising the descriptive word in the second bit spaces of said second sector space, the predetermined number of sector spaces being equal to the predetermined number of bit spaces.

59. The method of claim 56 further characterized in that the method includes counting the number of identification bits and determining the proper second sector space of said storage member based on said counting.

60. The method of claim 55 further characterized in that said informational bits comprise a first sector and that said descriptive bits comprise a second sector, said storage member is comprised of a plurality of tracks and a plurality of sector spaces on each of said plurality of tracks, and that only first sectors are recorded in the sector spaces of one track and that only second sectors are recorded in the sector spaces of a second of said tracks.

61. A process for recording a group of words in a magnetic memory, at least one of said words forming a locator portion and another of said words forming a descriptor portion, and retrieving such words from said memory; said method comprising serially recording bit combinations representing said locator portion in one sector space of the memory thereby defining a locator address containing only said locator portion, serially recording bit combinations representing said descriptor portion in another aspect space of the memory containing only said descriptor portion and which location of the descriptor portion is related to the locator portion in addressable manner thereby defining a descriptor address; and retrieving such words by associatively selecting the locator address of the locator portion, and directly selecting the descriptor address from the locator address.

62. A non-programmable data storage and retrieval apparatus for storing and retrieving information therein on a real time basis, said apparatus comprising:

a. input means for introducing a plurality of informational characters into said apparatus and converting such informational characters into sectors of informational data bits, b. a data register member having a plurality of data register elements and being operatively connected to said input means for receiving said sectors of data bits, said number of data register elements being at least equal to the number of data bits in any one sector.

c. a data storage device operatively connected to said data register member and capable of having a first sector type of informational data bits recorded thereon and a second sector type of informational data bits recorded thereon, said first sector type of informational bits representing addressable information, d. comparison means operatively interposed between said data register member and data storage device to determine if any of said first sector type of informational data bits on said storage device corresponds to and is identical with a first set of informational data bits introduced by said input means, e. and redundant inhibit address means operatively connected to said data register member said comparison means and said data storage device to prevent any first sector of informational data bits from being recorded on said data storage device when an identical first sector of data bits has been recorded on and still remains on said data storage device.

63. The data storage and retrieval apparatus of claim 62 further characterized in that said apparatus comprises switch means for introducing a group of characters capable of being translated into said first sector type of informational bits, and write sequencing means operatively connected to said data register member and said redundant inhibit address means for recording said first sector type of informational bits on said data storage device when an identical first sector type of informational bits does not exist on said data storage device.

64. The data storage and retrieval apparatus of claim 63 further characterized in that said redundant inhibit address means inhibits said write sequencing means from permitting recordation of said first sector type of informational bits on said data storage device when an identical first sector type of informational bits has been recorded on and still remains on said data storage device.

65. A non-programmable data storage and retrieval apparatus for storing and retrieving information therein on a real time basis, said apparatus comprising:

a. input means for introducing a plurality of locator characters and descriptive characters into said apparatus, b. translation means operatively connected to said input means for converting a plurality of such locator characters corresponding to one locator word into a sector of locator character bits, and converting a plurality of such descriptive characters corresponding to one descriptive word into a sector of descriptive character bits, d. a data storage device operatively connected to said data register member and capable of having a sector of locator bits recorded thereon and a sector of descriptive bits recorded thereon, and where each word is capable of being located in a sector space, e. accumulating means operatively associated with said storage member for accumulating certain of the descriptive bits corresponding to selected characters in predetermined character positions in certain of said descriptive words, f. and means operatively connected to said last named means permitting addition to or subtraction of certain of the selected characters in said predetermined character positions to thereby change such selected characters.

66. The data storage and retrieval apparatus of claim 65 further characterized in that said accumulating means comprises an accumulated data register member which is operatively connected to said data register member and data storage device.

67. The data storage and retrieval apparatus of claim 66 further characterized in that a storage register capable of holding arithmetic data bits is operatively connected to said accumulated data register member.

68. The data storage and retrieval apparatus of claim 65 further characterized in that a zeroing sequencer is operatively connected to said data register member and data storage device for periodically removing the accumulated descriptive bits corresponding to the selected characters in said predetermined character positions and introducing bits representing zero characters in said last named predetermined character positions.

69. The data storage and retrieval apparatus of claim 68 further characterized in that a second data register member is operatively connected to said zeroing sequencer for receiving bits in said zeroing sequencer.

70. The data storage and retrieval apparatus of claim 65 further characterized in that the descriptive bits corresponding to selected characters in said predetermined character positions represent numeric characters.

71. A data processing apparatus capable of storing and retrieving information therein on a real time basis, said apparatus comprising:

a. input means for introducing a plurality of informational characters into said apparatus and converting such informational characters into sectors of informational data bits, b. a data register member having a plurality of data register elements and being operatively connected to said input means for receiving said sectors of data bits, said number of data register elements being at least equal to the number of data bits in any one sector, c. a data storage member remote from said data register member and being operatively electrically connected to said data register member for receiving and capable of having the sectors of informational data bits recorded thereon, d. clocking means for introducing clocking pulses with respect to said data register member for introducing a sector of data bits at the rate of the clocking pulses into and out of said data register member on a sector time basis and for transferring a sector of data bits at the rate of clocking pulses to said data storage member on a sector time basis , e. and early clock pulse transmitting means operatively connected to said clocking means and data register member for sending to said data register member a number of clocking pulses in one sector time which is greater than the number of data bits contained in any one sector.

72. The data processing apparatus of claim 71 further characterized in that means is included in said early clocking means for reducing the number of clock pulses in a succeeding sector time by the number of clock pulses which exceeded the data bits in the last named previous sector time.

73. The data processing apparatus of claim 72 further characterized in that said early clocking means is an early clock pulse sequencer.

74. A non-programmable data storage and retrieval apparatus comprising data register member capable of receiving bits representative of characters introduced thereinto, first switch means operatively connected to said data register member for converting a sector of address type characters into a sector of address representing digital bits and introducing same into said data register member, second switch means operatively connected to said data register member, for converting a first sector of data type characters into a first data sector of data representing digital bits and introducing same into said data register member, third switch means operatively connected to said data register member for converting a second sector of data type characters into a second data sector of data representing digital bits and introducing same into said data register member, a data storage device operatively connected to said register member for receiving bits representing characters of each of said sectors, read switch means for selecting and displaying any selected one or more of said sectors, and write switch means for recording new bits in any selected one or more of said sectors in said data storage device.

75. The data storage and retrieval apparatus of claim 74 further characterized in that initial and subsequent read sequencers are operatively associated with said data register member.

76. The data storage and retrieval apparatus of claim 74 further characterized in that initial and subsequent write sequencers are operatively associated with said data register member.

77. The data storage and retrieval apparatus of claim 74 further characterized in that said read switch means comprises a first read switch which permits reading of the sector of address type characters, a second read switch which permits reading of the first data sector, and a third read switch which permits reading of the first data sector, and a third read switch which permits reading of the second data sector.

78. The data storage and retrieval apparatus of claim 74 further characterized in that said write switch means comprises a first write switch which permits writing of the sector of address type characters onto said data register member, a second write switch which permits writing of the first data sector onto said data register member, and a third write switch which permits writing of the second data sector onto said data register member.

79. A non-programmable data storage and retrieval apparatus capable of storing and retrieving information therein and performing selected arithmetic functions thereon on a real time basis by means of direct switch actuation, said apparatus comprising:

a. switch-type input means for introducing a plurality of informational characters into said apparatus and where said characters are unrestricted to format by apparatus parameters, b. a diode conversion matrix operatively connected to said input means for converting such informational characters into an address sector of informational bits in alpha-numeric code format and a data sector of informational bits in alpha-numeric code format and where the data sector provides information about the address sector, c. a recirculating data shift register member having a plurality of multistable data register elements and being operatively connected to said diode conversion matrix for receiving said sectors of data bits, said number of data register elements being at least equal to the number of data bits in any one sector, d. clocking means for generating clock pulses, e. gating means operatively connected to said clocking means and said data shift register member for controlling introduction of said clock pulse to said data shift register member to enable a recirculation of the data bits therein on a clock time basis, f. switch-type means for introducing arithmetic data bits into said apparatus to perform arithmetic functions on the informational data bits in a data sector, g. a parallel-to-serial converter operatively associated with said last named switch-type means to insure serial format of said arithmetic data bits, h. arithmetic function means, including a serial BCD adder/subtractor, operatively connected to said data shift register member and to said parallel-to-serial convertor for adding or subtracting the arithmetic data bits with respect to the informational bits in a data sector, i. a serially addressable data storage member operatively connected to said data register member and said arithmetic function means and capable of having the informational data bits recorded thereon, j. said data register member being operatively interposed between said data storage member and diode conversion matrix and operating substantially at the rate of operation of said data storage member to receive informational data bits from said diode conversion matrix for ultimate delivery to said data storage member and to receive data bits from said data storage member to thereby enable both read and write operations, k. a number complements generator operatively connected to said arithmetic function means and said parallel-to-serial convertor for energizing said parallel-to-serial convertor to a proper state for either subtraction or addition, l. read and write sequencing means operatively connected to said data storage member and said data shift register member to perform read-write sequencing and control the mode of operation with respect to said data storage member, m. counter means operatively connected to said read-write sequencing means and to said data shift register member to recognize and distinguish between said address sectors and said data sectors, n. comparison means operatively connected to said counter means and having an operative input to said data shift register member for comparing each address sector of information introduced by said switch type input means with address sectors of information in said data storage member, o. a write enable member operatively connected to said arithmetic function means to enable recording of arithmetic data bits on said data storage member, p. an add switch and a subtract switch operatively connected to said arithmetic function means and said write enable member and to said number complements generator to locate said arithmetic function means in a proper state for addition upon actuation of said add switch and to locate said arithmetic function means in a proper state for subtraction upon actuation of said subtract switch, q. a plurality of individual display members, r. an anode driving means including a plurality of anode drivers and a cathode driving means including a plurality of cathode drivers operatively connected to said display means and said data shift register, s. an anode register member operatively connected to each of said display members and said anode driving means, t. a decoder operatively connected to said cathode driving means and said data shift register member, u. a display location decoder operatively connected to said anode register member and said data register member for energizing selected ones of said display members, v. and an individual change switch operatively associated with each individual display member and operatively connected to said data register member for changing the informational data bits in only selected ones of said data register elements and changing the informational character on associated selected display members to edit the character displayed thereby.

* * * * *